(12) United States Patent
Stewart

(10) Patent No.: US 11,923,997 B2
(45) Date of Patent: Mar. 5, 2024

(54) METHODS AND SYSTEMS FOR SESSION MANAGEMENT IN DIGITAL TELEPRESENCE SYSTEMS USING MACHINE LEARNING

(71) Applicant: LATESCO LP, Austin, TX (US)

(72) Inventor: Brett Stewart, Austin, TX (US)

( * ) Notice: Subject to any disclaimer, the term of this patent is extended or adjusted under 35 U.S.C. 154(b) by 168 days.

(21) Appl. No.: 17/351,911

(22) Filed: Jun. 18, 2021

(65) Prior Publication Data

US 2021/0399912 A1    Dec. 23, 2021

Related U.S. Application Data

(60) Provisional application No. 63/040,882, filed on Jun. 18, 2020.

(51) Int. Cl.
*H04L 12/18* (2006.01)

(52) U.S. Cl.
CPC ...... *H04L 12/1822* (2013.01); *H04L 12/1818* (2013.01); *H04L 12/1827* (2013.01)

(58) Field of Classification Search
CPC ............. H04L 12/1822; H04L 12/1818; H04L 12/1827; H04L 51/52; H04N 7/15; G06Q 10/10; G06Q 50/01
See application file for complete search history.

(56) References Cited

U.S. PATENT DOCUMENTS

| 10,469,275 | B1 | 11/2019 | Brommall et al. | |
|---|---|---|---|---|
| 2012/0182384 | A1 | 7/2012 | Anderson et al. | |
| 2013/0004929 | A1* | 1/2013 | Otwell | G09B 5/00 434/350 |
| 2013/0091068 | A1 | 4/2013 | Canning et al. | |
| 2015/0319203 | A1* | 11/2015 | Jeremias | G06F 3/0484 715/753 |
| 2018/0375676 | A1 | 12/2018 | Bader-Natal et al. | |
| 2021/0400142 | A1* | 12/2021 | Jorasch | H04M 3/567 |

FOREIGN PATENT DOCUMENTS

JP    WO 2008078555    4/2010

OTHER PUBLICATIONS

International Search Report and Written Opinion of International Application No. PCT/US2020/038316, dated Oct. 1, 2021.

* cited by examiner

*Primary Examiner* — Farzana B Huq
(74) *Attorney, Agent, or Firm* — Campbell Stephenson LLP

(57) ABSTRACT

Methods and systems are disclosed that include identifying two or more participants of the video conference, obtaining desired attributes from the participants, determining the desired, average breakout group size, dividing a total number of participants by the breakout group size, in order to determine the initial number of breakout groups, processing the participant attributes to assign participants to the breakout group, and controlling a transmission component and an output component of a first of the participants to either communicate with, or not communicate with, a second of the participants based upon the assignment.

18 Claims, 32 Drawing Sheets

US 11,923,997 B2

METHODS AND SYSTEMS FOR SESSION MANAGEMENT IN DIGITAL TELEPRESENCE SYSTEMS USING MACHINE LEARNING

CROSS REFERENCE TO RELATED APPLICATIONS

This application claims domestic benefit under Title 35 of the United States Code § 119(e) of U.S. Provisional Patent Application No. 63/040,882, entitled "METHOD FOR DIRECTING SOCIAL INTERACTIONS," filed Jun. 18, 2020, and having Brett Stewart as the inventor. This provisional patent application is hereby incorporated by reference herein, in its entirety and for all purposes.

BACKGROUND

Technical Field

This invention relates generally to digital telepresence systems and, more particularly, to the dynamic management of sessions through the use of machine learning and/or other such techniques.

Description of Related Technologies

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Such information handling systems have readily found use in a wide variety of applications, including telepresence applications (e.g., in the context of videoconferencing applications on computers and mobile devices). Information handling systems employed in such telepresence applications can support communications between a large number of users. A common use-case of such telepresence applications is a situation in which a presenter's presentation is viewed by the aforementioned large number of users. Such a paradigm typically provides an acceptable mechanism for disseminating information to those users. However, as experiences of late demonstrate, the ability to communicate quickly degrades into a cacophony when such users are allowed to communicate as well. This typically leads to such users being prohibited from communicating. Further, while smaller groupings may address the problem of too many users attempting to communicate at once, there is the problem of determining how, for a large number of such users, to divide the users into groups. As a result, there is little to no opportunity for the users in the audience to interact. Moreover, from a more practical standpoint, telepresence applications fail miserably in providing a facsimile of a real-world conference, in which, in addition to presentations that can include communications from the audience, attendees are able to interact with one another in an organic, "real life" manner. Further in this regard, it will be appreciated that, even in real-world interactions, a significant amount of serendipity is involved in such real-world interactions being useful to the attendees and/or the sponsor(s) of such conferences.

Additionally, that same serendipity is involved in real-world interactions in settings other than the large-group settings described. Consider the common experience of in-person collaborative work environments, where chance meetings occur in a break room, or because someone goes past an open office door. Those chance meetings might result in a useful exchange of business or social information that would not otherwise occur. In a scenario like a pandemic, the opportunity for such serendipitous meetings can be lost when the in-person collaborative work environment is replaced by a telepresence work environment. There are many other settings, such as telepresence education, telepresence recreation (e.g., summer camps), and so on, which also lose the benefit of serendipitous interactions when in-person communication is replaced by telepresence communications.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

Figure 1:
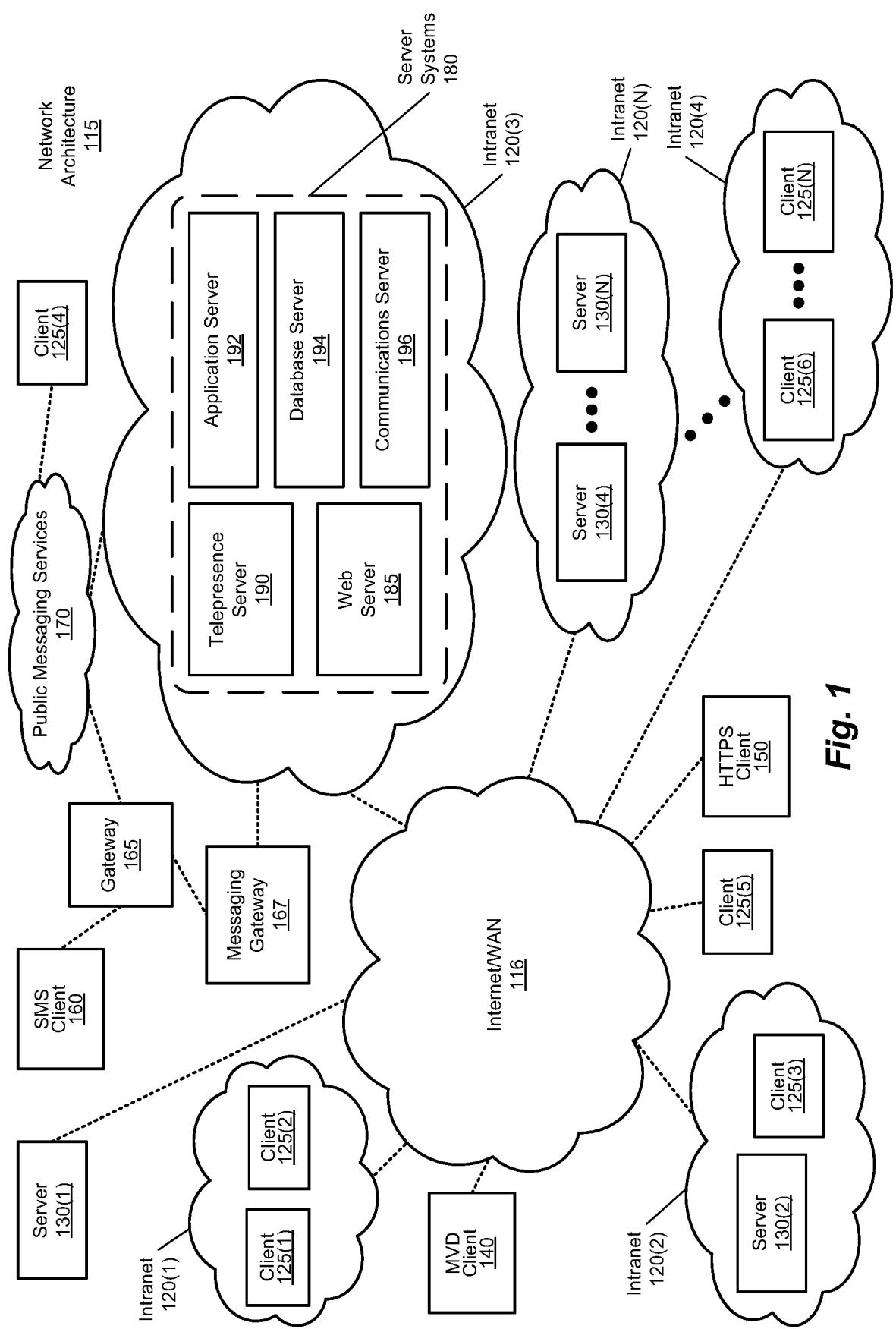
FIG. 1 is a block diagram illustrating an example of a network architecture, according to methods and systems such as those disclosed herein.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover modifications, equivalents and alternatives falling within the spirit and scope of methods and systems such as those described herein, as defined by the appended claims.

DETAILED DESCRIPTION

Overview

Methods and systems such as those described herein can be implemented, for example, as a method, network device, and/or computer program product, and provide for the identification of one or more actions to resolve a problem, and improving the performance of such systems by dynamically modifying such systems' action paths, using machine learning (ML) techniques. For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

As noted, certain embodiments of methods and systems such as those disclosed herein can include operations such as receiving participant and organizer information at a machine learning system, generating subgroups, assigning participants to the subgroups thus generated, and updating participant and organizer information, as might be maintained in a telepresence construct database by a telepresence management system.

Introduction

As noted, methods and systems such as those described herein provide for the generation of subgroups and the assigning of participants thereto. In so doing, methods and systems such as those described herein are able to allow telepresence event attendees (and, in the broader sense, any groups of users of telepresence systems) to experience more enjoyable, more fruitful interactions with one another, in a manner that more closely approximates the real-world, face-to-face interactions such individuals would experience in attending gatherings in professional, social, work, school, and other settings. In order to facilitate such interactions, such methods and systems include the use of machine learning, iterative summation, and other such techniques to analyze available information, and, in certain embodiments, to do so using minimal or no human guidance beyond information such as participant information and organizer information. More specifically, methods and systems such as those described herein provide for the generation of subgroups and assignment of participants to those subgroups in a manner that addresses preferences of the participants in and organizers of a telepresence event. Through the use of machine learning, iterative summation, and other such techniques, methods and systems such as those described herein are able to dynamically adjust such subgroupings and participant assignment in an ongoing manner, allowing such telepresence management systems to constantly monitor the participants of the telepresence event being managed and, in response to changes therein, improve each participant's experience by making changes to the given set of subgroups and the participants' membership therein.

As will be appreciated, the simplistic approaches to conducting telepresence events heretofore have left a great deal to be desired. One example of such a situation is a telepresence event with a large number of participants. As will be appreciated, the cacophony that results from allowing all the participants to communicate with one another in a single telepresence event quickly results in that telepresence event descending into chaos. As will also be appreciated, the "large number" is actually small indeed (likely on the order of ten participants), and matters only worsen when the number of participants becomes truly large (e.g., the hundreds or thousands of participants that might attend a real-world technical conference, for example). Moreover, such participants are faced with an overwhelming number of other participants with whom they might interact in such situations. Again, this problem only worsens as the number of participants increases.

Methods and systems such as those described herein address such problems by directing interactions between participants of a telepresence event such that the participants are able to interact with a reasonable number of other participants, in a manner more closely resembling a real-world, face-to-face manner. By generating subgroups and assigning participants to those subgroups, such methods and systems are able to provide the benefits of such real-world interactions in a telepresence environment. Such telepresence environments can include videoconferencing, teleconferencing, chat messaging, and other forms of communication. The subgroups are generated, and the participants selected and assigned, using affinity information, participant preferences, participant attributes, and other such information regarding the participants being selected and assigned. Organizer preferences can also be considered.

A multi-facetted profile of attributes can be collected for and about each participant, whether from the sponsor, the participant, or from other sources of information that may be relevant, whether from various, pre-existing data from social networking platforms or networks, or from the participants themselves. The anticipated types of attributes can include information about the participant, to be used to help in selecting the participant for inclusion in subgroups, and information about other participants with whom the participant might be assigned to a subgroup. As noted, participant attributes can be provided by the participant themselves, as well as from a multiplicity of other sources such as from the participant's employment, industry, profession, professional and/or social interests, and/or from any number of sources, including simply being amenable to be assigned to a random subgroup.

Using the various participants' attributes, the organizer sponsoring the telepresence event can choose selected participants and place them in a subgroup with one another, in order to facilitate their interacting more easily and completely than if those participants had been subjected to membership in the entire group. Thus, a telepresence management system such as that described herein can employ machine learning techniques, iterative summation techniques, and other applicable techniques, combined with controls set by the organizer in order to control the interactions of the participants. The organizer may choose, for example, to have the entire group of participants together in a large meeting, then, using the telepresence management system and decisions made by the organizer, assign some number of participants to each subgroup. After a given amount of time, the participants' are reassigned to new, different subgroups, potentially generated based on different participant attributes. Participant attributes can also be updated dynamically during the event, as participants' activities can be allowed to alter the inputs to the telepresence management system, as well as parameters such as machine learning biases and weights, iterative summation coefficients and thresholds, and other such parameters, as may be used in generating subsequent subgroups and assigning participants thereto. In this manner, such a telepresence management system is able to continually combine and recombine large numbers of participants into (potentially (relatively small) subgroups of participants), in order to encourage and facilitate participant interaction.

In the following passages, it is to be appreciated that telepresence, as used therein, comprehends various communications mechanisms, and so includes video communications (e.g., videoconferencing), audio communications (e.g., teleconferencing), textual communications (e.g., chat messaging), and other such forms of electronic communication that allow attendees of a telepresence event to engage in such communications related to the telepresence event between one another. And while attendees at such telepresence events are typically physically remote from one another and the telepresence events' organizers, such need not be the case (e.g., as where certain portions of an event are held as a telepresence event, where a telepresence event is held in conjunction with a physical event, and so on). As to real-world analogs, telepresence events can, in fact, comprehend scenarios such as in-person collaborative work environments, telepresence in education, telepresence in recreation, and other such contexts. Further, due to the dynamic capabilities of telepresence management systems such as those described herein, benefit from systems can be had merely by changing the goals and rules of the organizer and participants. Consider a work environment where employees are connected briefly/randomly to simulate the "water cooler" experience, with the additional benefit of rules regarding their interacting with someone in a different department, different management level, and so on. The applications of methods and systems such as those described herein are many and varied.

Example System Network Architecture

FIG. 1 is a block diagram illustrating an example of a network architecture 115 that includes a server system according to one embodiment. Network architecture 115 includes an internetwork (depicted in FIG. 1 as an internet/wide area network (WAN) 116), which is configured to couple a number of intranets to one another (depicted in FIG. 1 as intranets 120(1)-(N)). Intranets 120(1)-(N), in turn, can include a number of components, such as one or more clients (depicted in FIG. 1 as clients 125(1)-(N)) and/or servers (depicted in FIG. 1 as servers 130(1)-(N)). Clients 125(1)-(N) and/or servers 130(1)-(N) can, for example, be implemented using computer systems such as those described in subsequently. Internet/WAN 116 thus communicatively couples intranets 120(1)-(N) to one another, thereby allowing clients 125(1)-(N) and servers 130(1)-(N) to communicate with one another (and can, in certain embodiments, provide for the servers of intranets 120(3) and 120(N), for example, to operate as cloud-based server systems). As is depicted in FIG. 1, clients 125(1)-(N) can be communicatively coupled to one another and to servers 130(1)-(N) as part of one of intranets 120(1)-(N), or directly via internet/WAN 116. Similarly, servers 130(1)-(N) can be coupled via intranet/WAN 116 via a direct connection to intranet/WAN 116, or as part of one of intranets 120(1)-(N).

Network architecture 115 also provides for communication via intranet/WAN 116 using one or more other devices. Such devices can include, for example, a mobile voice and data (MVD) device (e.g., depicted in FIG. 1 as a MVD client 140, implemented in a "smart phone," a "tablet" computer, or other such mobile computing device, using, in the alternative or in combination, general packet radio service (GPRS) technology, $3^{rd}$ Generation (3G) cellular technology (e.g., Wideband Code Division Multiple Access (WCDMA)/High-Speed Downlink Packet Access (HSDPA)), $4^{th}$ Generation (4G) cellular technology (e.g., High Speed Packet Access (HSPA/HSPA+), Long Term Evolution (LTE), or IEEE 802.16 ("WiMAX")), and/or $5^{th}$ Generation (5G) cellular technology (New Radio (NR), Stand Alone (SA), or ultra-wideband (UWB)), among other such communications technologies), a secure web client (depicted in FIG. 1 as a secure hypertext transfer protocol client 150), and a basic cellular phone (e.g., using standard texting or other communication protocols, and depicted in FIG. 1 as a simple messaging service (SMS) client 160). HTTPS client 150 can be, for example, a laptop computer using the HTTP Secure (HTTPS) protocol. Support for GPRS clients, SMS clients, HTTP clients, and the like thereby provide users with communication functionality according to an embodiment in a mobile environment. As is also depicted in FIG. 1, SMS client 160 can communicate via internet/WAN 116 via several channels. SMS client 160 can communicate directly, for example, with a gateway 165, which, in turn, communicates with internet/WAN 116 via a messaging gateway 167 and, optionally, elements within intranet 120(3), for example. Alternatively, SMS client 160 can, via gateway 165, communicate with intranet 120(3) (and so, internet/WAN 116) via public messaging services 170 to which gateway 165 and intranet 120(3) are connected. As is also depicted in FIG. 1, a client 125(4) is also able to communicate via internet/WAN 116 by way of public messaging services 170 and intranet 120(3). In order to support such communications, as well as other communications according to various embodiments, intranet 120(3) includes server systems 180, as well as (optionally) providing for a number of clients (not shown), in the manner of intranet 120(2). As will be appreciated in light of the present disclosure, such communications pathways can include (and are intended to comprehend) wired network connections (e.g., within an intranet such as one of intranets 120, or therebetween) and/or wireless network paths that include wireless communications (e.g., by way of wireless devices supporting IEEE 802.11 technology ("WiFi")). Further, with respect to the use of a combination of hardware and software in managing such communications, the associated computational workloads can be orchestrated such that those computational workloads are serviced at a point in the network that is physically and/or logically closer to the given user's device (or, in scenarios in which computational workloads can be divided, to points as close to that user's device as such orchestration of the given portion of the conversational workload will allow).

Server systems 180 include a number of components that allow server systems 180 to provide various functionalities (e.g., supporting various communications, web-based services, cloud-based services, enterprise services, and so on). Among these components, in certain embodiments, are a number of servers, which can be implemented in hardware and/or software. Server systems 180 includes a number of elements that allow server system 180 to support messaging communications according to embodiments of the present invention. Among these elements are one or more web servers (e.g., a web server 185), one or more telepresence servers (e.g., a telepresence server 190), one or more application servers (e.g., an application server 192), one or more database servers (e.g., a database server 194), and one or more communications servers (e.g., a communications server 196), among other possible such servers, in communication with one another. In the manner noted above, a distributed approach to the servers of server systems 180 can employ the aforementioned orchestration, such that each such server portion thereof is executed as a distributed application, with the orchestration thereof migrating such portions as may be advantageous to efficiently and effectively service the users' needs. For example, an instance of one or more of the servers of server systems 180 (and/or portions thereof) might be migrated to server 130(2) in order to better address the needs of a user employing a telepresence application executed by client 125(3).

Servers such as those included in server systems 180 are designed to include hardware and/or software configured to facilitate functionalities that support operations according to the concepts disclosed herein, among other possible such components and mechanisms, in communication with one another (e.g., directly, via various application programming interfaces (APIs) and/or other such interfaces, and/or other such mechanisms and/or constructs). As will be discussed in greater detail in connection with subsequent figures, the server systems of server systems 180 provide such functionality, for example by presenting end-users with a website (functionality effected by, for example, web server 185). In so doing, such web servers present information collected, generated, organized, and maintained in one or more distributed databases (DDB) and/or one or more unstructured databases, by one or more distributed database servers such as database server 194, under the control of one or more application servers. Such a website can be accessed by an end-user using a client computing device such as one or more of clients 125(1)-(N), MVD client 140, HTTPS client 150, and/or SMS client 160. As will be appreciated in light of the present disclosure, the ability to support such functionality on mobile devices such as those described herein is of importance, as mobile communications and program management are fast becoming an important facet of today's business environment.

It will be appreciated that, in light of the present disclosure, variable identifiers such as "N" or "M" may be used in various instances in various of the figures herein to more simply designate the final element of a series of related or similar elements. The repeated use of such variable identifiers is not meant to necessarily imply any sort of correlation between the number of elements in such series. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

Further, in light of the present disclosure, it will be appreciated that storage devices such as storage devices 160 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, such systems can include other components such as routers, firewalls, load balancers, and the like that are not germane to the discussion of the present disclosure and will not be discussed further herein. It will also be appreciated that other configurations are possible.

As will be appreciated in light of the present disclosure, processes according to concepts embodied by systems such as those described herein include one or more operations, which may be performed in any appropriate order. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable storage media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with this disclosure.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module, for example.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment. With regard to the servers described in connection with FIG. 1 and the potential of distributed processing, there exists the potential for employing distributed, multiple servers to achieve computational concurrency. This presents the possibility of each user of client such as those described herein for purposes of participating in a telepresence event of some sort, in which a behavioral machine learning inferencing described herein, the iterative summation techniques described herein, and other such techniques comparable to those described herein are orchestrated ever closer to the user's client device. In such scenarios, a non-volitional participant assigner such as that described herein could continue execute elsewhere (e.g., remotely over the network, such as being executed "in the cloud").

The software modules described herein may be received by such a computer system, for example, from computer readable storage media. The computer readable storage media may be permanently, removably or remotely coupled to the computer system. The computer readable storage media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM or application specific integrated circuits; volatile storage media including registers, buffers or caches, main memory, RAM, and the like; and other such computer-readable storage media. In a UNIX-based embodiment, the software modules may be embodied in a file, which may be a device, a terminal, a local or remote file, or other such devices. Other new and various types of computer-readable storage media may be used to store the software modules discussed herein.

Example Architectures for Telepresence Management Systems

Figure 2:
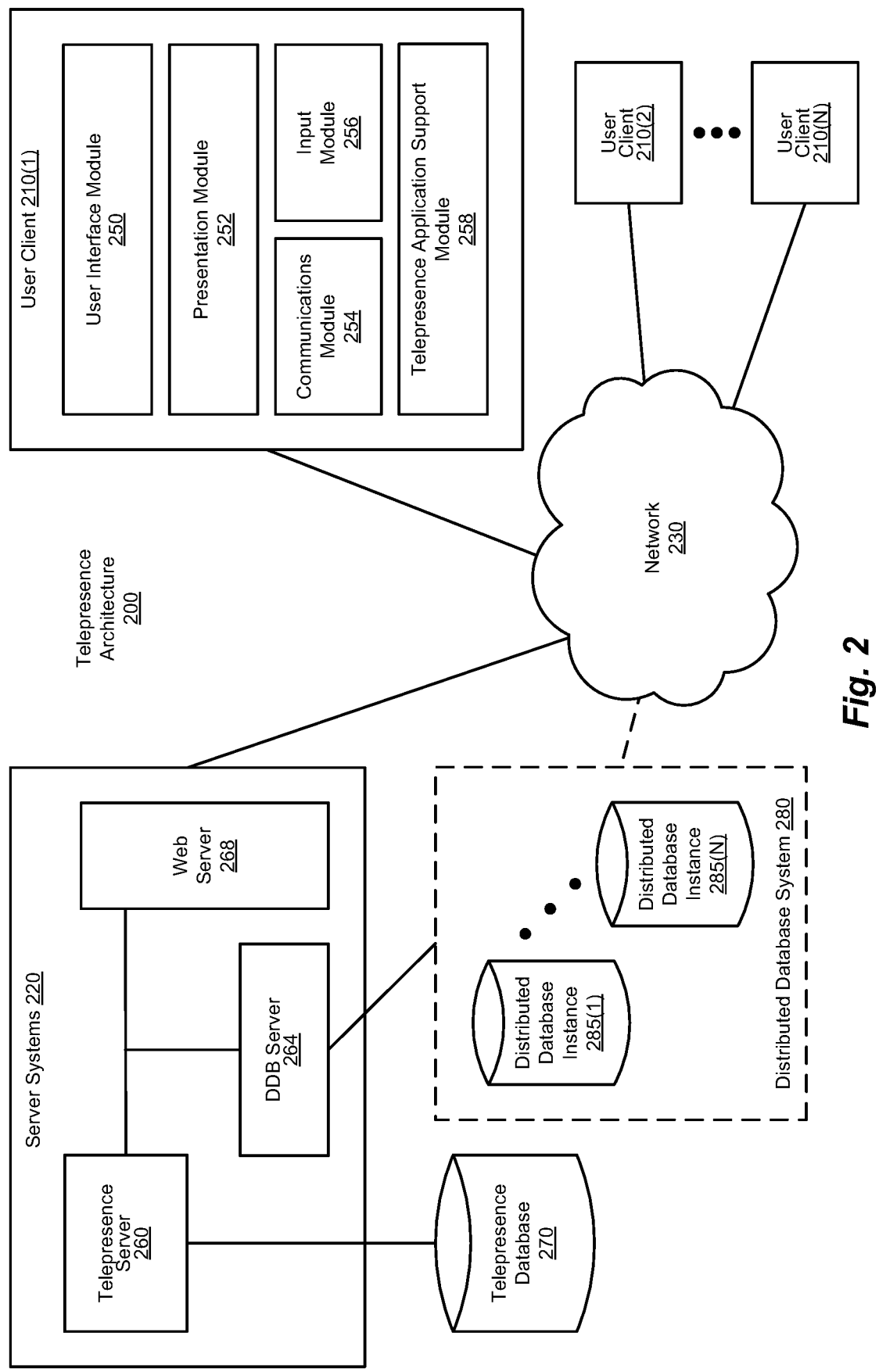
FIG. 2 is a block diagram illustrating an example of a telepresence architecture, according to methods and systems such as those disclosed herein.

FIG. 2 is a block diagram illustrating an example of a telepresence architecture, according to methods and systems such as those disclosed herein. The telepresence architecture of FIG. 2 (depicted in FIG. 2 as a telepresence architecture 200) presents a simplified illustration of the salient features of network architecture 100 with regard to certain aspects of methods and systems such as those disclosed herein. That being the case, telepresence architecture 200 is depicted as including a number of client computer systems (e.g., depicted in FIG. 2 as user clients 210(1)-(N) (in the manner of clients 125(1)-(N), among other components of FIG. 1), which are referred to in the aggregate as user clients 210) and server systems (e.g., depicted in FIG. 2 as server systems 220 (in the manner of server systems 180), which are referred to in the aggregate as server systems 220). User clients 210 and server systems 220 can be communicatively coupled to one another in telepresence architecture 200 by some manner of communications network (e.g., depicted in FIG. 2 as network 230). Each of user clients 210 can include a number of components in order to provide functionality that supports various of the features of the methods and systems described herein. To that end, user client 210(1) is shown as including a user interface module 250, which is supported by a presentation module 252. User interface module 250 and presentation module 252 serve to present a user of user client 210(1) with a user interface that implements methods and systems such as those described herein. This allows, for example, the aforementioned visual presentation of telepresence information (e.g., video, audio, chat messages, and/or the like, individually or in appropriate combination) in a user interface displayed on a display of a computer or mobile device. User client 210(1) also includes functional modules (which can be implemented in hardware, software, or a combination thereof) that implement various of the functionalities presented to the user by way of user interface module 250 and presentation module 252. For example, such functional modules can include a communications module 254, an input module 256, a telepresence application support module 258, and other such modules, as may be implemented in support of the aforementioned functionalities.

In operation, telepresence communications are supported via communications module 254, and then presented in the user interface displayed by a display user client 210(1) by way of presentation module 252 and user interface module 250. In the scenario in which a screen event occurs in a user interface (e.g., a user's session feedback is received), information regarding such an occurrence can be communicated to one or more servers of server systems 220, in a manner according to methods and systems such as those described herein. Such an event can be used as input to be gathered by a module such as input module 256. As will be appreciated, such input can, for example, reflect a user's (participant's) experience with the session in which the user participated.

During the display of telepresence information (e.g., as in the case of a videoconference or telephone conference) or in response to the display of telepresence information (e.g., as in an online chat session), a selection made by the user in the user interface presented by user interface module 250 and presentation module 252 can be received by telepresence application support module 258. As will be appreciated, communications module 254 and telepresence application support module 258 can communicate with the servers of server systems 220 via network 230, for example, in providing the telepresence management functionality described herein.

In turn, and in the manner of various of the components described in connection with FIG. 1, server systems 220 can include, for example, a telepresence server 260, a DDB server 264, and a web server 268, variously in communication with one another. Server systems 220 are supported by a number of databases storing various information in support of the functionality provided by server systems 220 to user clients 210 via network 230. These databases can include, for example, a telepresence database 270 and one or more distributed databases (e.g., depicted in FIG. 2, in the aggregate, as distributed database system 280, and more specifically, as a number of distributed database (DDB) instances 285(1)-(N)).

Telepresence database 270 can store, for example, telepresence construct information for use by telepresence server 260 in managing the telepresence sessions supported by telepresence architecture 200. Telepresence database 270 can be implemented using, for example, a document-oriented database, or document store (a computer program designed for storing, retrieving and managing unstructured data such as document-oriented information (which can be referred to as, for example, semi-structured data) and other constructs that can be used to implement/represent telepresence communications). Such a database can be implemented as a type of "NoSQL" database (a "Not only SQL" database, where the term SQL refers to Structured Query Language), and which refers to the fact that such databases extend beyond the use of tabular information, as in a traditional relational database (RDB). Such a document-oriented database can be implemented, more specifically, as one or more databases that accept documents in JavaScript Object Notation (JSON; being a subclass of document-oriented databases that are optimized to work with JSON, a lightweight data-interchange format), extended markup language (XML; being a subclass of document-oriented databases that are optimized to work with XML documents) or graph databases (which are similar, but add another layer, the relationship, which allows them to link documents for rapid traversal). Such document-oriented databases are inherently a subclass of the key-value store, which is another NoSQL database concept. One difference is the manner in which the data is processed: in a key-value store, the data is considered to be inherently opaque to the database, whereas a document-oriented system relies on internal structure in the document in order to extract metadata that the database engine uses for further optimization. Such a document database, for example, can store all information for a given object in a single instance in the database, and every stored object can be different from every other, thus eliminating the need for object-relational mapping while loading data into the database. In the present application, implementing telepresence database 270 in the aforementioned manner facilitates the storage and maintenance of unstructured information used by telepresence management systems such as those described herein (e.g., information in a variety of formats that can include machine learning parameters (e.g., weights and biases), iterative summations, thresholds, the structure of directed graphs, edge weights for such directed graphs, participant affinity information, participant engagement information, participant/organizer goals, and other such unstructured data, as is described in greater detail subsequently).

With reference to the aforementioned communications with user clients 210, it will be appreciated, in light of the present disclosure, that a user interface presented by user interface module 250 and presentation module 252 can be generated, for example, by web server 268, in conjunction with its interactions with telepresence server 260 and DDB server 264. As will also be appreciated, in providing such "back-end" functionality, telepresence server 260 and DDB server 264 access their respective databases (e.g., telepresence database 270 and distributed database system 280, respectively) in order to provide the requisite information for web server 268 to serve to user clients 210. In telepresence architecture 200, distributed database instances 285(1)-(N) maintain telepresence communications between users, and so facilitate support of the requisite volume of telepresence communications by distributed database system 280.

As will be apparent in view of the description of FIG. 2, as well as those of other of the figures, the components of telepresence architecture 200 and their interconnection (and so, intercommunication) are such that the functionalities described herein are presented in a user interface at a client computing device such as user client 210(1), in a user interface generated by user interface module 250 and presentation module 252, as noted. As also noted, communications module 254, input module 256, and telepresence application support module 258, among others, are designed in a manner to support such functionalities. Telepresence server 260 (as well as various components corresponding thereto, as described in connection with subsequent figures) provides for interaction with both telepresence database 270 (which can also be used to maintain information such as user information, organization information, event information, session information, and other such relevant information as may be advantageous to the support and operation of the systems of telepresence architecture 200, in providing such functionality), and distributed database system 280 (by way of DDB server 264; which can be used to maintain information such as that described earlier).

Figure 3:
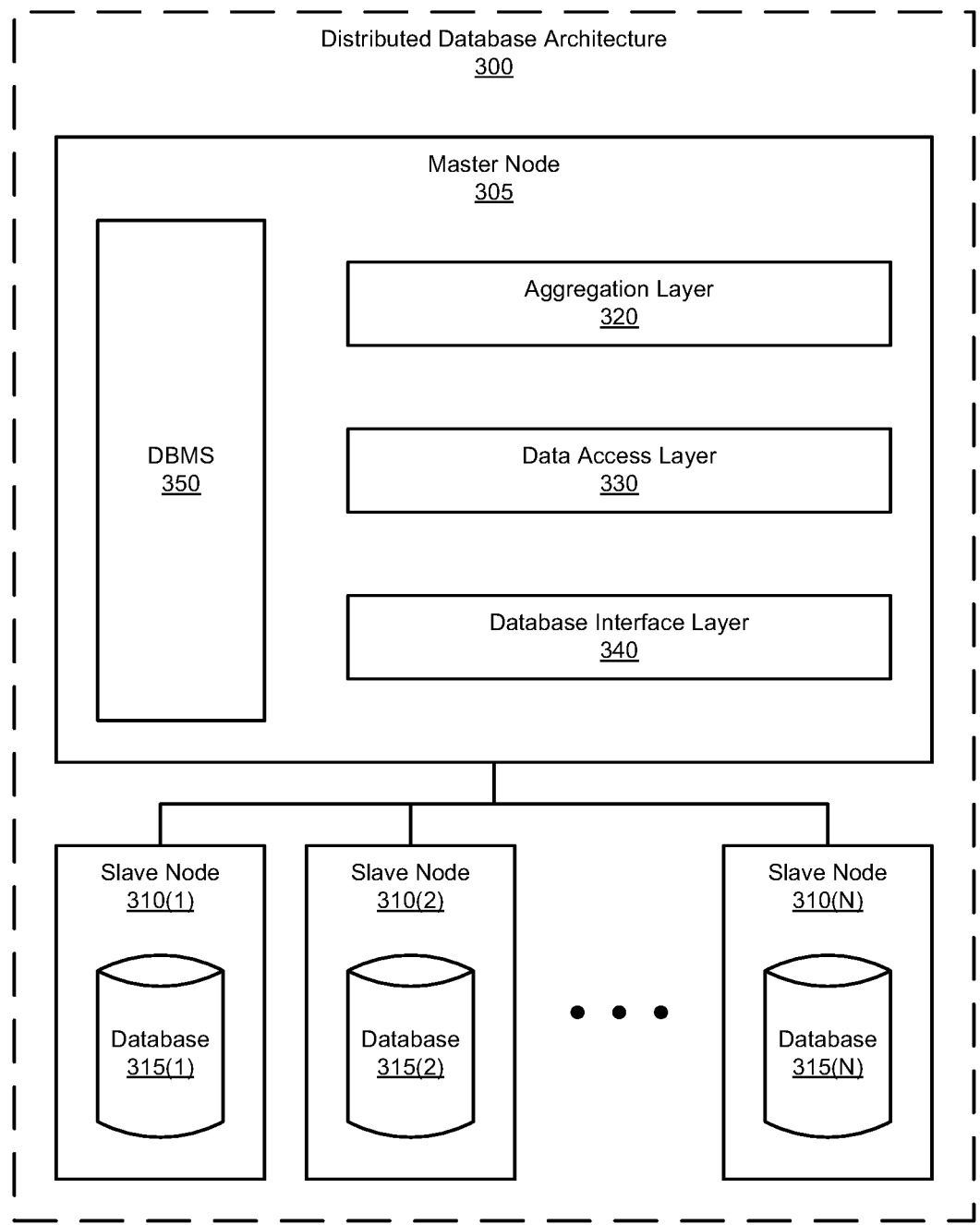
FIG. 3 is a block diagram illustrating an example of a distributed database architecture, according to methods and systems such as those disclosed herein.

FIG. 3 is a block diagram illustrating an example of a distributed database architecture, according to methods and systems such as those disclosed herein. The database server architecture of FIG. 3 (depicted in FIG. 3 as a distributed database architecture 300) can include one or more master nodes (e.g., depicted in FIG. 3 as a master node 305) and some number of slave nodes (e.g., depicted in FIG. 3 as slave nodes 310(1)-(N), and referred to in the aggregate as slave nodes 310). Slave nodes 310, in turn, can include one or more databases (e.g., depicted in FIG. 3 as databases 315(1)-(N), and referred to in the aggregate as databases 315). As noted, a distributed database architecture such as distributed database architecture 300 can be used to store and maintain a variety of information useful to the management of telepresence sessions, including, for example, machine learning parameters (e.g., weights and biases), iterative summations, thresholds, the structure of directed graphs, edge weights for such directed graphs, affinity information, engagement information, and other such information, as is described in greater detail subsequently.

Returning to master node 305, master node 305 includes an aggregation layer 320, a data access layer 330, and a database interface layer 340. As is also depicted in FIG. 3, a database management system (DBMS) 350 is implemented, for example, in master node 305, and acts to manage various of the components of distributed database architecture 300, thereby supporting the distributed nature of distributed database architecture 300. As will be appreciated in view of the present disclosure, a distributed database is a database in which storage devices are not all attached to a common processor. It may be stored in multiple computers, located in the same physical location; or may be dispersed over a network of interconnected computers. Unlike parallel systems, in which the processors are tightly coupled and constitute a single database system, a distributed database system consists of loosely coupled sites that share no physical components. System administrators can distribute collections of data (e.g. in a database) across multiple physical locations. A distributed database can reside on organized network servers or decentralized independent computers on the Internet, on corporate intranets or extranets, or on other organization networks. Because distributed databases store data across multiple computers, distributed databases can improve performance at end-user worksites by allowing transactions to be processed on many machines, instead of being limited to one.

An aggregation layer such as aggregation layer 320 facilitates the gathering and organization of information from various information sources appropriate to the information administered and maintained by server 305. For example, in certain embodiments, components within an aggregation layer of a distributed database server, as might be implemented to support a telepresence server such as telepresence server 260, receive and organize various information from one or more user clients such as user clients 210 and various of the systems of telepresence server 260. Components within an aggregation layer of a server such as DDB server 264 receive and organize information regarding various aspects of such systems, such as the various modes of communication noted. As will be appreciated in light of the present disclosure, such aggregation layers also provide, in turn, functionality that supports distribution of information such as that maintained in the databases or their respective servers.

Situated between aggregation layer 320 and database interface layer 340 is data access layer 330, which supports storage/retrieval of aggregated data to/from one or more databases (e.g., such as might be used to support various modes of communication, such as videoconferencing, telephone conferencing, chat, and so on). Data access layer 330 facilitates such storage/retrieval by using a common structure to sink and source such aggregated data. Data access layer 330 facilitates access to such databases (depicted in FIG. 3 as databases 315(1)-(N)) via database interface layer 340. Database interface layer 340 facilitates communication of aggregated data using the common structure to databases 315(1)-(N) in a structure appropriate to each of databases 315(1)-(N) and/or to databases 315, collectively. As noted, and with particular regard to the discussion of FIG. 2, an arrangement such as database server architecture 300 can be used in the implementation of servers such as telepresence server 260 and DDB server 264. To this end, an aggregation layer such as aggregation layer 320 supports the collection of information from multiple sources (e.g., communications from/to user clients 210(1)-(N)), and provides such information for storage in a respective database, via a data access layer such as data access layer 330 (which produces aggregated data in a common structure for storage, and receives data in the common format when retrieving such data) and a database interface layer such as database interface layer 340 (which takes in the aggregated data in the common structure and produces data in a structure appropriate to the database into which the data is to be stored, and conversely, provides data in the common structure when retrieving such data). Such an architecture, in turn, supports the retrieval of such data. Further, server systems such as telepresence server 260 and DDB server 264 are able to support multiple processing modules (e.g., such as those described in connection with subsequent figures), and so permit support for simultaneous interactions between multiple user clients in parallel.

Figure 4:
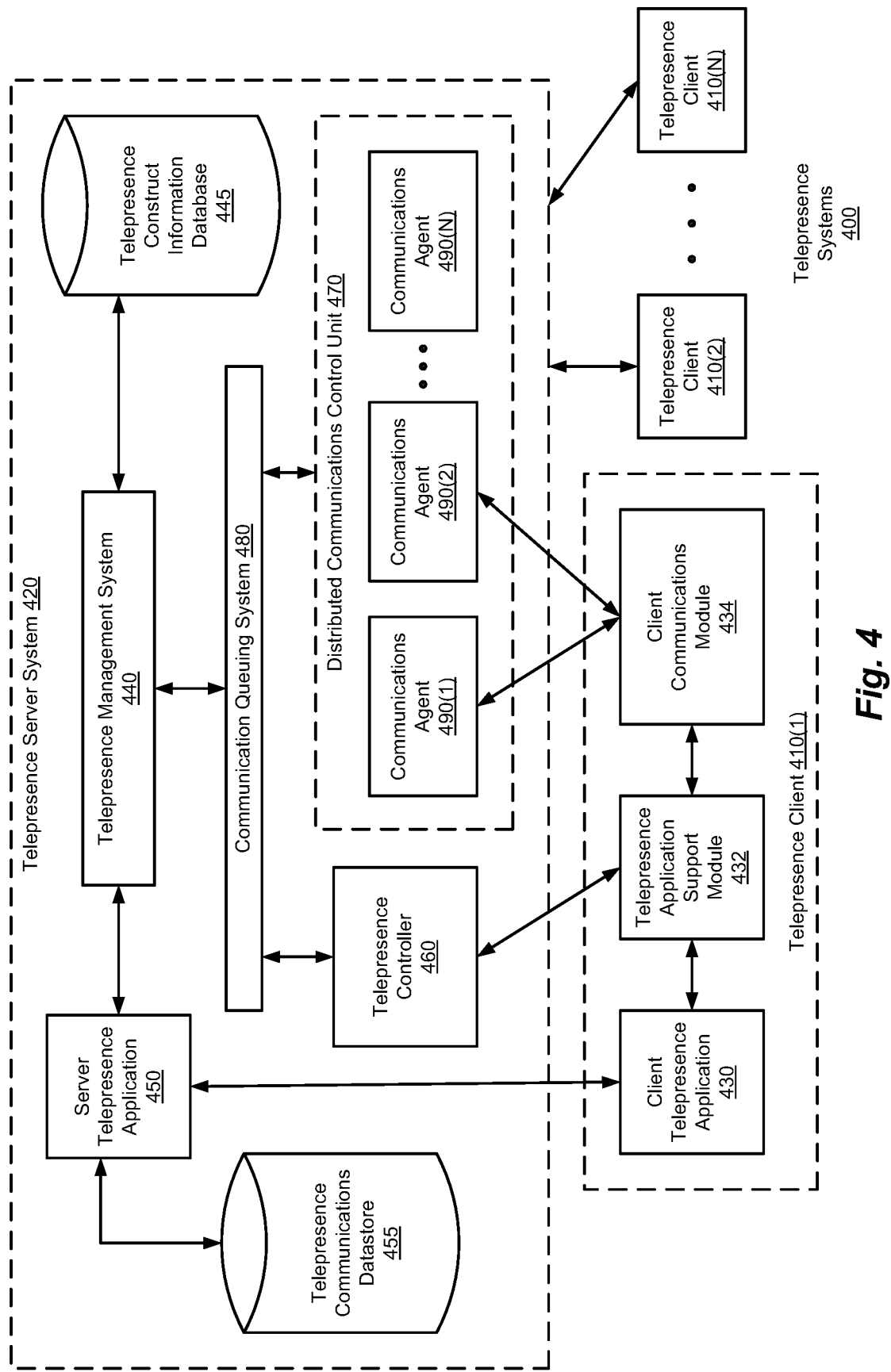
FIG. 4 is a simplified block diagram illustrating an example architecture for the implementation of telepresence systems according to methods and systems such as those disclosed herein.

FIG. 4 is a simplified block diagram illustrating an example architecture for the implementation of telepresence systems according to methods and systems such as those disclosed herein. FIG. 4 thus depicts telepresence systems 400, which include a number of telepresence clients 410(1)-(N) (referred to in the aggregate as telepresence clients 410) that are in communication with a telepresence server system 420. Telepresence clients 410 and telepresence server system 420 can communicate with one another via, for example, one or more networks (not shown). Each of telepresence clients 410 can include a number of modules that support such communications. Taking telepresence client 410(1) as an example, it can be seen that such modules can include a client telepresence application 430, a telepresence application support module 432 and a client communications module 434.

Telepresence server system 420 includes a number of components that facilitate communications between telepresence clients 410 and telepresence server system 420, as well as between various ones of telepresence clients 410. In the example depicted in FIG. 4, telepresence server system 420 includes a telepresence management system (TMS) 440 that maintains a telepresence construct information database 445, which support a server telepresence application 450 that accesses communications between telepresence clients 410 and associated information maintained in a telepresence communications data store 455.

Telepresence management system 440, as its name implies, manages telepresence events (e.g., online conferences and seminars, online social gatherings, telepresence-based technical symposia, and the like). Telepresence management system 440 breaks the event's attendees into subgroups based on participant and organizer goal sets, feedback, attributes, rule sets, and other such information, and in so doing, gives effect to the attendees' and organizer's desired outcomes by assigning attendees to appropriate subgroups in a manner that allows such subgroups' participants to effectively and efficiently interact with one another. Additionally, TMS 440 can include the ability to add a given level of randomness to such interactions, in order to more closely mimic "serendipitous" interactions that may occur in real-life events. Such a level of randomness can be hard-coded (e.g., by allowing an organizer, for example, to set the level of randomness allowed for a given telepresence event, or the level of randomness can be dynamically adjusted during the generation of the applicable participant behavioral model, as part of subgroup generation, and/or during the assignment of participants to the subgroups generated.

To maintain the requisite information, telepresence construct information database 445 can be implemented, for example, using an unstructured database capable of maintaining telepresence construct information such as that described earlier in connection with telepresence database 270, and so facilitates the storage, maintenance, and retrieval of information in various formats including, for example, machine learning parameters (e.g., weights and biases), iterative summations, thresholds, the structure of directed graphs, edge weights for such directed graphs, participant affinity information, participant engagement information, participant/organizer goals, and other such unstructured (or definitely structured) data. Telepresence construct information database 445 can maintain information, for example, that reflects the events being supported by telepresence server system 420, each event's subgroups, participants currently in those subgroups, and other related information.

Telepresence communications data store 455 maintains structured information regarding various of the communications between ones of telepresence clients 410, which can include, for example, chat messages, information regarding videoconferencing and/or audio conferencing, user information, organizer and participant information, and other such information as may be useful in allowing server telepresence application 450 to facilitate communications between various ones of telepresence clients 410. Given the storage demands of such information and the potentially large number of telepresence clients 410, telepresence communications data store 455 is implemented using a distributed database to ensure sufficient throughput and responsive performance. With regard to such communications, server telepresence application 450 facilitates such communications, as is indicated in FIG. 4 by the communications that occur between client telepresence application 430 and server telepresence application 450.

Telepresence management system 440 also communicates with telepresence clients 410 using a telepresence controller 460 and a distributed communications control unit 470. In the implementation depicted in FIG. 4, telepresence management system 440 communicates with telepresence controller 460 and distributed control unit 470 via a communication queuing system 480, which can also facilitate communications between telepresence controller 460 and distributed control unit 470. Distributed control unit 470 includes a number of communications agents (e.g., depicted in FIG. 4 as communications agents 490(1)-(N), and referred to in the aggregate as communications agents 490). Using telepresence client 410(1) as an example, communications between telepresence application support module 432 and telepresence controller 460 control telepresence communications between telepresence client 410(1) and telepresence server system 420, and in particular, communications between telepresence client 410(1) (via client communications module 434) and others of telepresence clients 410 via communications agents 490 of distributed indications control unit 470 (where various ones of communications agents 490 can support various modes of communication, such as video, audio, chat, and other such communication modes, with multiple such communications agents devoted to supporting certain modes of communications in parallel in order to effect load-balancing and maintain throughput/responsiveness). In this manner, telepresence management system 440, by communicating with telepresence controller 460 and distributed communications control unit 470 via communication queuing system 480, is able to manage one or more modes of communication between various ones of telepresence clients 410 and so provide users with efficient, effective group interactions in the context of telepresence events (rather than, for example, an organizer somehow directly signaling two attendees to communicate with one another without an intermediary service once a session has begun).

Figure 5:
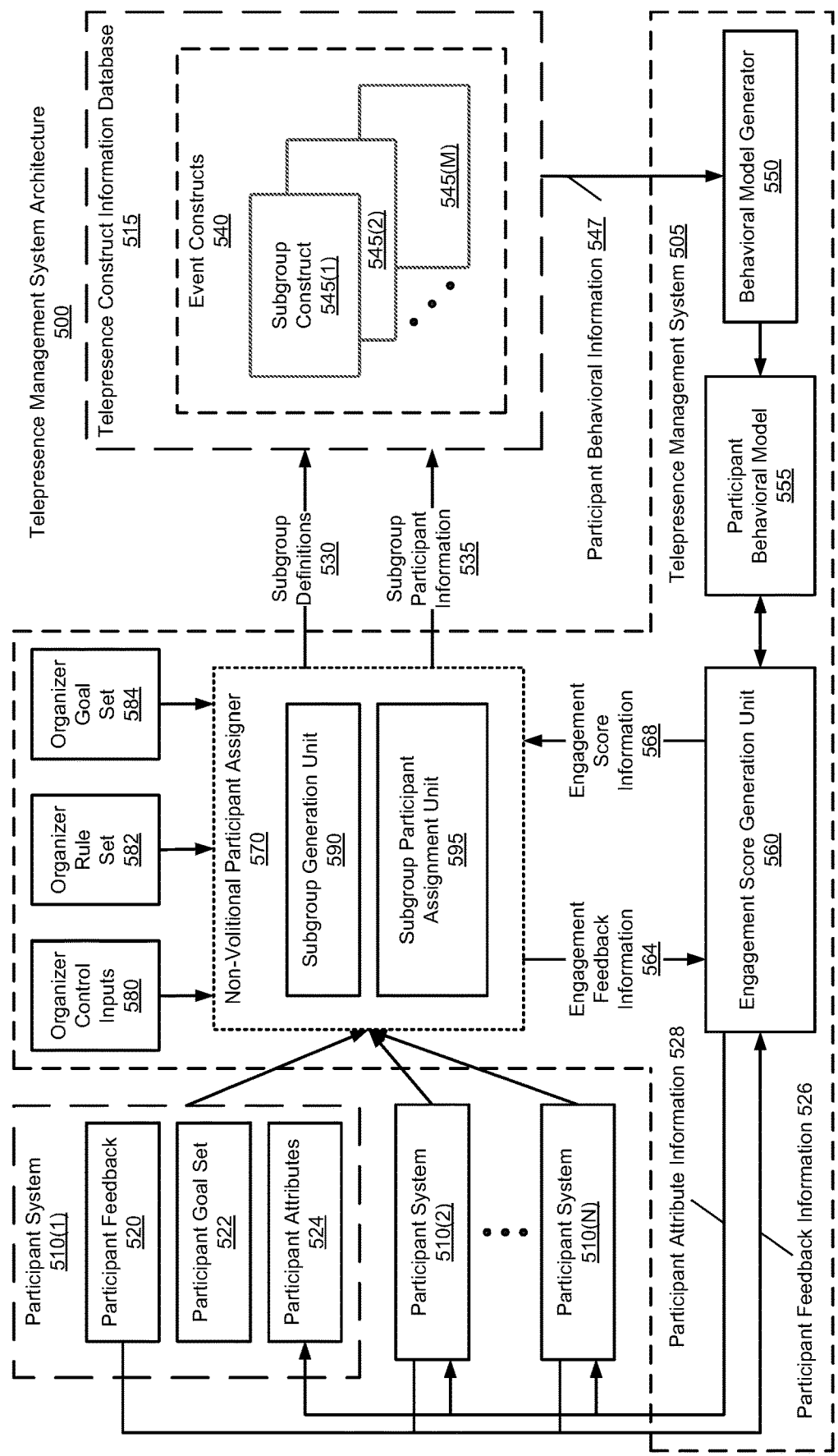
FIG. 5 is a block diagram illustrating an example of a telepresence management system architecture, according to methods and systems such as those disclosed herein.

FIG. 5 is a block diagram illustrating an example of a telepresence management system architecture, according to methods and systems such as those disclosed herein. FIG. 5 thus depicts a telepresence management system architecture 500, which implements a telepresence management system such as telepresence management system 440 of FIG. 4 as a telepresence management system 505. Telepresence management system 505 communicates variously with a number of participant systems (e.g., depicted in FIG. 5 as participant systems 510(1)-(N), and referred to in the aggregate as participant systems 510 in order to generate the appropriate subgroups, information regarding which is stored in a telepresence construct information database 515 (in the manner of telepresence construct information database 445 of FIG. 4).

In order to generate the requisite subgroups and populate those subgroups with participants (by assigning each of those participants to one of those subgroups), telepresence management system 505 receives information from each of participant systems 510 that can include, for example, participant feedback 520, participant goals set 522, and/or participant attributes 524. In certain embodiments, participant feedback such as participant feedback 520 is provided by participant systems 510 two telepresence management system 505 as participant feedback information 526. Further, telepresence management system 505 can update participant attributes stored in participant systems 510 (e.g., as participant attributes such as participant attributes 524) by providing participant attribute information 528.

As will be appreciated in light of the present disclosure, a variety of information can be taken in by NVPA 570, and an equally wide variety of processing performed thereon, examples of which are described in connection with FIG. 6, subsequently. Thus, participant attributes 524 can include a variety of characteristics, such as professional affiliations, geographic location, educational background, employment history, professional and/or social contacts, and other such information as may be useful in characterizing a given attendee's professional and/or social background. Further, a participant's reputation can be considered as a single or multidimensional parameter, which can be determined based on information prior to the telepresence event, or dynamically updated (increased or decreased) during the telepresence event. Such reputation information can also be maintained after the telepresence event (e.g., as might be desired by the organizer, for example). Further, during the event, as between participants, affinity scores and other metrics may be maintained in order to allow a determination as to the given participants' preferences indicate those participants would prefer to (or would prefer not to) participate with one another in a subgroup. Such affinity metrics can be modeled as a weighted sum, and include things like degree of connection on a social media platform, participant attributes the participants have in common, or other such participant parameters. Based on their actions as participants, the reputation of a participant, and the affinity between two participants can change during a telepresence event. For example, if one participant is known to another (perhaps as indicated by a high degree of connectivity on a social media platform) and the organizer goal is to have a greater connectivity among participants after the telepresence event, then the weight of the term capturing the degree of connectivity can be chosen to make participants who already know each other less likely to be assigned to the same subgroup.

Similarly, participant goals set 522 can reflect a given attendee's professional and/or social goals. For example, an attendee's professional goals may include interacting with certain individuals within or outside a given business organization, professional interests, learning about certain business organizations and/or businesses, and other such objectives. The information in goals set 522 can, in certain embodiments, represent the participant's desired changes to attributes, affinities, reputation, and so on, as a consequence of the event. Participants may have individual goals that are in conflict with one another's, or with the organizer's goals. For example, a first participant may desire to participate in a subgroup with a second participant as a goal, but the second participant may desire to avoid being in a group with the first participant. Similarly, a set of participants that already have a high degree of connection via social media may desire to be in subgroups with only each other, but the organizer may have a goal to increase connections with other participants and may therefore have a goal that participants be in subgroups with other participants with whom they are not already familiar.

As will also be appreciated, a variety of participant feedback 520 is possible in accordance with methods and systems such as those described herein. Such participant feedback can include, for example, a participant's opinion as to the members of a given subgroup, interactions with other participants of the telepresence event, the user-friendliness of the telepresence system, the topics discussed in the subgroups in which the participant has participated, and a wide variety of other opinions a given participant might hold. Interestingly, in a system such as that described herein, participant feedback can be received non-volitionally (by way, for example, as engagement feedback information) and/or volitionally (by way, for example, as participant feedback information), adding yet another dimension to the information that can be gleaned from participants in order to accomplish the participants' and organizers' objectives.

In generating or updating such subgroups and their participants, telepresence management system 505 provides subgroup definitions 530 and subgroup participant information 535 for maintenance in telepresence construct information database 515. As a result, telepresence construct information database 515 includes information regarding one or more subgroups (e.g., depicted in FIG. 5 as event constructs 540 (e.g., one or more data structures in which information regarding an event is stored), which include subgroup constructs 545(1)-(M) and are referred to in the aggregate as subgroup constructs 545). It is the membership of each of the participants in one of the subgroups represented by sub constructs 545 that allows the participants in a given one of those subgroups to communicate with one another. Behavioral information such as behavioral information 548 can be gleaned based on, for example, participant interactions within the subgroups represented by subgroup constructs 545.

Internally, telepresence management system 505, in certain embodiments, includes a behavioral model generator 550, which receives participant behavioral information 547 and generates (or updates) a participant behavioral model 555. Behavioral model generator 550 can, in addition or in the alternative, base such generation (or updates) on participant feedback information 526, participant attribute information 528, and/or other such information, so as to dynamically maintain participant behavioral model 555.

An engagement score generation unit 560 can access participant behavioral model 555, as well as participant feedback information 526 and engagement feedback information 564, in order to generate engagement score information 568. Engagement feedback information 564 can, in certain embodiments, be a calculated parameter that relates to how a participant's behavior in a subgroup contributes to the goal set of the organizer. For a very simple derivation of such an engagement score, one can consider a videoconference meeting among participants in a subgroup. A participant who spent the time of the subgroup meeting might be disengaged, as measured by their looking at windows on a computer screen other than the windows displaying relevant elements, and so might be given a low participation or engagement score. Similarly, advances in automatic classification of human speech and/or images of posture and body positioning may provide another strategy for the determination of engagement and participation. Also concurrent or post hoc manual scoring by other participants can be used to accumulate such engagement score information.

Engagement score generation unit 560 provides engagement score information 568 to a non-volitional participant assigner (NVPA) 570. As noted, engagement score generation unit 560 can also provide updates to participant attribute information stored as participant attributes by participants systems 510, as participant attribute information 528. In the dynamic maintenance of participant behavioral model 555, behavioral model generator 550 can monitor information (e.g., participant behavioral information, such as video information, audio information, and human interface device information, among various types of such information) in order to update participant behavioral model 555, and so facilitate changes to the participants' memberships in their various subgroups while the subgroups' sessions are in progress. In so doing, the telepresence subsystems of telepresence management system 505 are able to modify current subgroup memberships based on the engagement of the participants in those subgroups during the subgroups' sessions. For example, were the participant using participant system 510(1) in the subgroup represented by subgroup construct 545(1), a low current engagement score for that participant could serve as the basis (among other information, such as the participant goals reflected in participant goals set 522) for non-volitionally removing the participant from subgroup construct 545(1) to subgroup construct 545(2).

NVPA 570 receives engagement score information 568 and information from participants systems 510 (e.g., participant feedback such as participant feedback 520, participant goal sets such as participant goals set 522, and participant attributes such as participant attributes 524, among other such information, as may be useful in determining a preferable grouping of participants into subgroups). NVPA 570 also receives information from and regarding the organizer of the event represented by event constructs 540. Such organizer information can include organizer control inputs 580, an organizer rule set 582, and an organizer goals set 584, which may be provided on a participant-by-participant basis and/or based on the particular telepresence event, among other such information, as may be useful in accomplishing the organizer's objectives.

NVPA 570 use of organizer control inputs 580 can be geared towards control logic internal to NVPA 570 (as discussed in connection with FIG. 6) and/or as inputs to, for example, subgroup generation unit 590 and/or subgroup participant assignment unit 595, in constraining the operations performed by those components. Organizer rule set 582 can be used to provide not only internal constraints to the operations performed by the internal components of NVPA 570, but can also be used to constrain interactions between participants by controlling the assignment of those participants to the various subgroups, as well as the generation of those subgroups. To this end, organizer rule set 582 can set out constraints in the assignment of participants to subgroups, in order to promote the healthy exchange of ideas within the subgroups, to ensure that participants interact with a reasonable number of other participants, that certain participants are not assigned to subgroups with adverse participants, and/or other such constraints. Such rule sets, in certain embodiments, can be firm parameters imposed by the organizer or participant with regard to subgroup participation. For example, the organizer may specify that the event will have a fixed duration of two hours, that subgroups may have no more than five participants as members, that participants must be in a subgroup for at least a certain amount of time before they can exit the subgroup, that subgroups themselves may have a maximum duration (a session length), and so on from the perspective of a participant, there may be rules such as "the participant can only participate for one hour, even though the telepresence event lasts two hours," "my contact information is not to be shared with other participants without my explicit approval," and other such rules may be implemented With regard to organizer goals set 584, it will be appreciated that a telepresence event organizer will typically have certain goals in organizing and/or sponsoring a given telepresence event, in the same manner as attendees to that telepresence event will. Thus, a set of the organizer's goals can be considered by NVPA 570, by receiving such information as an input NVPA 570 can include, in certain embodiments, a subgroup generation unit 590 and a subgroup participant assignment unit 595. With regard to the generation of subgroups and the assignment of participants to those subgroups, it will be appreciated that subgroup generation unit 590 is tasked with generating the subgroups (as represented by subgroup constructs 545) to which the telepresence event's participants (employing corresponding ones of participant systems 510) are to be assigned, while subgroup participant assignment unit 595 is tasked with assigning those participants to their respective subgroups. That being the case, subgroup generation unit 590 generates subgroup definitions 530, while subgroup participant assignment unit 595 provides subgroup participant information 535. As noted, subgroup definitions 530 and subgroup participant information 535 are stored and maintained in the event constructs 540, in order to effect the desired subgroupings for the telepresence event. As will be discussed in connection with FIGS. 25 and 26, subsequently, such effects can reflected in directed graph information, which can, in turn, affect parameters such as machine learning biases, weights, and so on (and/or iterative summation parameters such as coefficients, thresholds, and the like). As will be appreciated, the reverse is also true—as such parameters evolve, the changes therein can affect such directed graph information.

Figure 6:
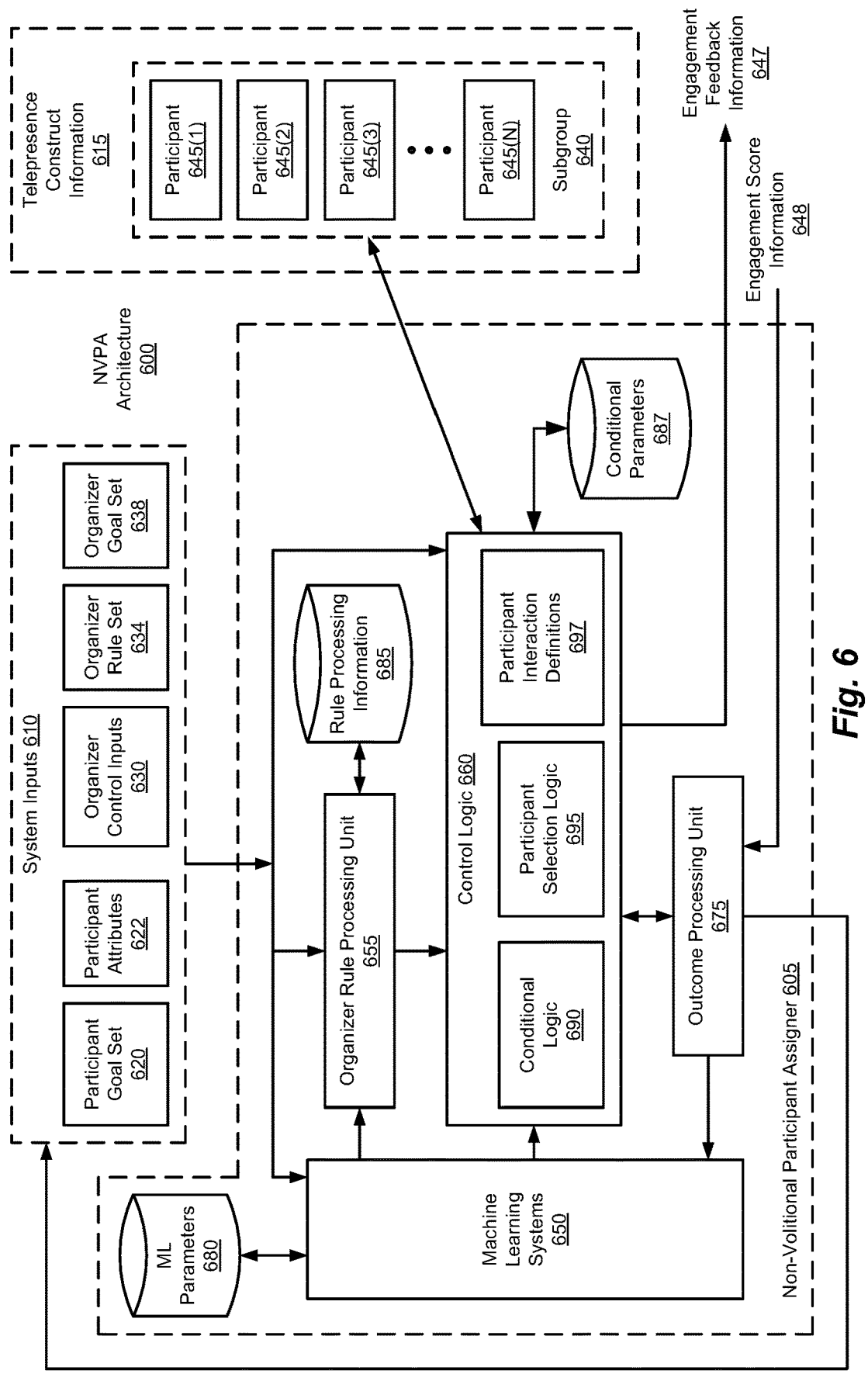
FIG. 6 is a simplified block diagram illustrating an example of a non-volitional participant assignment (NVPA) architecture, according to methods and systems such as those disclosed herein.

FIG. 6 is a simplified block diagram illustrating an example of a non-volitional participant assignment (NVPA) architecture, according to methods and systems such as those disclosed herein. FIG. 6 thus illustrates an NVPA architecture 600 that implements machine learning techniques in a non-volitionally (as well as volitionally) assign telepresence event participants to appropriate subgroups thereof. As will be appreciated in light of the present disclosure, the operations facilitated by NVPA architecture 600 can also be implemented (in combination with or in the alternative to) iterative summations techniques, as noted elsewhere herein.

NVPA architecture 600 can include a non-volitional participant assigner (NVPA) 605 that receives one or more system inputs (depicted in FIG. 6 as system inputs 610, which are representative of the various participant and organizer inputs depicted in FIG. 5) and interacts with telepresence construct information 615 (which is representative of the subgroup and event constructs stored in telepresence construct information database 515, as depicted in FIG. 5). When implemented using machine learning techniques, methods and systems such as those described herein can be implemented in an architecture such as NVPA architecture 600, and in so doing, can treat the various ones of system inputs 610 that allows for the simple addition of new inputs or the deletion of old inputs by retraining the machine learning systems therein.

System inputs 610 can thus include, for example, one or more participant goal sets (e.g., depicted as participant goals set 620) and one or more participant attributes (e.g., depicted as participant attributes 622). System inputs 610 can also include organizer information such as one or more organizer control inputs (e.g., depicted as organizer control inputs 630), one or more organizer rule sets (e.g., depicted as an organizer rule set 634), and one or more organizer goal sets (e.g., depicted as an organizer goals set 638).

As noted, NVPA 605 also interacts with telepresence construct information 615 (e.g. as might be maintained in a telepresence construct information database such as telepresence construct information database 515). The constructs in telepresence construct information 615 thus represent, for example, a subgroup 640 in which a number of participants are members (e.g., depicted as participants 645(1)-(N), and referred to in the aggregate as participants 645).

In addition to the foregoing interactions, NVPA 605 produces engagement feedback information 647, which is consumed by the TMS's system's engagement score generation unit. Conversely, NVPA 605 receives engagement score information 648 from the TMS's system's engagement score generation unit.

The information received as system inputs 610 and engagement score information 648 by NVPA 605 is provided to various components within NVPA 605, which can include machine learning systems 650, an organizer rule processing unit 655, and control logic 660. In addition to receiving one or more of system inputs 610, and the outputs of machine learning system 650 and organizer rule processing unit 655, control logic 660 is also able to access telepresence construct information 615.

In providing updated information to control logic 660, machine learning systems 650 can receive engagement score information 648 and/or the results of outcome processing of engagement score information 648 by an outcome processing unit 675, which can allow the results presented to machine learning systems 650 to be interpreted with regard to their sufficiency. Machine learning systems 650 are also able to maintain machine learning parameters (depicted in FIG. 6 as machine learning parameters 680), which can include parameters such as the weights and biases employed in certain machine learning techniques, function definitions, and other such machine learning parameters.

In a similar fashion, organizer rule processing unit 655 can receive one or more system inputs 610, one or more outputs of machine learning system 650, and/or outcome information (whether in its original form or after outcome processing by outcome processing unit 675; not shown in FIG. 6 for the sake of simplicity). Organizer rule processing unit 655 maintains organizer rules and other related information in rule processing information 685.

Similarly, control logic 660 maintains one or more conditional parameters as conditional parameters 687, which can reflect, for example, information regarding organizer control inputs 630. Conditional parameters 687 can include information regarding which actions are applicable in a given situation, the possible ordering of those actions, next action probabilities (e.g., the probability of an action following a given action, as might be the case with regard to the effects of the given participant being reassigned to a different subgroup), and other such action characteristics. Control logic 660, in the embodiment depicted in FIG. 6, includes conditional logic 690 and participant selection logic 695. In the manner noted, participant selection logic 695 identifies and selects one or more participants to be assigned to the subgroup in question. Conditional logic 690 uses the information in conditional parameters 687 to construct and/or update the relationships between the actions taken in the assignment of participants to the various subgroups. And through the operations effected by action selection logic 695 and conditional logic 690, and one or more participant interaction definitions 697 can be created and/or updated.

Figure 7:
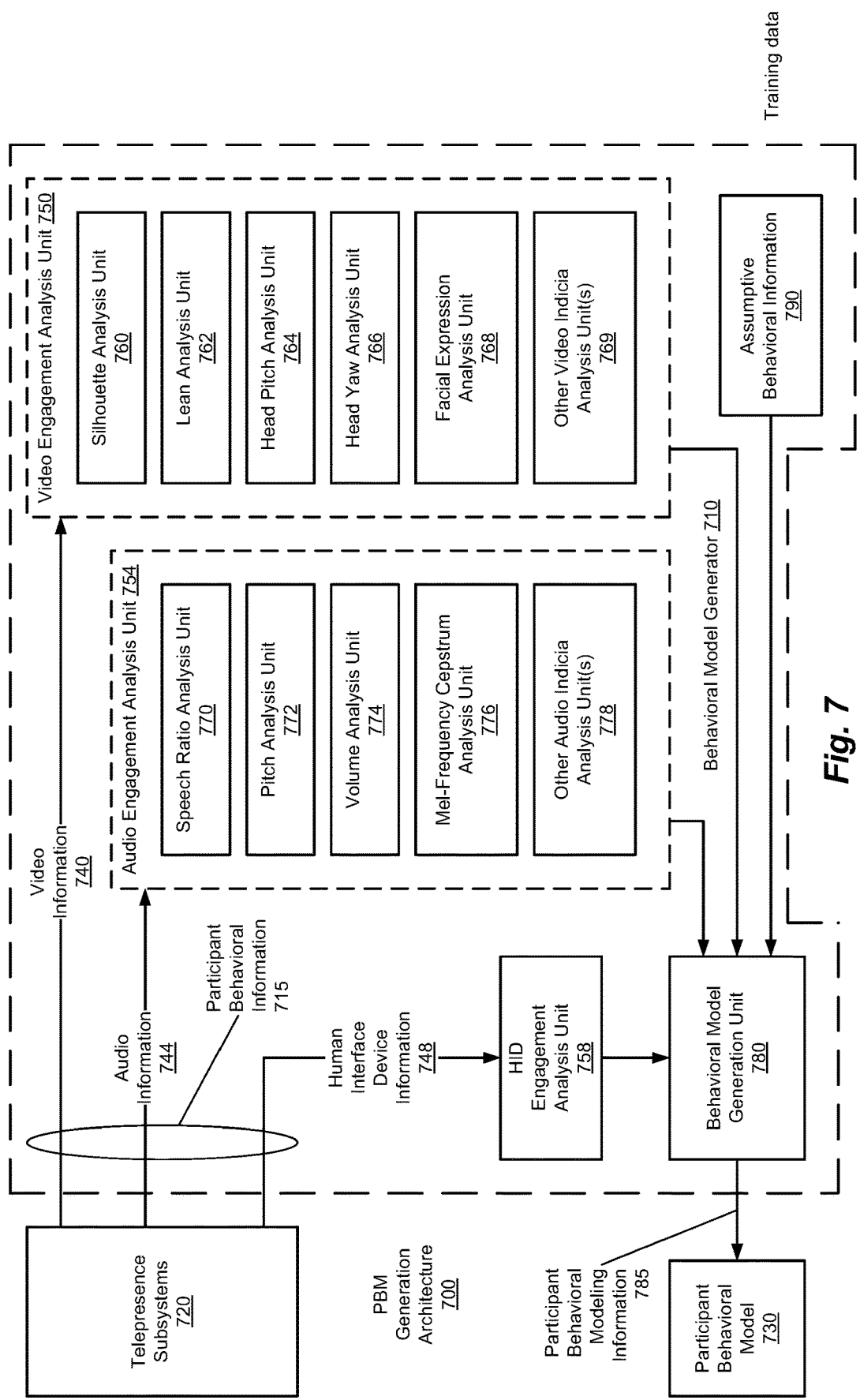
FIG. 7 is a block diagram illustrating an example of a participant behavioral model (PBM) generation architecture, according to methods and systems such as those disclosed herein.

FIG. 7 is a block diagram illustrating an example of the generation of a participant behavioral model (PBM) generation architecture, according to methods and systems such as those disclosed herein. FIG. 7 thus depicts a PBM generation architecture 700 in which a behavioral model generator 710 receives participant behavioral information 715 from one or more telepresence subsystems 720, and, in turn, generates a participant behavioral model 730. In terms of the components depicted in FIG. 5, telepresence subsystems 720 are intended to include one or more of participant systems 510 and the information they provide, participants' interactions as effected via telepresence construct information database 515 (and the event constructs, subgroup constructs, and other such constructs therewithin, as might be provided to behavioral model generator 550 as behavioral information 547), participant feedback information 526 (whether received directly or via an engagement score generation unit such as engagement score generation unit 560), and/or other such sources of information with bearing on participant behavioral model 730. As will be appreciated in light of the present disclosure, the participant behavioral model generated by behavioral model generator 710 (participant behavioral model 730) is comparable to that depicted in FIG. 5 as participant behavioral model 555.

In order to generate participant behavioral model 730, behavioral model generator 710 receives, as noted, participant behavioral information 715. Participant behavioral information 715 can include, for example, video information 740, audio information 744, and/or human interface device (HID) information 748. In certain embodiments, video information 740 can include information gleaned from a participant's video feed, as might be available from a participant system's video camera during a session in which the user is a participant. Similarly, audio information 744 can include information gleaned from a participant's audio feed, as might be available from a participant system's microphone during such a session. Further in this regard, HID information 748 can include HID information gleaned from a participant's use of the HIDs of the participant system used to participate in the given telepresence event, as might be available from a participant system's HIDs during such a session. In so doing, the subsystems of behavioral model generator 710 are able to analyze a given participant's behavior, and update behavioral model 730 appropriately, such that an engagement score generation unit such as engagement score generation unit 560 is able to use participant behavioral model 730, potentially in combination with other information, to model one or more participants' behavior and so generate an engagement score (e.g., as might be included in engagement score information 568), thereby allowing an NVPA such as NVPA 572 more advantageously generate subgroups and assign participants thereto.

To this end, behavioral model generator 710 includes a video engagement analysis unit 750, an audio engagement analysis unit 754, and an HID engagement analysis unit 758. As will be appreciated, video information 740 is fed into video engagement analysis unit 750 in order to gauge a participant's engagement in the given subgroup's session, based on various analyses of video information 740. To this end, subsystems of video engagement analysis unit 750 can include, for example, a silhouette analysis unit 760, a lean analysis unit 762, a head pitch analysis unit 764, a head yaw analysis unit 766, a facial expression analysis unit 768, and/or one or more other video indicia analysis unit(s) 769. Other information can also be received as input and analyzed. For example, the gesture of covering a person's suprasternal notch might be considered as a high-reliability indicator of unease. These and other potential nonverbal signals could be analyzed (e.g. as by artificial intelligence) and used as further sources of guidance in determining the experience had by a participant in the given subgroup to which the participant's been assigned.

In a similar fashion, audio information 744 is fed into an audio engagement analysis unit 754 in order to gauge a participant's engagement in the given subgroup's session, based on various analyses of audio information 744. To this end, subsystems of audio engagement analysis unit 754 can include, for example, a speech analysis unit 770, a pitch analysis unit 772, a volume analysis unit 774, a Mel-Frequency Cepstrum (MFC) analysis unit 776, and/or one or more other audio indicia analysis unit(s) 778. Here again, the analyses presented herein are simply examples of the types of information and the analyses performed on that information that might be employed to good effect with regard to the audio information analyzed. For example, a simple talk/listen ratio, the use of certain terminology after speech-to-text conversion, and other such indicators might be analyzed to good effect in determining the level of engagement of the given participant.

The outputs of video engagement analysis unit 750, audio engagement analysis unit 754, and HID engagement analysis unit 758 are fed into a behavioral model generation unit 780. Behavioral model generation unit 780 employees techniques such as machine learning, iterative summations, and/or thresholding in order to generate participant behavioral modeling information 785, which is then user to update participant behavioral model 730. During initialization, such outputs are typically not available from participants (such participants having not interacted with one another, although participant preferences, participant goals, participant attributes, and the like may be available prior to an event's being held). In such situations, existing information in the form of assumptive behavioral information 790 can be employed to initialize the telepresence management system in question by allowing behavioral model generation unit 780 to generate an (expected) participant behavioral model for use as participant behavioral model 730 (in the manner of a starting point for use by an engagement score generation unit and NVPA, such that these telepresence management subsystems are able to generate subgroups for population with the event's attendees as participants).

In the manner noted, the dynamic maintenance of participant behavioral model 730, behavioral model generation unit 780 can monitor information (e.g., participant behavioral information 715, such as video information 740, audio information 744, and HID information 748, among various types of such information, via the analysis thereof) in order to update participant behavioral model 730, and so facilitate non-volitional changes to the participants' memberships in their various subgroups while the subgroups' sessions are in progress. In so doing, the telepresence subsystems 720 are able to dynamically modify current subgroup memberships based on the engagement of the participants in those subgroups, while sessions are ongoing.

Figure 8:
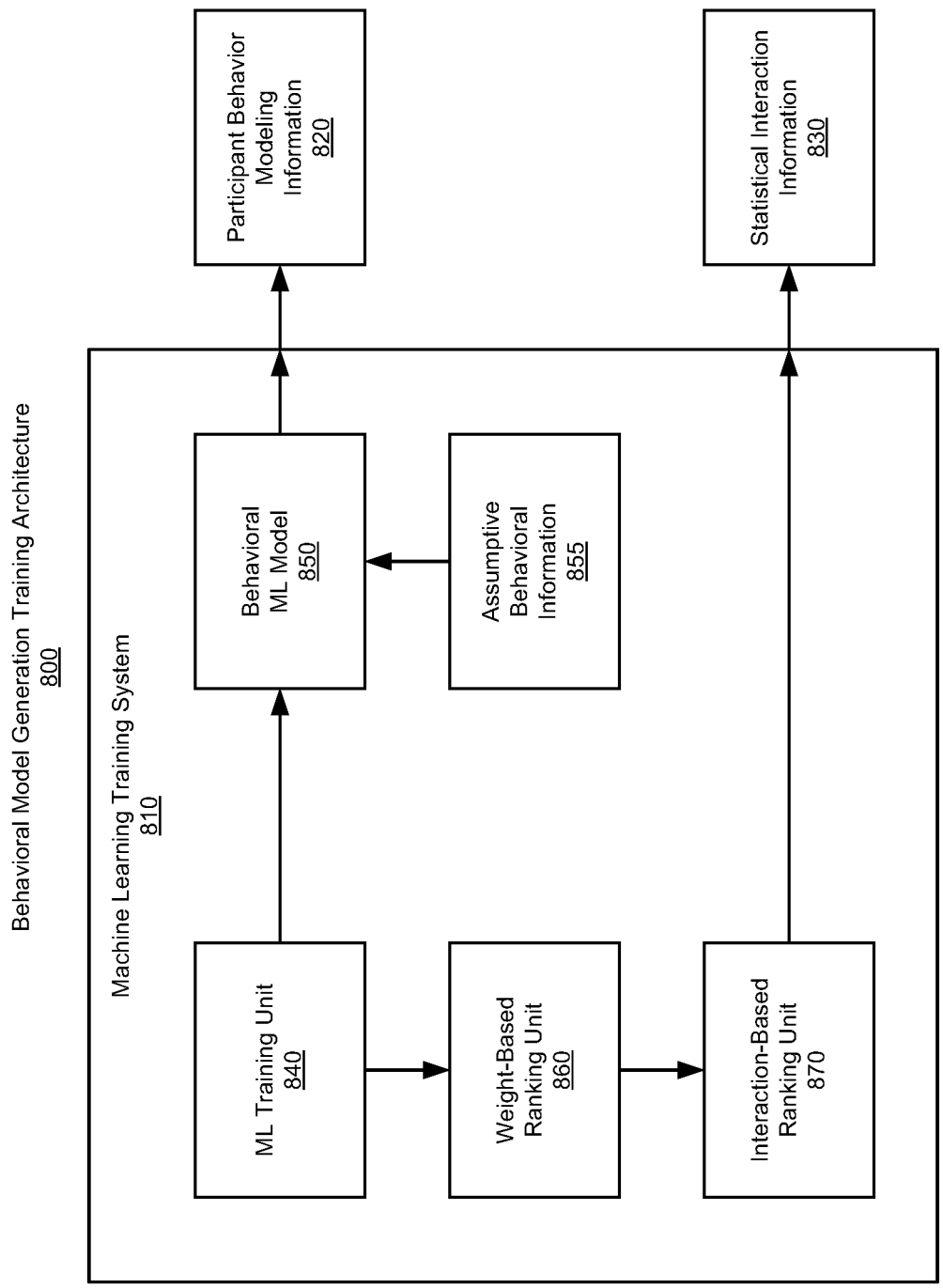
FIG. 8 is a simplified block diagram illustrating an example of a behavioral model generation training architecture, according to methods and systems such as those disclosed herein.

FIG. 8 is a simplified block diagram illustrating an example of a behavioral model generation training architecture, according to methods and systems such as those disclosed herein, as might be used to train behavioral model generation unit 780. FIG. 8 thus depicts a behavioral model generation training architecture 800, which includes a machine learning training system 810. Machine learning training system 810 generates participant behavior modeling information 820 and statistical interaction information 830.

In order to generate participant behavior modeling information 820 and statistical interaction information 830, machine learning training system 810 includes a machine learning (ML) training unit (depicted in FIG. 8 as an ML training unit 840), which is communicatively coupled to a machine learning model (depicted in FIG. 8 as a behavioral ML model 850) that also can take as input assumptive behavioral information 855, in the manner of assumptive behavioral information 780 of FIG. 7. In one implementation, ML training unit 840 is implemented using a multilayer perceptron (MLP) architecture that employs regularization. As such, ML training unit 840 can be a feedforward artificial neural network model that maps large sets of input data (e.g., information regarding various engagement characteristics, as might be produced by the various analysis units depicted in FIG. 7) onto a set of appropriate outputs. As will be appreciated in light of the present disclosure, assumptive behavioral information 855 can include various (expected) values for various of these engagement characteristics. ML training unit 840 can include multiple layers of nodes in a directed graph, with each layer fully connected to the next. Except for the input nodes, each node acts as a neuron (or processing element) with a nonlinear activation function. As will be further appreciated, MLP techniques can provide salutary effects in the methods and systems such as those described herein due at least in part to the ability of such techniques to solve problems stochastically, which is able to allow approximate solutions for extremely complex problems such as fitness approximations of the engagement characteristics described herein. Such MLP techniques are well-suited to situations such as those considered herein, at least as a result of the large number of parameters involved in each of the possible factors affecting application behavior in these various circumstances, particularly when interactions between such parameters are considered. That being the case, such solutions can facilitate not only improvements in the application's behavior, but also in the efficiency and overall accuracy of the process by which such solutions are reached.

ML training unit 840 thus receives inputs from ML training unit 840 and assumptive behavioral information 855. Such information can include the attributes, potential feedback, and other such parameters impacting application behavior within the telepresence event environment. ML training unit 840 determines the impact of such factors on application behavior with respect to the event environment in question, and maps such attributes, potential feedback, and other factors affecting participant behavior as data sets, onto corresponding output sets. Such output sets can include individual parameters, attributes, and other factors that can impact participant behavior, as well as combinations of factors impacting participant behavior. ML training unit 840 generates a machine learning model (depicted in FIG. 8 as a behavioral ML model 850), and so is communicatively coupled thereto. ML training unit can perform such generation by mapping the aforementioned output sets onto behavioral ML model 850 as an MLP model. In so doing, such mapping of the output sets into the MLP model is dynamic and automatic, and so can be accomplished without human intervention.

That being said, behavioral ML model 850 will typically take assumptive behavioral information 855 as input. Behavioral ML model 850 can thus include data that is based on organizer-provided data (e.g., simulated and/or expected data), as part of the training operations performed. One or more constraints may also be set, such as might be effected by organizer rules, organizer goals, participant goals, and the like, in order to meet the organizer's behavioral goals and participants' desires. ML training unit 840 can then vary one or more configuration parameters, environmental parameters, and/or other parameters to address such constraints.

Behavioral ML model 850 can thus map output sets to generate an MLP model. Behavioral ML model 850 will typically include multiple layers of nodes in a directed graph or graphs, with each layer fully connected to the next. This neural network can be used to identify predicted application behaviors (e.g., application response times), and can account not only for the given set of parameters, but also the interactions between such parameters. For example, such a model can be used to predict participant behavior based on parameters and/or changes to parameters within the given environment. Behavioral ML model 850, having interacted with ML training unit 840 and having received assumptive behavioral information 855, can then be used to produce participant behavior modeling information 820. As will be appreciated in light of the present disclosure, a determination can be made as to whether participant behavior modeling information 820 appears to be sufficiently accurate (e.g., such that a given threshold for accuracy is met or exceeded). In this manner, a feedback loop of sorts is effected, wherein behavioral ML model 850 can be adjusted based on the sufficiency of participant behavior modeling information 820, in order to arrive at a machine learning model that provides the requisite level of appropriate subgroupings in its output. The information that results can then be used to inform a participant behavior model such as participant behavior model 555 (e.g., in its initial use for a given event and set of attendees (participants)).

ML training unit 840 also provides information to a weight-based ranking unit 860, which uses this information to generate weighting information. Such weight-based ranking is described in further detail in connection with FIG. 9, subsequently. ML training unit 840 communicates information, such as the impacts on participant behavior that have been determined, to weight-based ranking unit 860. Weight-based ranking unit 860 assigns a weight to each parameter based on the parameter's impact on the given participant's behavior(s) within the environment in question. Weight-based ranking unit 860 assigns a weight to each interaction of the parameters with the environment based on the interaction's impact on the participant's behavior. Weight-based ranking unit 860 then compares interactions between participants based on a set of parameters within a first set of subgroupings with interactions between participants based on the set of parameters within a second set of subgroupings, and also compares such interactions as between the second set of subgroupings and a third set of subgroupings, and so on. As will be appreciated in light of the present disclosure, the impact of changes in such interactions, in light of multiple parameters for a given telepresence event can thus be determined.

Weight-based ranking unit 860 can, for example, assign a magnitude value of weight based on the impact on a given participant's expected interactions in a given subgroup. A larger weight value is assigned to a first interaction (producing a larger impact on the organizer's and participant's goals) than a second interaction (producing a smaller such impact). For example, the parameters can include changes to a given subgroup's participants, effects on other subgroups, and expected participant feedback. Weight-based ranking unit 860 could assign, for example, a first weight to the organizer's goals, a second weight to the participant's goals, a third weight to other participants' goals, and a fourth weight to the host's expected feedback, based on each parameter's impact on the overall feedback for the event. The ranking of interactions by weight-based ranking unit 860 is then performed by interpreting the weights assigned to the interactions. Weight-based ranking unit 860 provides these results to an interaction-based ranking unit 870.

Interaction-based ranking unit 870 ranks the weighted interactions based on the magnitudes of the weights produced by weight-based ranking unit 860. Interaction-based ranking unit 870 determines a strength for each weighted interaction/factor. That being the case, a first weighted interaction having a larger magnitude than a second weighted interaction is assigned a higher order in the ranking. The strengths assigned to the interactions produced by interaction-based ranking unit 870 can be stored as statistical interaction information 830. Statistical interaction information 830 thus represents the nature of the interactions between the various participants, and their effects on participant behavior in subsequent subgroupings, from statistical perspective.

Figure 9:
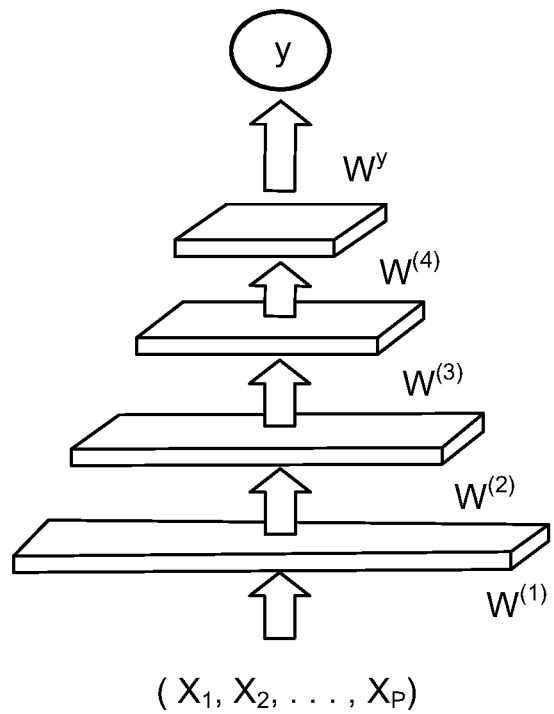
FIG. 9 is a simplified diagram illustrating an example of an interaction ranking system for ranking component interactions based on weighted interactions, according to methods and systems such as those disclosed herein.

FIG. 9 is a simplified diagram illustrating an example of an interaction ranking system for ranking component interactions based on weighted interactions, according to methods and systems such as those disclosed herein. FIG. 9 thus illustrates an interaction ranking system 900 including the ranking interactions by interpreting one or more weight components. The ranking of such interactions by interpreting weight components assigns weights to each of the attributes or parameters that impact the given participant's behavior within a given subgroup, and resulting application behavior in an alternate subgrouping (e.g., within a subgroup having different participants as members), for example. The of ranking such interactions using weight components assigns weights to each interaction/combination of two or more attributes/parameters that may have a meaningful impact on the participant's behavior within the alternate subgrouping. For example, the attributes or parameters can be associated with the participants in the subgroup, participants not in the subgroup, the host of the subgroup, and/or be subject matter to which the telepresence interactions are expected to be directed. A ranking unit (e.g., interaction-based ranking unit 870 of FIG. 8) assigns a weight to each such factor within each of the subgroupings.

The ranking unit can assign a weight to interactions between participants, but can also consider interactions between the attributes, parameters, and other such characteristics of the participants. Weights are assigned based on the impact of the given attribute(s), parameter(s), interactions, and or the like, as well as one or more combinations thereof. Through the use of machine learning systems such as those described herein, the ranking unit is able to rank such attributes, parameters, and their interactions based on the assigned weights. The weighted attributes, parameters, interactions, and the like, which can be used to rank their impacts on participant behavior. A magnitude value can be assigned to the weighted attributes, parameters, and interactions, and so the weighted attributes, parameters, and interactions can be ranked based on their magnitude values.

For example, as shown in FIG. 9, XI can represent the attribute, the parameter, or the interaction as an input to the ranking interactions by interpreting the weights components shown as part of interaction ranking 906, where I=1, 2, . . . P. In this example, X1, X2, . . . XP are treated as interactions between various combinations of participants. The variable Y can be treated as the impact on the organizer's and participants' expected feedback regarding the subgrouping, where Y=1, 2, . . . y. W(1), W(2), . . . Wy are thus the weights assigned to the interactions according to their impact on this feedback. By assigning the weights to the attributes, parameters, and interactions, changes in such feedback resulting from various subgroupings can be used by the machine learning system to predict feedback (and so participant behavior) for the given subgrouping.

Figure 10:
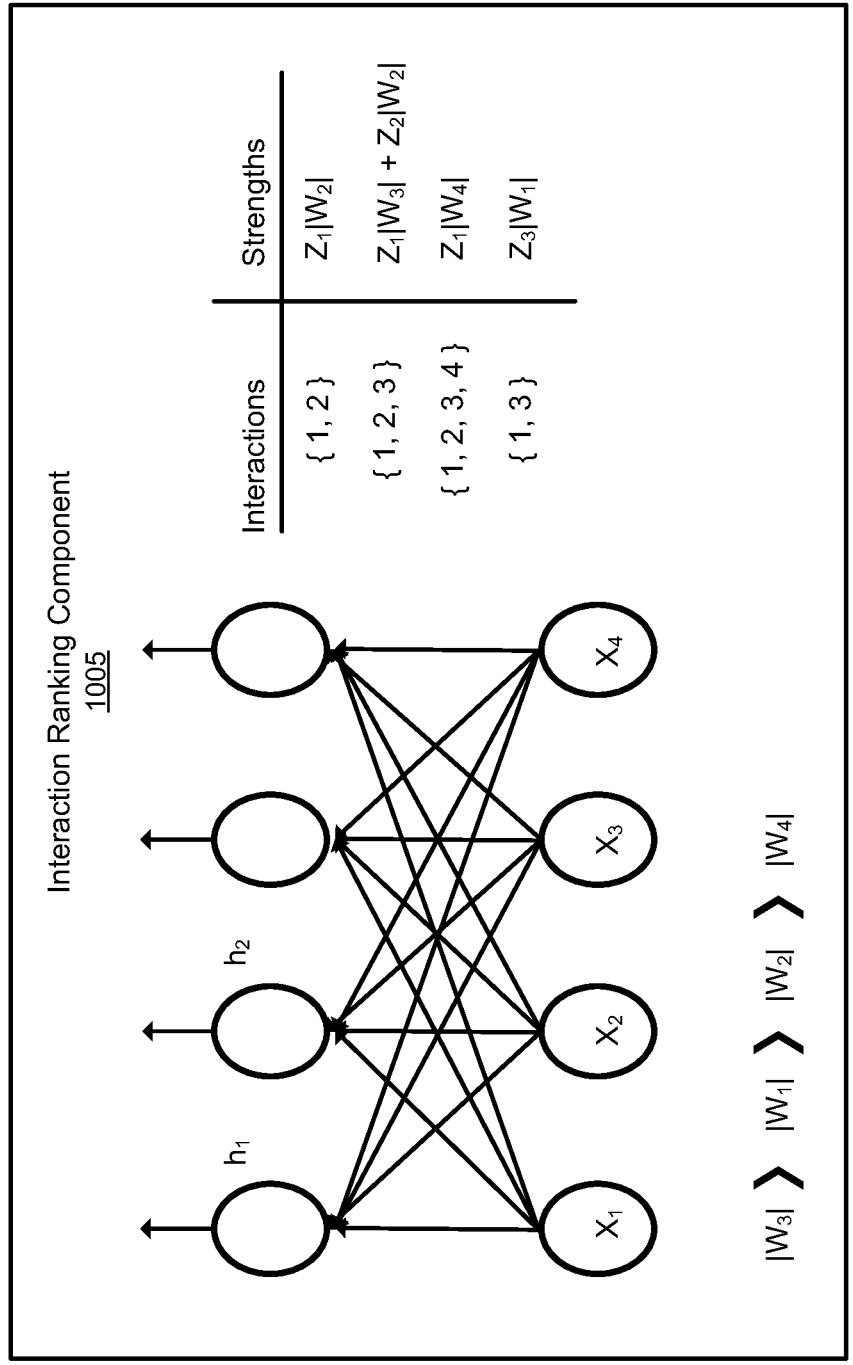
FIG. 10 is a simplified diagram illustrating an example of a higher-order ranking system for ranking attributes, parameters, and interactions based on their impacts on application behavior, according to methods and systems such as those disclosed herein.

FIG. 10 is a simplified diagram illustrating an example of a higher-order ranking system for ranking attributes, goals, expected participant interactions, and other such parameters based on their impacts on participant behavior, according to methods and systems such as those disclosed herein. FIG. 10 thus depicts a higher-order ranking system 1000 that includes an interaction ranking component 1050. Interaction ranking component 1050 ranks the attributes, goals, expected participant interactions, and other such parameters as higher-order interactions based on their strengths (their impacts on the participant behaviors). The attributes, goals, expected participant interactions, and other such parameters are, in this example, treated as the inputs $X_1$, $X_2$, $X_3$, and $X_4$. For example, the $X_1$, $X_2$, $X_3$, and $X_4$ inputs can be factors such as engagement characteristics (video information, audio information, HID information, and/or the like), organizer goals, participant goals, participant attributes, and other such factors. $W_1$, $W_2$, $W_3$, and $W_4$, in this example, are the weights corresponding to the inputs $X_1$, $X_2$, $X_3$, and $X_4$. Z, in this example, is a factor applied to the inputs based on the type of the attribute or parameter. For example, a first factor can be applied to organizer goals and a second factor can be applied to participant goals, and so on. Interaction ranking component 1050 ranks the interactions of the inputs $X_1$, $X_2$, $X_3$, and $X_4$ higher-order interactions (such as $h_1$, $h_2$, . . . ) based on the strengths, such as the magnitude value of the impact on the participant behavior.

Figure 11:
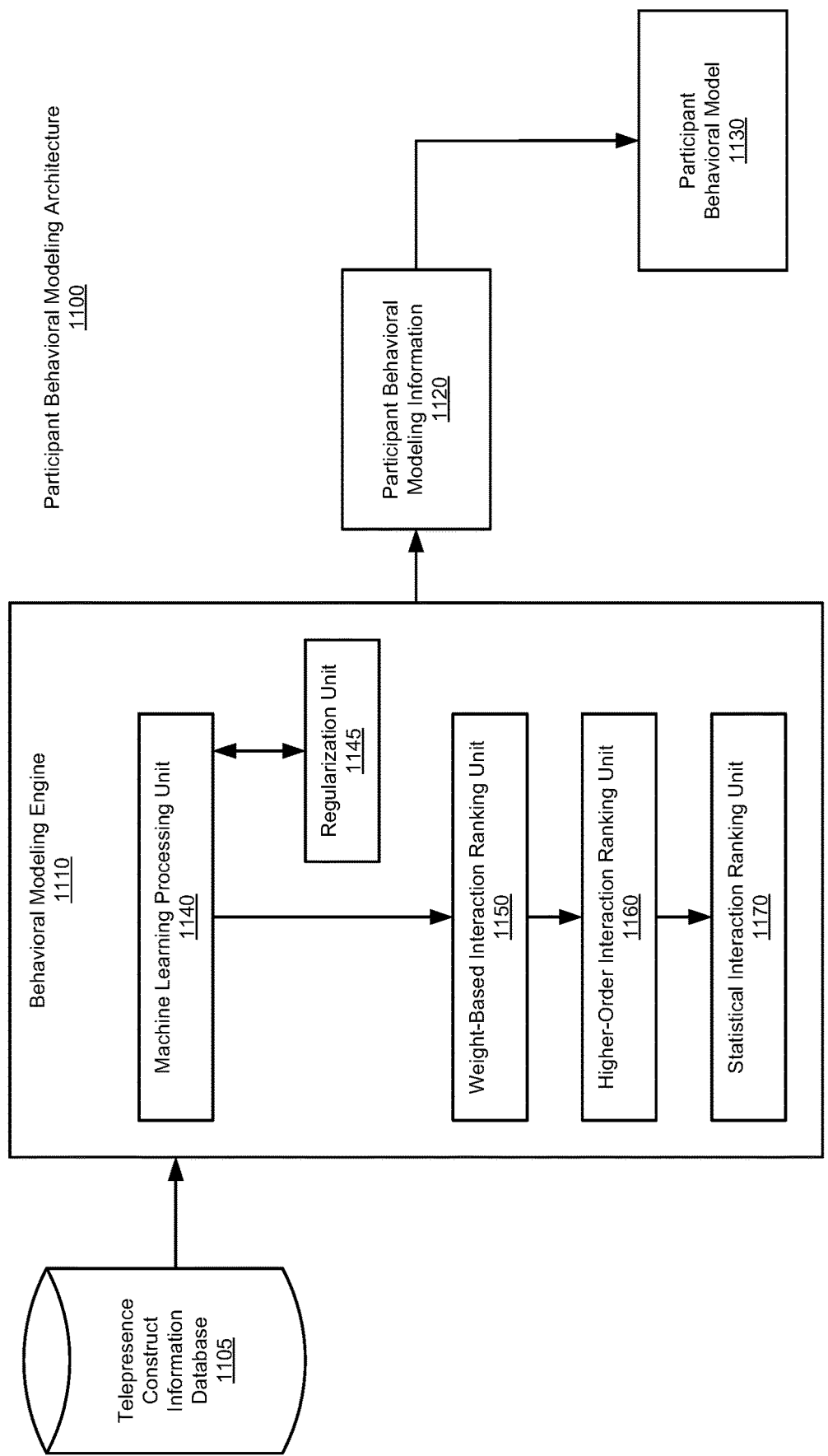
FIG. 11 is a simplified block diagram illustrating an example of a behavior prediction architecture, according to methods and systems such as those disclosed herein.

FIG. 11 is a simplified block diagram illustrating an example of a behavior modeling architecture, according to methods and systems such as those disclosed herein. FIG. 11 thus depicts a participant behavioral modeling architecture 1100. As will be appreciated in light of the present disclosure and FIG. 11, participant behavioral modeling architecture 1100 can be implemented, for example (and more specifically), as a multi-layer perceptron (MLP) machine learning architecture. Information from a telepresence construct information database 1105 provides telepresence event information to a behavioral modeling engine 1110. In turn, behavioral modeling engine 1110 produces participant behavioral modeling information 1120 (which can be, e.g., an MLP model). Results from the processing of participant behavioral modeling information 1120 can then be made available as a participant behavioral model 1130, in the manner of participant behavioral model 555.

In order to produce the requisite information for ingestion as participant behavioral model 1130, behavioral modeling engine 1110 includes a machine learning processing unit 1140, which can be implemented, for example, as a multi-layer perceptron (MLP) processing unit. Machine learning processing unit 1140 is coupled to communicate with a regularization unit 1145. Regularization unit 1145, in certain embodiments, implements a process of adding information to that received by machine learning processing unit 1140, in order to address problems with insufficiently defined information (in behavioral modeling engine 1110, for example, a lack of certain measurements, parameters with excessive variability, and the like) and/or to prevent overfitting (the production of an analysis that corresponds too closely or exactly to a particular set of data, and may therefore fail to fit additional data or predict future observations reliably; in behavioral modeling engine 1110, for example, scenarios in which machine learning model 1120 would otherwise be tied too closely to a given factor such that the model's overdependence on that factor would result in an unacceptably high sensitivity to changes in that factor, as between alternative subgroupings). For example, an MLP network with large network weights can be a sign of an unstable network, where small changes in the input can lead to large changes in the output. This can be a sign that the network has "over fit" the training dataset, and so is more likely perform poorly when making predictions on new data. A solution to this problem is to update the learning algorithm to encourage the network to keep the weights small. This is called weight regularization and it can be used as a general technique to reduce overfitting of the training dataset and improve the generalization of the model. As will be appreciated in light of the present disclosure, given the potential for wide variability in factors such as organizer and participant goals, participant feedback, participant attributes, and other such factors, the benefits of regularization in applications such as those described herein will be evident.

In support of the generation of participant behavioral modeling information 1120 (and so, participant behavioral model 1130), ML processing unit 1140 also produces information that is communicated to a weight-based interaction ranking unit 1150. Weight-based interaction ranking unit 1150 generates weight-based interaction ranking information, that is, in turn, provided to a higher-order interaction ranking unit 1160, for purposes such as those described earlier. In turn, having generated higher-order interaction ranking information, higher-order interaction ranking unit 1160 communicates such information to a statistical interaction ranking unit 1170. In so doing, behavioral modeling engine 1110 is able to appropriately weight relevant factors, and produce statistical information that allows participant behavioral modeling information 1120 to be used in creating participant behavioral model 1130 in such a manner that uncontrolled swings in engagement score information produced using participant behavioral model 1130 are avoided.

Figure 12:
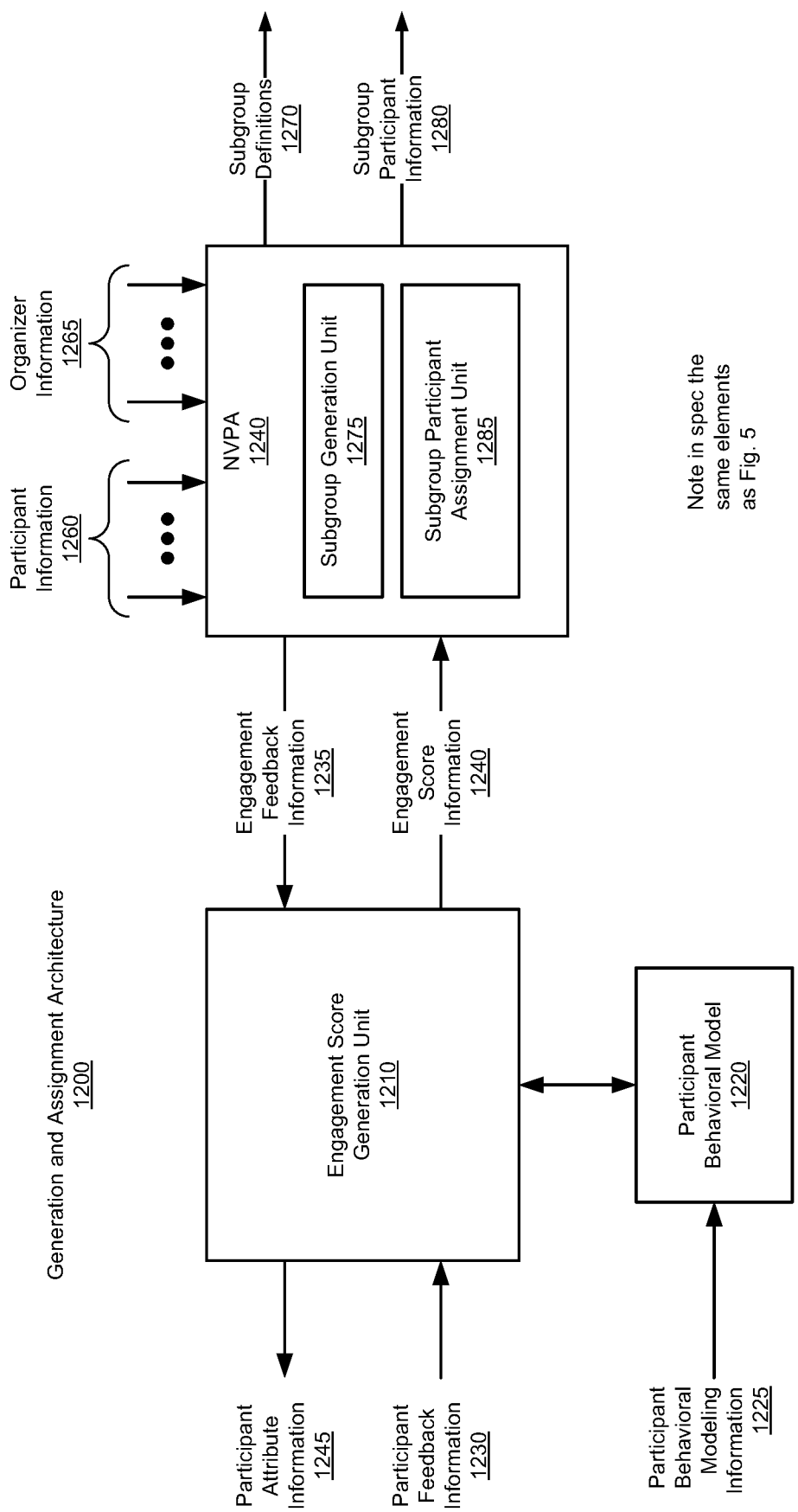
FIG. 12 is a simplified block diagram illustrating an example of an interaction prediction architecture, according to methods and systems such as those disclosed herein.

FIG. 12 is a simplified block diagram illustrating an example of a system architecture configured to generate subgroups and assign one or more participants to the subgroups thus generated, according to methods and systems such as those disclosed herein. That being the case, FIG. 12 depicts a generation and assignment architecture 1200. Generation and assignment architecture 1200, in the manner noted earlier, uses information regarding participants and organizers to determine participant engagement, generate subgroups, and assign telepresence event attendees as participants in the sessions of the subgroups thus generated, as well as dynamically modify subgroups and their participants as conditions change (e.g., (non-volitional) reassignment of a participant leaving a subgroup, to another subgroup; (non-volitional) reassignment of a participant whose engagement score has dropped; and other such eventualities and conditions, as may be desirable from the perspective of the participants and/or organizers to meet their needs and objectives).

To accomplish these ends, an engagement score generation unit 1210 accesses a participant behavioral model 1220 (constructed using participant behavioral modeling information 1225), and can also receive participant feedback information 1230 and engagement feedback information 1235. In turn, engagement score generation unit 1210 generates engagement score information 1240, and can also generate participant attribute information 1245 (in certain embodiments, such being updates to existing participant attribute information). As in various examples presented in connection with earlier figures, engagement score generation unit 1210 can employ machine learning techniques in comparable fashion and to comparable advantage. In such case, participant behavioral model 1220 serves as guidance for machine learning systems of engagement score generation unit 1210 in that manner. In this case, engagement score generation unit 1210 can use participant behavioral model 1220 as, for example, a multi-layer perceptron (MLP) model.

In the alternative (or in combination therewith), and in the manner discussed in connection with FIG. 5, engagement score generation unit 1210 can receive various participant information directly from participant systems, in generating engagement score information 1240. In this latter case, engagement score generation unit 1210 can perform the iterative summations of such information, and use thresholding to make determinations as to the assignment of participants to specific subgroups.

In turn, an NVPA 1250 receives engagement score information 1240 from engagement score generation unit 1210, and can provide engagement feedback information 1235 two engagement score generation unit 1210. NVPA 1250 also can receive participant information 1260 and organizer information 1265, which can be used in the generation of subgroup definitions 1270 (by, for example, a subgroup generation unit 1275) and subgroup participant information 1280 (by, for example, a subgroup participant assignment unit 1285).

While not required, certain embodiments will, in light of the present disclosure, be understood as providing various platforms and/or services to support the aforementioned functionalities and the deployment thereof in a cloud environment. Such an architecture can be referred to as, for example, a cloud-native application architecture, which provides for development by way of a platform that abstracts underlying infrastructure. In so doing, methods and systems such as those described herein are able to further focus on the creation and management of the services thus supported, while providing access thereto to a broader range of devices, and so, attendees/participants.

Example Processes for Dynamic Resolution Employing Machine Learning

Figure 13:
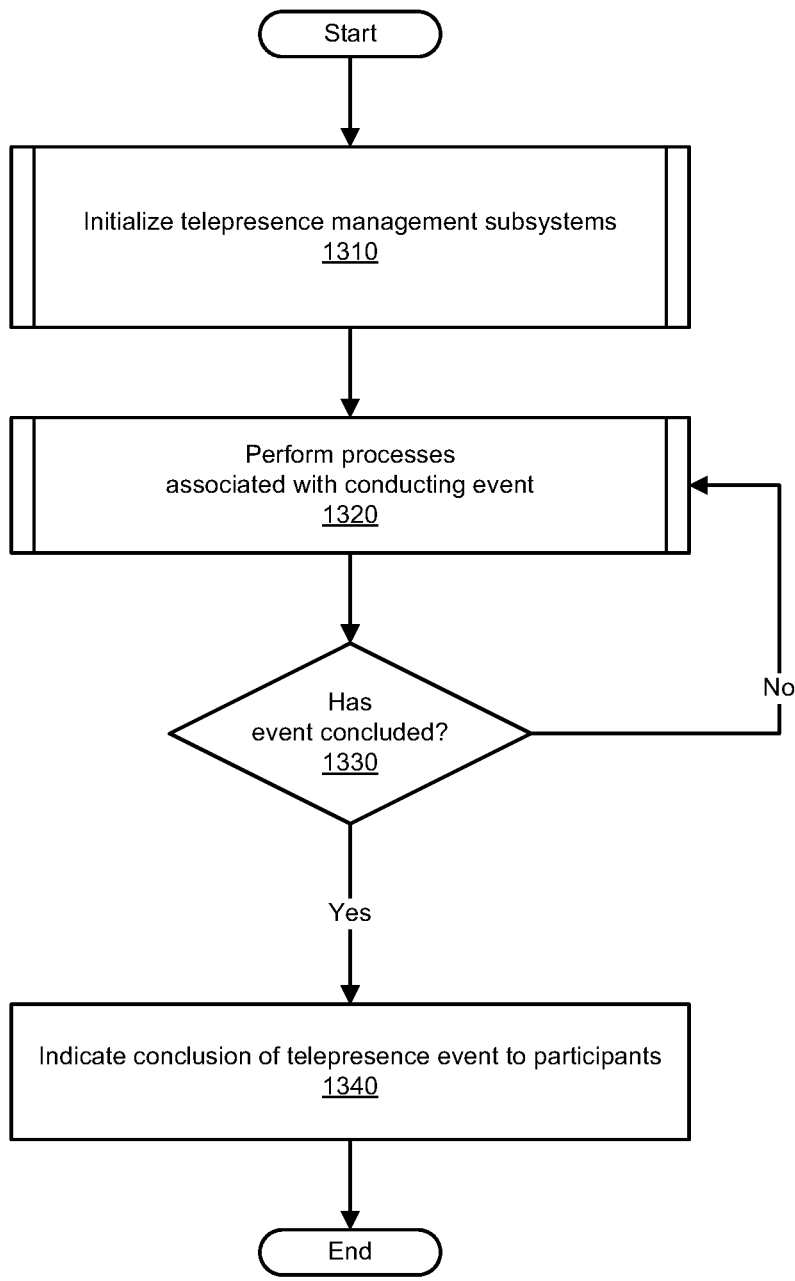
FIG. 13 is a simplified flow diagram illustrating an example of a telepresence management process, according to methods and systems such as those disclosed herein.

FIG. 13 is a simplified flow diagram illustrating an example of a telepresence management process, according to methods and systems such as those disclosed herein. FIG. 13 thus illustrates a telepresence management process 1300, as might be performed by a telepresence management system such as telepresence management system 505 of FIG. 5. Telepresence management process 1300 begins with the initialization of the telepresence management subsystems in question. To this end, the telepresence management system initializes its subsystems (1310). The subsystems initialized in this process include the telepresence management system's participant behavioral model (which is initialized by receiving the output of the behavioral model generator, which uses assumptive behavioral information to perform such initialization), its engagement score generation unit, and its NVPA, among other such subsystems initialized. A more detailed discussion of such a system initialization process is provided in connection with the example process presented in FIG. 14 and other associated flow diagrams, subsequently.

Once the telepresence management system has been initialized, telepresence event operations can begin. To that end, non-volitional participant assignment (NVPA) processes associated with conducting the event are performed (1320). From the perspective of the telepresence management system, such ongoing operations include the generation of updates for the participant behavioral model, gathering participant feedback, generating engagement score information, receiving organizer information, generating subgroups, assigning participants to those subgroups, updating subgroups and their participants, and other such operations. A more detailed discussion of such telepresence management system operations is provided in connection with the example process presented in FIG. 16 and other associated flow diagrams, subsequently.

Such ongoing operations continue until such time as the event concludes (1330). As will be appreciated in light of the present disclosure, the conclusion of an event can be based on a time limit for the telepresence event and/or the number of participants remaining, but can also comprehend other metrics, such as an average of the remaining participants' engagement scores, the number of subgroups having a threshold engagement score as an average of each subgroup's participants, and/or other metrics, taken alone or in combination. Once a determination has been made that the telepresence event should conclude, an indication of its conclusion is communicated to the participants (or the participants remaining, depending on the embodiment) (1340). Telepresence management process 1300 then concludes.

Figure 14:
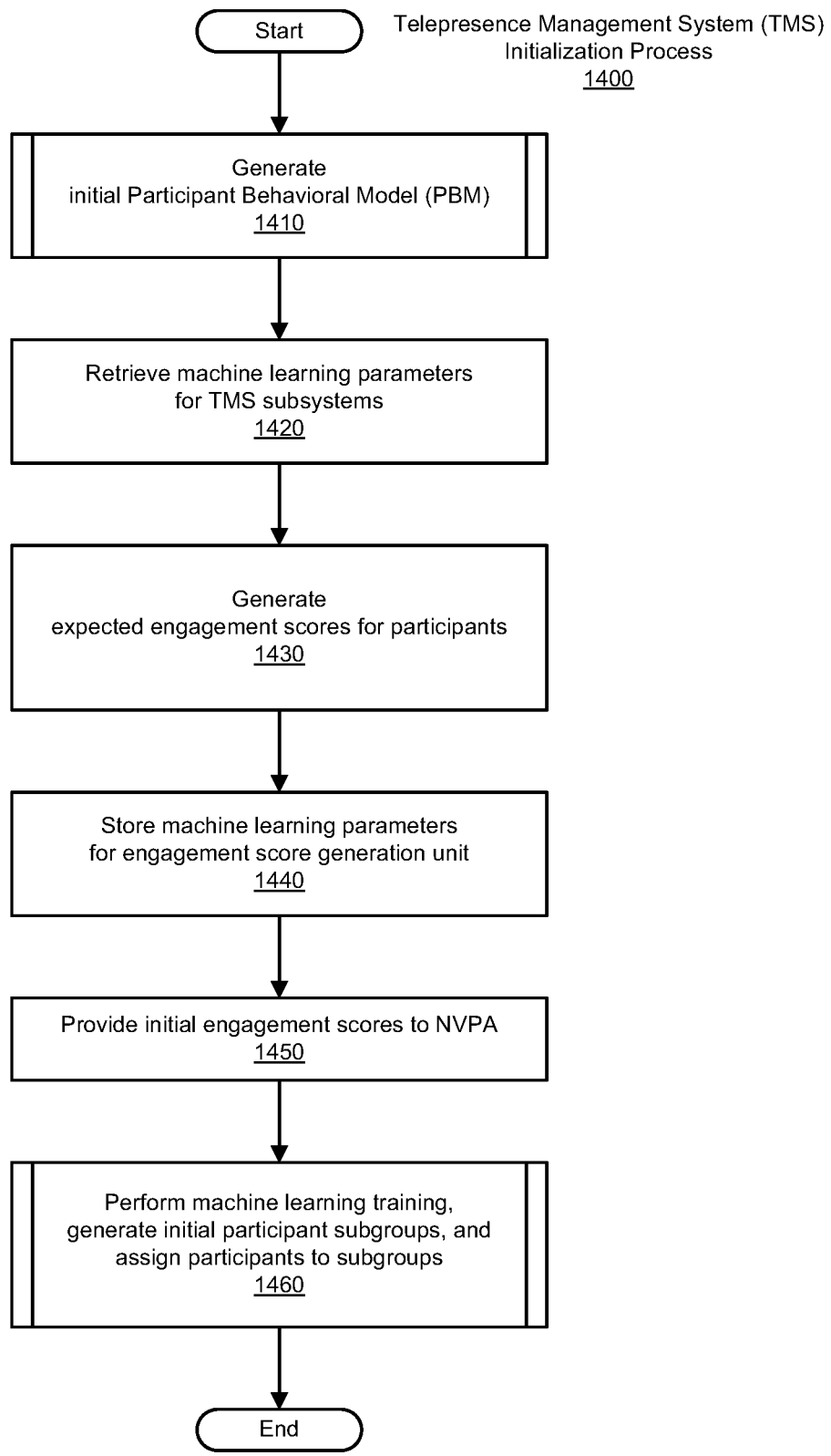
FIG. 14 is a simplified flow diagram illustrating an example of a telepresence management system (TMS) system initialization process, according to methods and systems such as those disclosed herein.

FIG. 14 is a simplified flow diagram illustrating an example of a telepresence management system (TMS) system initialization process, according to methods and systems such as those disclosed herein. FIG. 14 thus illustrates a system initialization process referred to as a telepresence management system (TMS) initialization process 1400. As noted previously, TMS initialization process 1400 includes the initialization of TMS subsystems such as the TMS subsystem's participant behavioral model, its engagement score generation unit, and its NVPA, among other such subsystems. TMS initialization process 1400 thus begins with the generation of an initial participant behavioral model (PBM) (1410). As noted, the TMS's behavioral model generator can, for purposes of initialization, take as input assumptive behavioral information to use as a starting point in generating a participant behavioral model. A more detailed discussion of such a initial PBM generation process is provided in connection with the example process presented in FIG. 15, subsequently.

Once an initial PBM has been generated, TMS initialization process 1400 proceeds with retrieving machine learning (ML) parameters for its various ML subsystems (1420). Machine learning parameters can thus be retrieved, for example, for the TMS's engagement score generation unit, its subgroup generation unit, and its subgroup participant assignment unit, among other such subsystems, should such subsystems be implemented using machine learning techniques. In the alternative (or in combination therewith), such retrieval can include the retrieval of coefficients, participant and organizer goal sets, thresholds, and other such metrics as may have bearing on the functioning of such subsystems.

Next, expected engagement scores for initial subgroups and their participants are generated using the initial PBM and, optionally, expected engagement feedback information (either directly from participant systems or from the TMS's NVPA (1430). As part of the generation of the expected engagement scores, TMS initialization process 1400 stores updated machine learning parameters for its engagement score generation unit (1440). The initial engagement scores are then provided to the TMS's NVPA (1450). At this juncture, the TMS's NVPA performs its own machine learning training (and/or updates iterative coefficients, thresholds, and other such criteria), generates the initial participants subgroups for the telepresence event and assigns participants to the subgroups thus generated (1460). A more detailed discussion of such processes are provided in connection with the example process presented in FIG. 16 and associated flow diagrams, subsequently. TMS initialization process 1400 then concludes.

Figure 15:
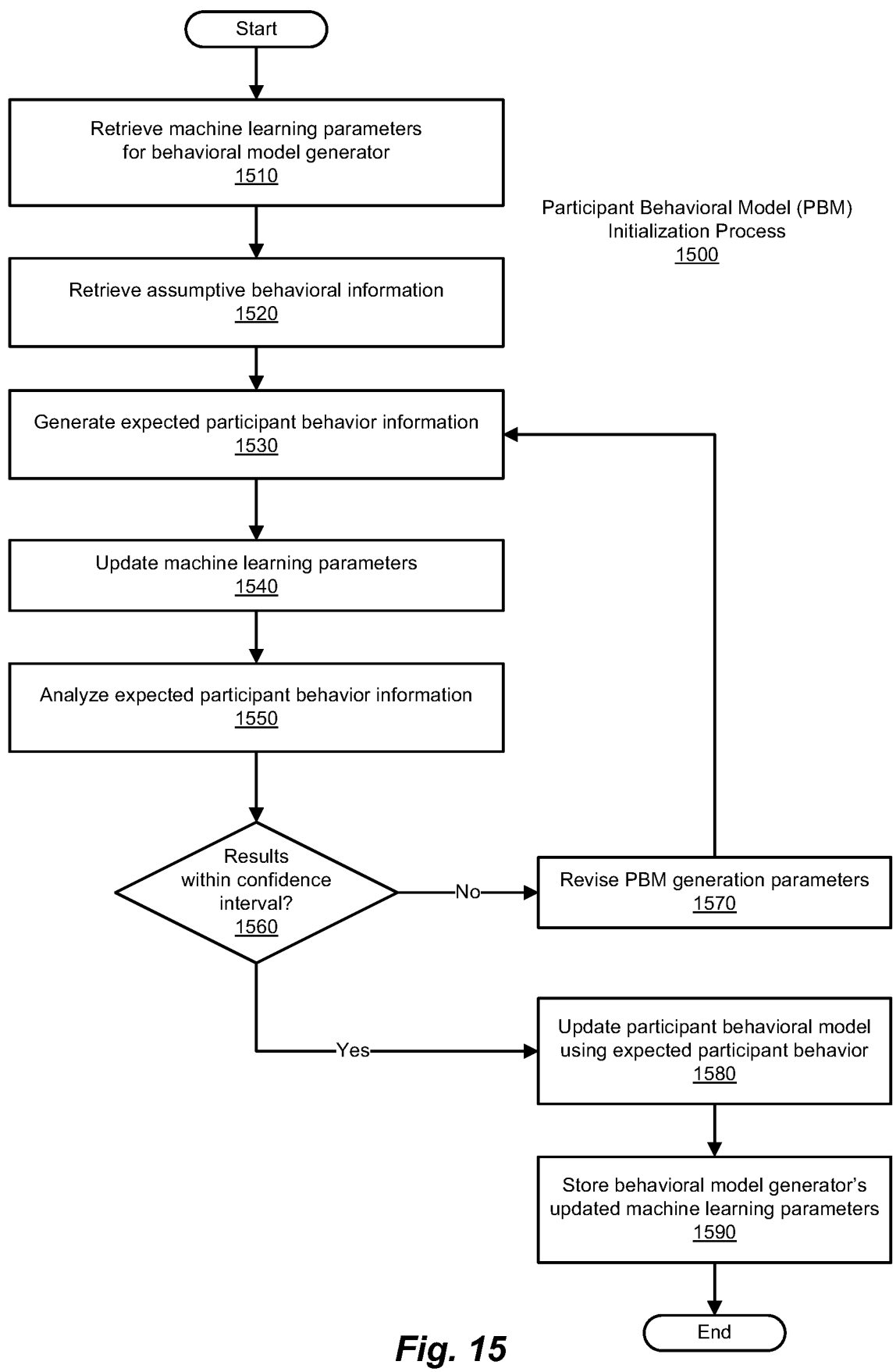
FIG. 15 is a simplified flow diagram illustrating an example of a PBM initialization process, according to methods and systems such as those disclosed herein.

FIG. 15 is a simplified flow diagram illustrating an example of a PBM initialization process, according to methods and systems such as those disclosed herein. FIG. 15 thus illustrates a process for generating and initial PBM such as that noted in connection with FIG. 14, and which is referred to herein as a PBM initialization process 1500. PBM initialization process 1500 begins, in machine learning implementations, with the retrieval of machine learning parameters for the TMS's behavioral model generator (1510). Given that PBM initialization process 1500 is geared to initialize participant behavioral model in question, PBM initialization process 1500 retrieves assumptive behavioral information, such as that described in connection with FIG. 7 as assumptive behavioral information 780. Other information can also be retrieved at this juncture (e.g., in an implementation employing iterative summation, the number of iterations to perform, coefficients, thresholds, and other such information).

Having retrieved the requisite information, the TMS's behavioral model generator can then generate expected participant behavior information (1530). In a machine learning implementation, the behavioral model generator's machine learning parameters can be updated as part of the generation process and/or updated subsequent thereto (1540). In an iterative summation implementation, the aforementioned parameters can also be updated at this point.

At this juncture, the resulting expected participant behavior information can be analyzed to determine whether, based on historical information, for example, such expected results are within a statistically significant range (1550). For example, such analysis can seek to prevent a PBM that might result in all attendees becoming participants in a single subgroup or each of those attendees being participants in subgroups including only themselves (i.e. one participant in each subgroup). In performing such statistical analysis (including the level of undesirability, as well as the likelihood of undesirable configurations), a determination such as a confidence interval can be employed to good effect. In such an implementation, the determination is with regard to whether the results of the aforementioned analysis lie within the relevant confidence interval (1560). In the case in which the analysis' results are not satisfactory, PBM initialization process 1500 can proceed with revising one or more of the parameters used as input to the TMS's behavioral model generator (1570). PBM initialization process 1500 then returns to the generation of a revised version of the expected participant behavior information (1530). In the alternative, if the analysis' results are acceptable, PBM initialization process proceeds to update the TMS's participant behavioral model using the expected participant behavior information generated (1580). At this point, the behavioral model generator's parameters (e.g., machine learning parameters and/or iterative summation parameters, or the like) are stored (1590). PBM initialization process 1500 then concludes.

Figure 16:
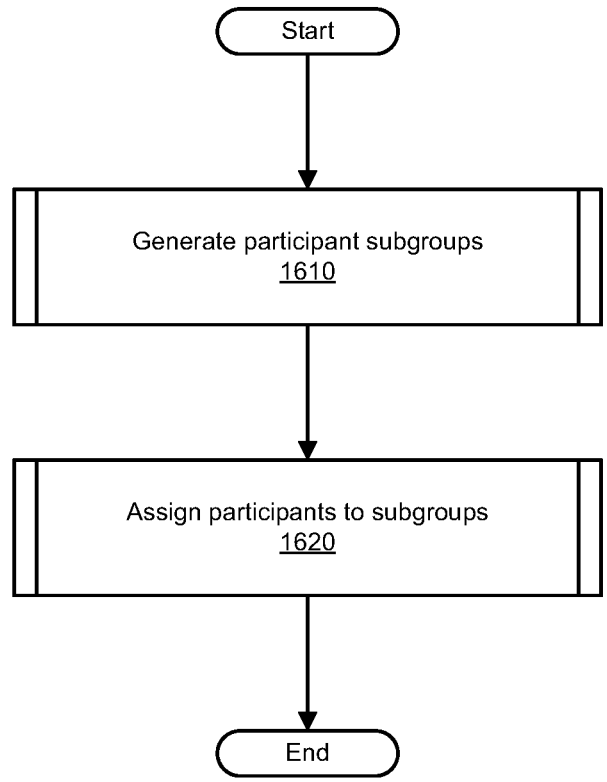
FIG. 16 is a simplified flow diagram illustrating an example of an NVPA process, according to methods and systems such as those disclosed herein.

FIG. 16 is a simplified flow diagram illustrating an example of an NVPA process, according to methods and systems such as those disclosed herein. FIG. 16 thus illustrates a non-volitional participant assignment (NVPA) process 1600, in the manner of action 1460 of FIG. 14 (as part of TMS initialization operations). NVPA process 1600 begins with the generation of participant subgroups (1610). A more detailed discussion of such a participant subgroup generation process is provided in connection with the example process presented in FIGS. 17 and 18, subsequently. Once the requisite subgroups have been generated, NVPA process 1600 proceeds with assigning participants to each of the subgroups (1620). A more detailed discussion of such a participant assignment process is provided in connection with the example process presented in FIG. 19, subsequently.

Figure 17:
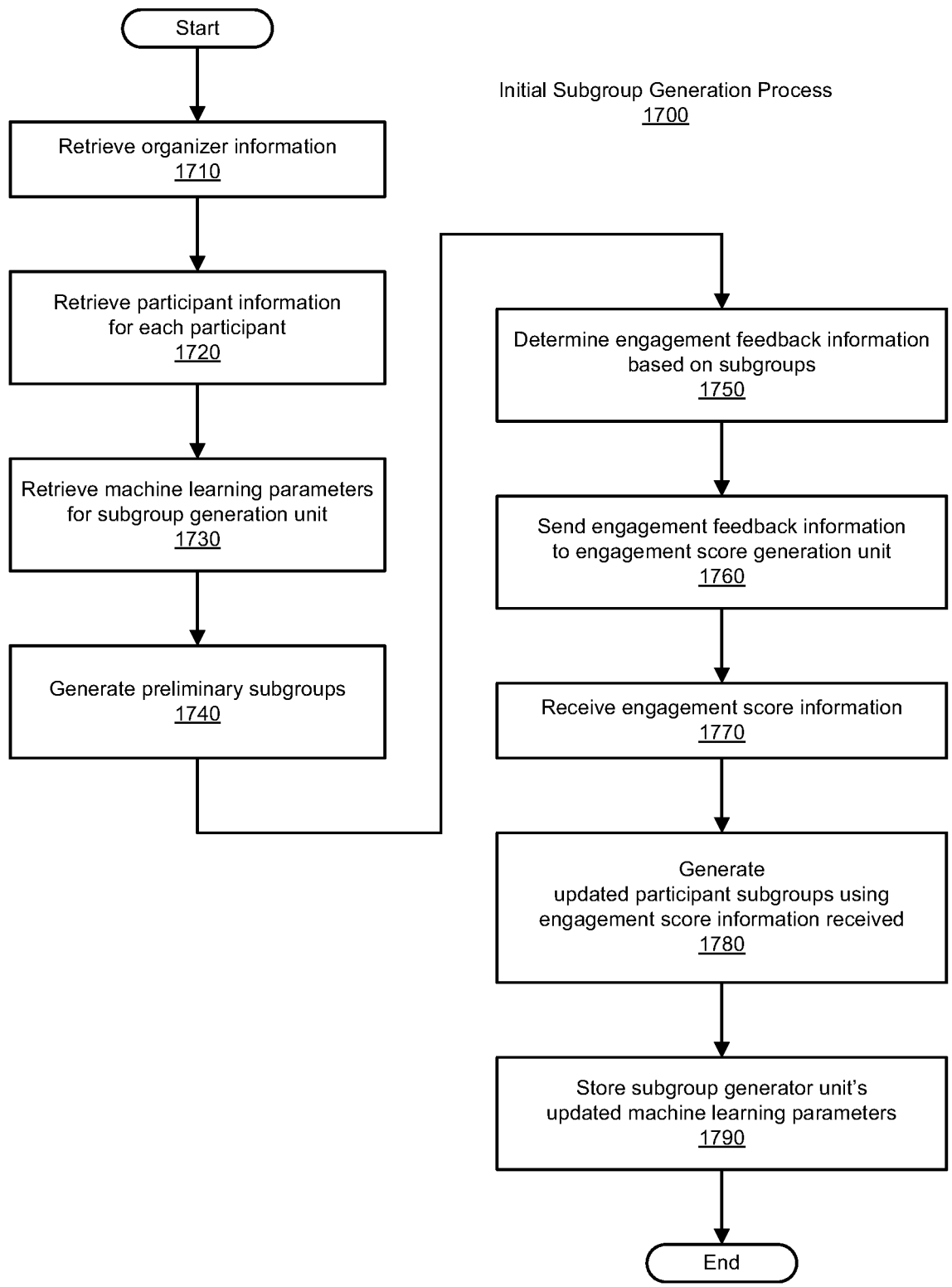
FIG. 17 is a simplified flow diagram illustrating an example of an initial subgroup generation process, according to methods and systems such as those disclosed herein.

FIG. 17 is a simplified flow diagram illustrating an example process for the generation of initial subgroup assignments, according to methods and systems such as those disclosed herein. FIG. 17 thus illustrates an initial subgroup generation process 1700, as noted in FIG. 16 at action 1610. Initial subgroup generation process 1700 begins with the retrieval of organizer information (1710). Such organizer information can include, for example, organizer control inputs, organizer rule sets, and organizer goal sets, among other such possible information from the telepresence event's organizer. Also retrieved is participant information for each of the telepresence event's attendees (1720). Such participant information can include, for example, participant feedback from previous events (whether telepresence or in-person events), participant goal sets, and participant attributes, among other such possible information from each attendee (e.g., as might be received, for example, from each participant system). In embodiments in which machine learning techniques are employed, machine learning parameters for the TMS's subgroup generation unit can be retrieved (1730). At this time, in implementations employing iterative summation, parameters such as coefficients, thresholds, and the like can also be retrieved. Initial subgroups are then generated by the TMS's subgroup generation unit (1740), which can include the execution of machine learning processes based on the information thus retrieved.

Next, a preliminary version of the initial subgroups having been generated, preliminary engagement feedback information can be determined based on these preliminary initial subgroups (1750). Such preliminary engagement feedback information can then be sent to the TMS's system's engagement score generation unit (1760). Processing performed by the TMS's system's engagement score generation unit is described in connection with FIG. 18, subsequently.

The resulting engagement score information is then received from the TMS's system's engagement score generation unit (1770). Using the preliminary engagement score information received, the subgroup generation unit is able to generate (updated) initial participant subgroups (1780). In machine learning implementations, the subgroup generation unit's updated machine learning parameters (resulting from the foregoing processes) can then be stored (1790). At this juncture, in architectures employing iterative summation, the relevant parameters can also be stored. Initial subgroup generation process 1700 then concludes.

Figure 18:
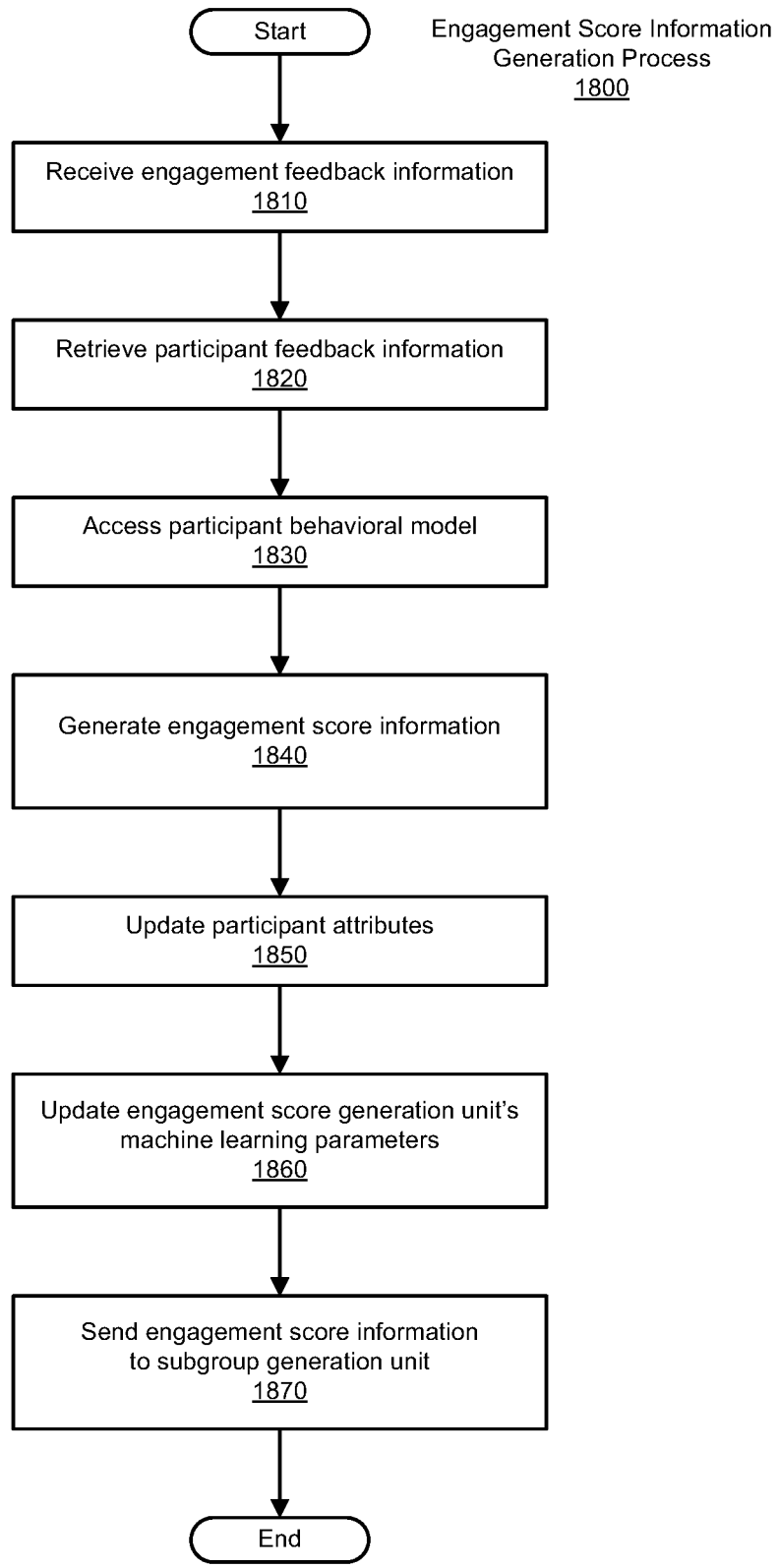
FIG. 18 is a simplified flow diagram illustrating an example of an engagement score generation process, according to methods and systems such as those disclosed herein.

FIG. 18 is a simplified flow diagram illustrating an example of a process for generating engagement score information, according to methods and systems such as those disclosed herein. FIG. 18 thus illustrates an engagement score information generation process 1800. Engagement score information generation process 1800 begins with the receipt of engagement feedback information by, for example, the TMS's system's engagement score generation unit (1810).

At this juncture, the engagement score generation unit can also retrieve participant feedback information (e.g., as might be available during ongoing operations of the TMS) (1820). As will be appreciated, retrieval of participant feedback information, as part of engagement score information generation process 1800, will typically only occur during ongoing TMS operations, as there will typically be no participant feedback available during initialization operations. As noted, however, historical participant feedback information may be available even during initialization operations, and so can be considered (used as input to the TMS's system's engagement score generation unit).

The engagement score generation unit then accesses the appropriate participant behavioral model (which, it should be noted, can be generated and used on a participant-by-participant basis, and event-by-event basis, and/or any basis reflective of participant behavior, whether at the telepresence event in question, at telepresence events currently being held, and/or previously-held telepresence events) (1830). It is also at this juncture that embodiments employing iterative summation access information regarding parameters therefor.

Having obtained the requisite information, the engagement score generation unit generates the requisite engagement score information (1840). As noted, such an engagement score information can be generated using machine learning techniques, iterative summation techniques, or a combination thereof. At this point, participant attributes (e.g., as may be stored by participants systems used by attendees) can be updated by way of the engagement score generation unit sending participant attribute information to each of these participant systems (1850). Machine learning parameters and/or iterative summation parameters can also be updated (1860). The engagement score information generated is then sent to the TMS's system's NVPA (1870). Engagement score information generation process 1800 then concludes.

Figure 19:
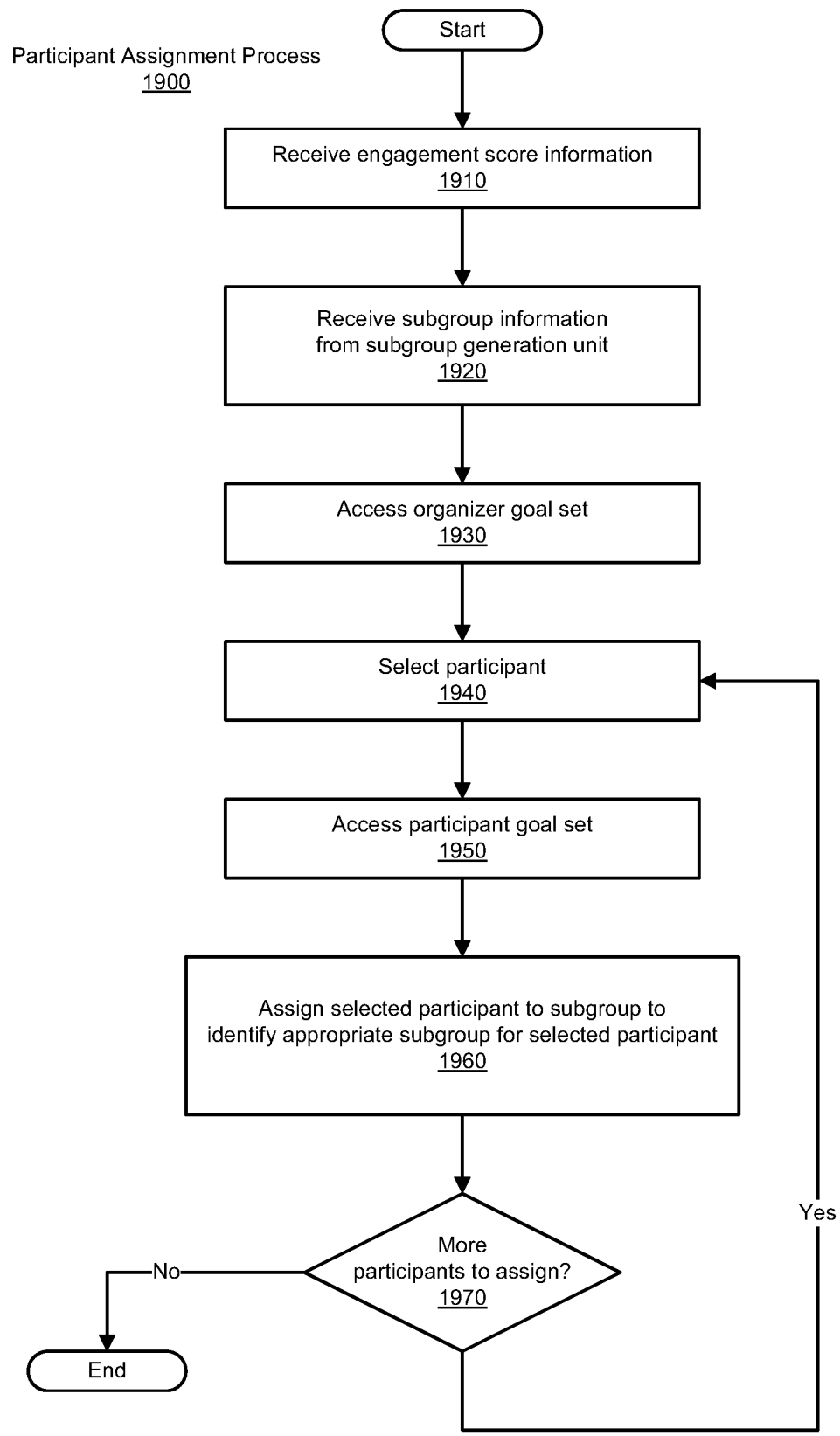
FIG. 19 is a simplified flow diagram illustrating an example of a participant assignment process, according to methods and systems such as those disclosed herein.

FIG. 19 is a simplified flow diagram illustrating an example of a participant assignment process, according to methods and systems such as those disclosed herein. FIG. 19 thus illustrates a participant assignment process 1900, as might be performed by a subgroup participant assignment unit of an NVPA according to the present disclosure, and as noted in connection with action 1620 of FIG. 16. Participant assignment process 1900 begins with the receipt of the engagement score information generated by the engagement score generation unit (1910). Subgroup information is received from the NVPA's subgroup generation unit (or from subgroup definitions stored in an associated telepresence construct information database as subgroup constructs of an event construct) (1920). In the manner noted earlier, the telepresence event organizer's goals set(s) can then be accessed (1930), as can the organizer's rule set and control inputs, as may be helpful in giving effect to the organizer's goals for the given telepresence event, potentially in view of the telepresence event's participants.

Next, one of the participants is selected for assignment (1940). The selected participant's goal set can then be accessed (1950). The selected participant has been assigned by the subgroup participant assignment unit to a subgroup appropriate to the participant's and organizer's goals and objectives (1960). As noted, such assignments can be generated using machine learning techniques, iterative summation techniques, or a combination thereof. A determination is then made as to whether additional participants remain to be assigned to subgroups (1970). In the case in which additional participants remain to be assigned to subgroups, participant assignment process 1900 loops to the selection of the next participant (1940). Alternatively, participant assignment process 1900 concludes.

Figure 20:
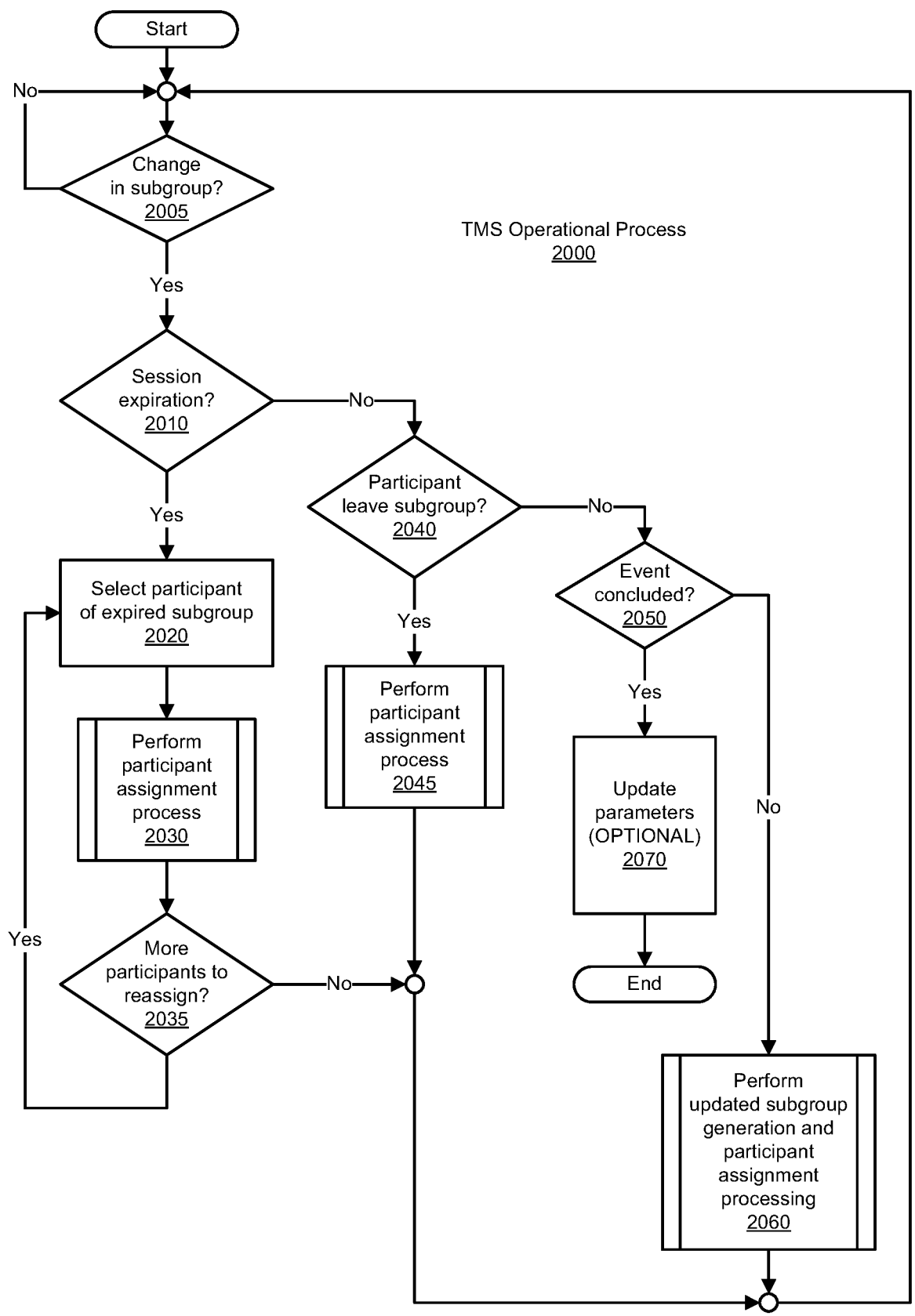
FIG. 20 is a simplified flow diagram illustrating an example of a TMS operational process, according to methods and systems such as those disclosed herein.

FIG. 20 is a simplified flow diagram illustrating an example of a TMS operational process, according to methods and systems such as those disclosed herein. FIG. 20 and associated flow diagrams thus illustrate examples of processes that can be performed by the subsystems of an NVPA such as that described herein, as may be associated with the conduct of a telepresence event, in the manner noted in connection with action 1320 of FIG. 13. TMS operational process 2000 begins with a determination as to whether a change has occurred in one or more of the telepresence event's subgroups (2005). As noted elsewhere herein, such changes may result from a participant's volitional movement between subgroups, or may be non-volitional in character, such that participant's engagement score and/or other dynamic characteristics (potentially in combination with static participant and/or organizer information). Further, such volitional subgroup changes by a given participant may be prohibited, constrained, or freely permitted, based on the participant's attributes, organizer rules, participant and/or organizer goals, and or other such information. Further still, changes to subgroups can result from one or more subgroups' sessions ending, changes in one or more subgroups' membership, and/or other such changes to the subgroups themselves.

Upon a change in one or more of the subgroups such as those described above, TMS operational process 2000 proceeds with making a determination as to whether the cause of the change was the expiration of one or more sessions of the subgroups (2010). If the change resulted from the expiration of a session, TMS operational process 2000 proceeds with selecting a participant of the expired subgroup(s) (2020). The selected participant is then assigned to a new subgroup (which may include the creation of the new subgroup) (2030). A more detailed discussion of such a participant assignment process is provided in connection with the example process presented in FIG. 21, subsequently. A determination is then made as to whether further participants remain for reassignment (2035). If further participants remain to be assigned, TMS operational process 2000 proceeds to selecting the next participant from the expired subgroup(s) (2020). In the alternative, having assigned the participants needing reassignment, TMS operational process 2000 proceeds to await the next occurrence of a change in one of the subgroups (2005).

In the case in which the subgroup change is not due to the expiration of a subgroup's session (2010), a determination is made as to whether a participant has left the subgroup to which the participant is currently assigned (2040). If a participant has left their current subgroup (or the ongoing analysis performed by the TMS indicates that the participant should be reassigned from their current subgroup to a new subgroup), a participant assignment process is performed (2045). As before, in the case in which a subgroup's session has expired, a more detailed discussion of such a participant assignment process is provided in connection with the example process presented in FIG. 21, subsequently. Once again, TMS operational process 2000 proceeds to await the next occurrence of a change in one of the subgroups (2005).

In the case in which the subgroup change is not due to the expiration of a subgroup's session (2010), nor is the change the result of a participant leaving a subgroup (or needing reassignment from their current subgroup) (2040), TMS operational process makes a determination as to whether the telepresence event has concluded (2050). If the telepresence event has not concluded, TMS operational process 2000 proceeds to perform updated subgroup generation and participant assignment processing (2060). Such updated processing may be necessary, for example, in situations in which general engagement scores are low, volitional participant movement is high, and another such circumstances indicating a need for the implementation of revised subgroupings. A more detailed discussion of such subgroup generation and participant assignment is provided in connection with the example process presented in FIG. 22, subsequently. In the alternative, if the given telepresence event has concluded (2050), machine learning and/or iterative summation parameters can be updated (2070), though doing so is optional (given that the telepresence event has concluded). TMS operational process 2000 then concludes (as has the telepresence event in question).

Figure 21:
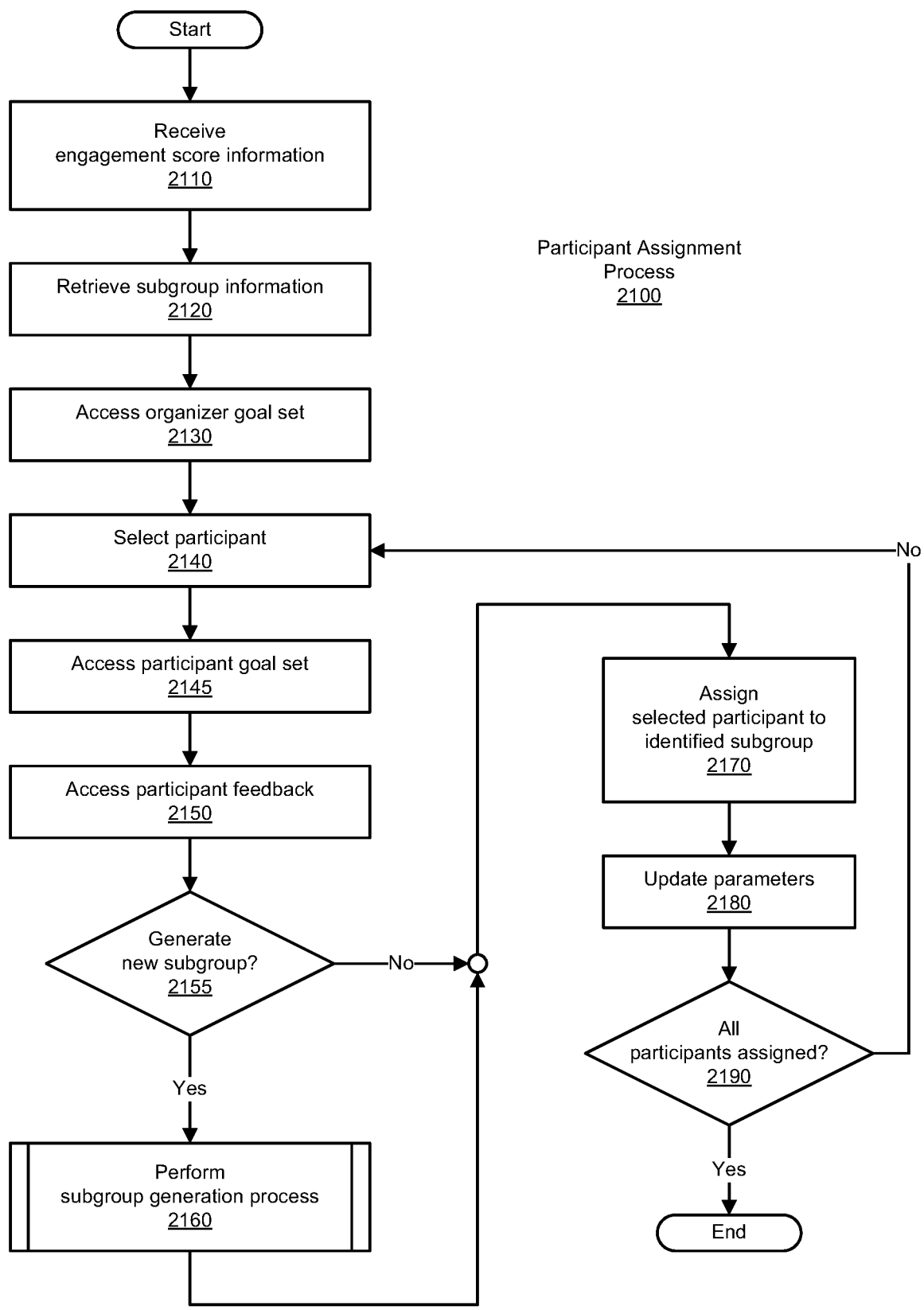
FIG. 21 is a simplified flow diagram illustrating an example of a participant assignment process, according to methods and systems such as those disclosed herein.

FIG. 21 is a simplified flow diagram illustrating an example of a participant assignment process, according to methods and systems such as those disclosed herein. FIG. 21 thus illustrates a process such as that noted in connection with actions 2030 and 2045 of FIG. 20, in which one or more participants, no longer being assigned to a given subgroup (either for volitional or non-volitional reasons), are assigned to a new (or even newly-generated) subgroup. Such a process is referred to herein as a participant assignment process 2100. Participant assignment process 2100 begins with the receipt of engagement score information from an engagement score generation unit, at an NVPA (2110). Subgroup information is then retrieved, for example from a telepresence construct information database (e.g., as might be stored in a telepresence construct information database as subgroup constructs of an event construct) (2120). Additionally, organizer information such as an organizer goals set can be accessed (2130).

The requisite information having been obtained, a participant is selected for assignment (2140). The participant's goals set can then be accessed (2145) as can the participant's feedback, if such feedback is available (2150). At this juncture, having obtained the participant's information, a determination can be made using this and other of the aforementioned information, to determine whether a new subgroup should be generated (2155). If the foregoing information indicates that a new subgroup should be generated, participant assignment process 2100 proceeds with performing a subgroup generation process (2160). A more detailed discussion of such a subgroup generation process is provided in connection with the example process presented in FIG. 22, subsequently.

Once the subgroup generation process has completed, or if a new subgroup is not needed, participant assignment process 2100 proceeds with assigning the selected participant to the subgroup identified (2170). At this juncture, machine learning, iterative summation, and/or other parameters can be updated to reflect the TMS' "experiences" resulting from the assignment of the participant in question (2180). A determination is then made as to whether the participants needing assignment had been processed (2190). If further participants remain to be assigned, participant assignment process 2100 proceeds to selecting the next discipline for processing (2140). In the alternative, participant assignment process 2100 concludes.

Figure 22:
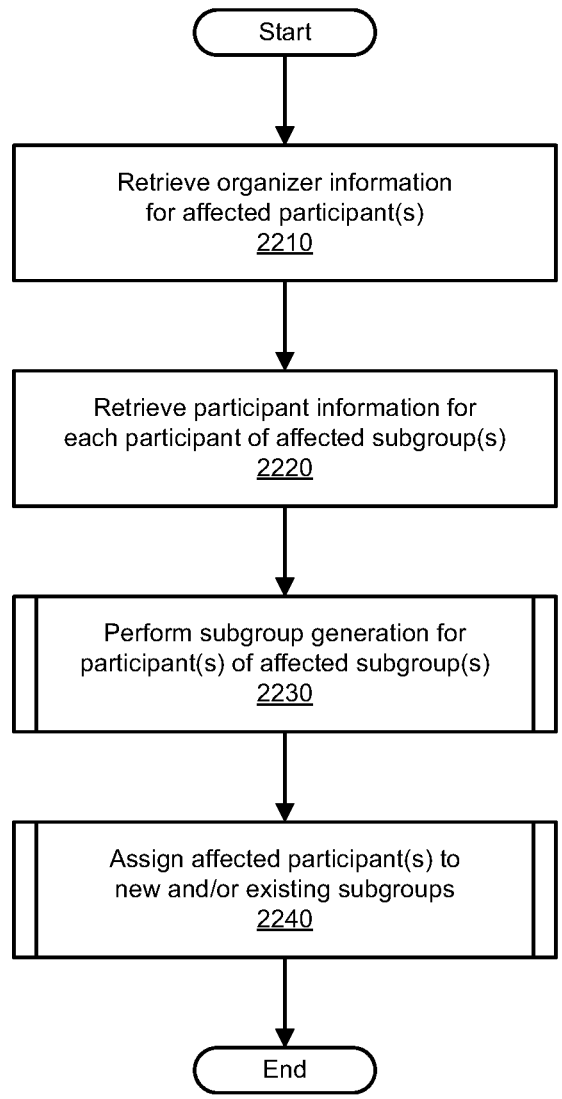
FIG. 22 is a simplified flow diagram illustrating an example of an updated subgroup generation process, according to methods and systems such as those disclosed herein.
Figure 23:
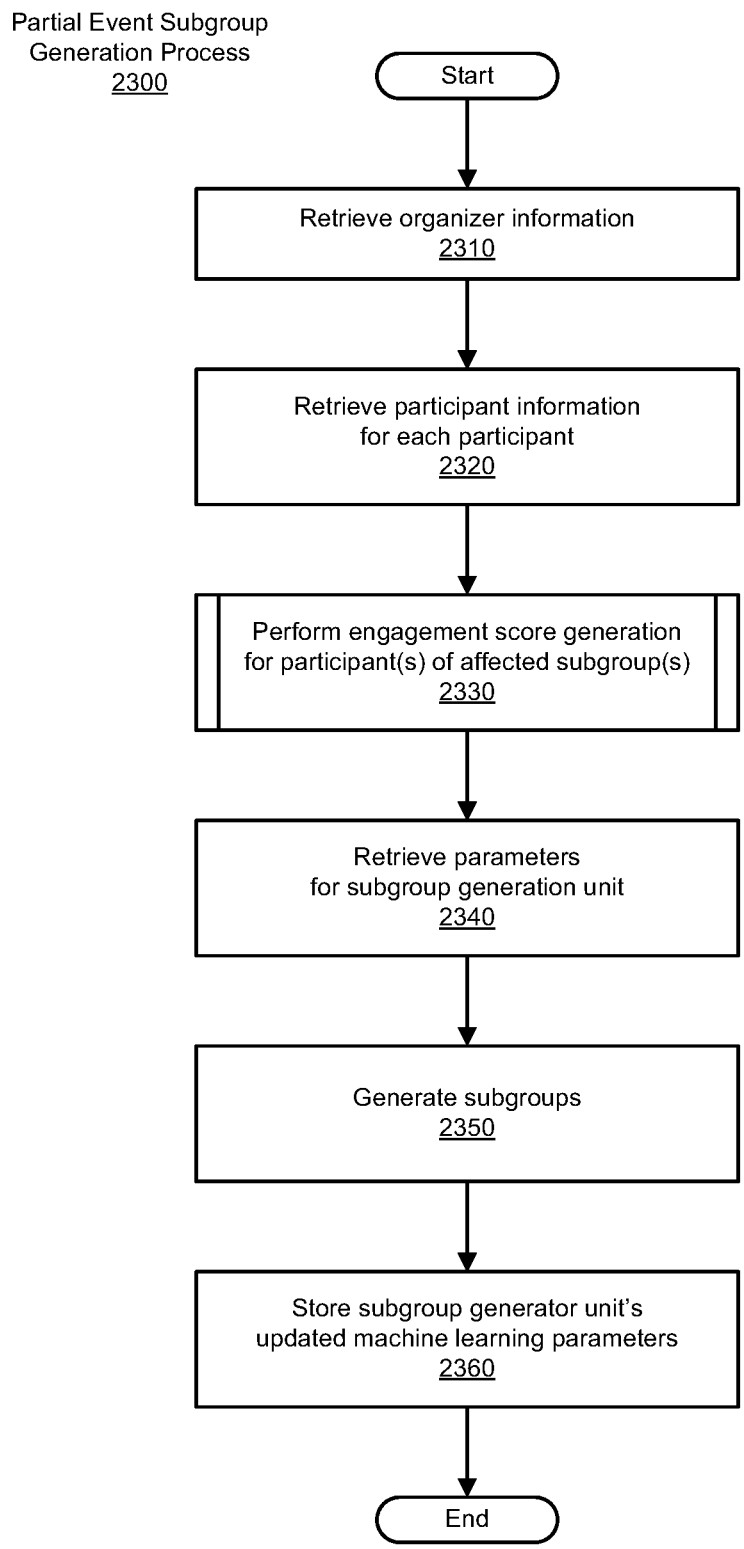
FIG. 23 is a simplified flow diagram illustrating an example of a partial event subgroup generation process, according to methods and systems such as those disclosed herein.

FIG. 22 is a simplified flow diagram illustrating an example of a process for generating one or more updated subgroups, according to methods and systems such as those disclosed herein. FIG. 22 thus illustrates a FIG. 23 is a simplified flow diagram illustrating an example of a partial event subgroup generation process, according to methods and systems such as those disclosed herein. FIG. 23 thus illustrates a process such as that contemplated as action 2060 of FIG. 20, and which is referred to herein as an updated subgroup generation process 2200. Updated subgroup generation process 2200 begins with the retrieval of organizer information for the affected participant(s) (2210). Such organizer information can include one or more organizer goal sets, one or more organized rule sets, organizer control inputs, and/or other such parameters as may be applicable or advantageous to the organizer's conducting the telepresence event. Similarly, participant information is retrieved for each participant of the affected subgroup(s) (2220). Here again, information such as the participant information contemplated can include, for example, participant feedback, one or more participant goal sets, one or more participant attributes, and/or other such parameters as may be applicable or advantageous to the participant's participation in the telepresence event.

Next, subgroup generation for the participant(s) in question is performed (e.g. by a subgroup generation unit of the TMS in question) (2230). A more detailed discussion of such a subgroup generation process is provided in connection with the example process presented in FIG. 23, subsequently. Once any subgroups needing generation have been generated, the affected participant(s) can be assigned to the appropriate new or existing subgroups (2240). Updated subgroup generation process 2200 then concludes.

FIG. 23 is a simplified flow diagram illustrating an example of a partial event subgroup generation process, according to methods and systems such as those disclosed herein. FIG. 23 thus illustrates a partial event subgroup generation process 2300, in the manner comprehended by action 2230 of FIG. 22. Partial event subgroup generation process 2300 begins with the retrieval of organizer information such as that noted earlier (2310). Once again, participant information is retrieved for each of the participants (2320). Having obtained this information, partial event subgroup generation process 2300 proceeds with performing engagement score generation for the participant(s) of the affected subgroup(s) (2330). A more detailed discussion of such an engagement score generation process is provided in connection with the example process presented in FIG. 18, as described previously, with action 2330 including the sending of engagement feedback information and the receiving of engagement score information by, for example, the subgroup generation unit of the NVPA of the TMS in question.

Having received the requisite engagement score information, the requisite parameters for the subgroup generation unit can be retrieved (2340). The subgroup generation unit then generates the requisite subgroups (2350). The information regarding the subgroups generated is then sent to, for example, a telepresence construct information database as subgroup definitions, which can then be stored in one or more subgroup constructs of an event construct in the telepresence construct information database (2360). Partial event subgroup generation process 2300 then concludes.

Figure 24:
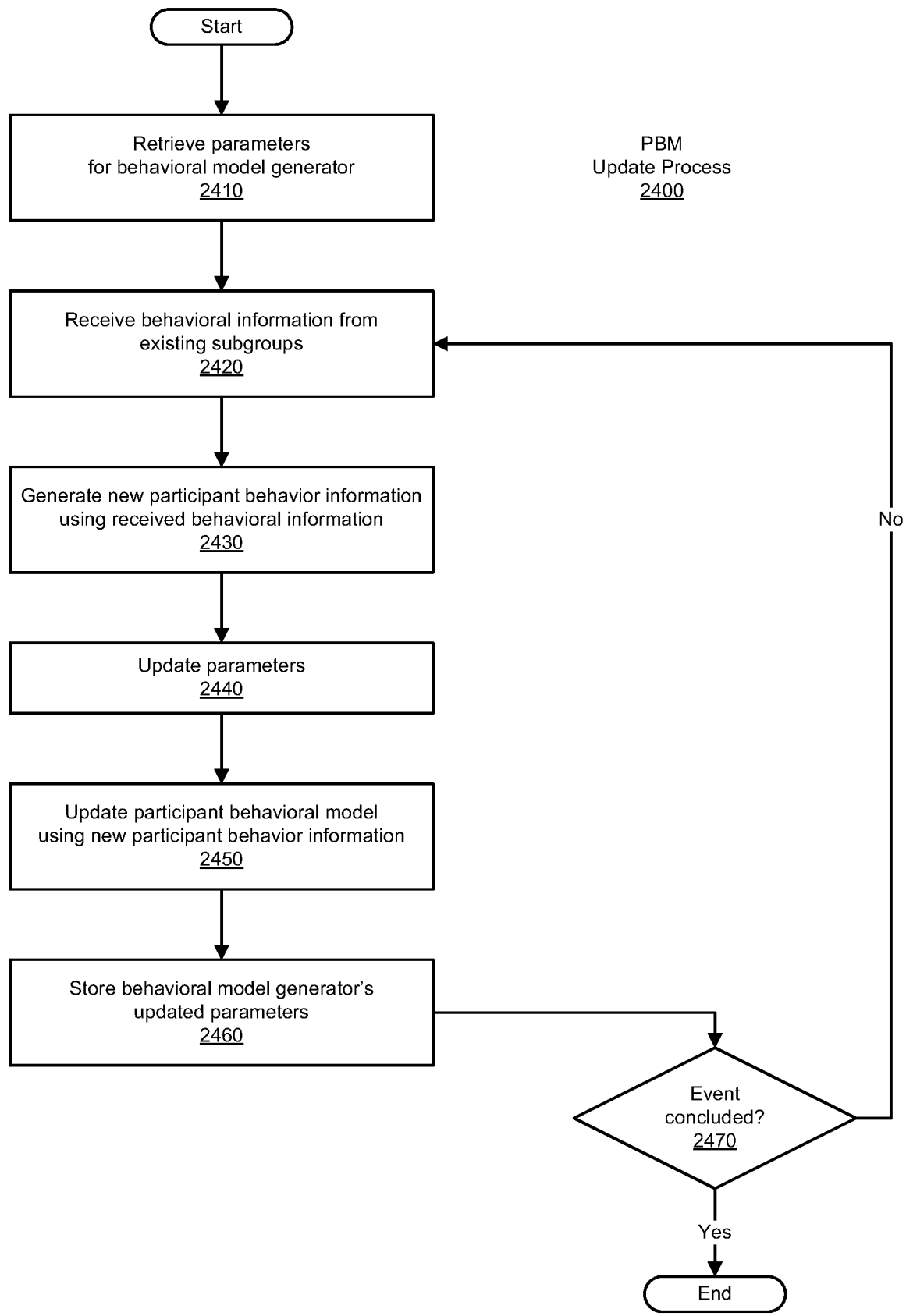
FIG. 24 is a simplified flow diagram illustrating an example of a PBM update process, according to methods and systems such as those disclosed herein.

FIG. 24 is a simplified flow diagram illustrating an example of a PBM update process, according to methods and systems such as those disclosed herein. FIG. 24 thus illustrates a PBM update process 2400, which can be performed on-demand, as well as part of an ongoing TMS operational process. PBM update process 2400 begins with the retrieval of parameters for the behavioral model generator that will generate the requisite participant behavior information (e.g., on an ongoing basis, from participant behavioral information that is received) (2410). Participant behavioral information is also received for existing subgroups (e.g., such as participant behavioral information 547) (2420). The behavioral model generator then generates new participant behavior information using the participant behavioral information received (e.g., as from a telepresence construct information database) (2430). Once such generation has been performed, the behavioral model generator's parameters can be updated (2440). Having generated the new participant behavior information, behavioral model generator provides this information for use in updating the participant behavioral model in question (2450). The behavioral model generator's updated parameters can then be stored (2460). A determination is then made as to whether the event in question has concluded (2470). Such a determination allows for the generation of participant behavioral information (and so, the updating of the PBM) during ongoing operations of the TMS in question, and also allows for the optional updating of the PBM in question upon the conclusion of the telepresence event. That being the case, if the telepresence event is ongoing, PBM update process 2400 proceeds to the next instance of receiving participant behavioral information from existing subgroups (2420). In the alternative, PBM update process 2400 concludes.

Example Diagrams Illustrating Subgroups and Participants

Figure 25:
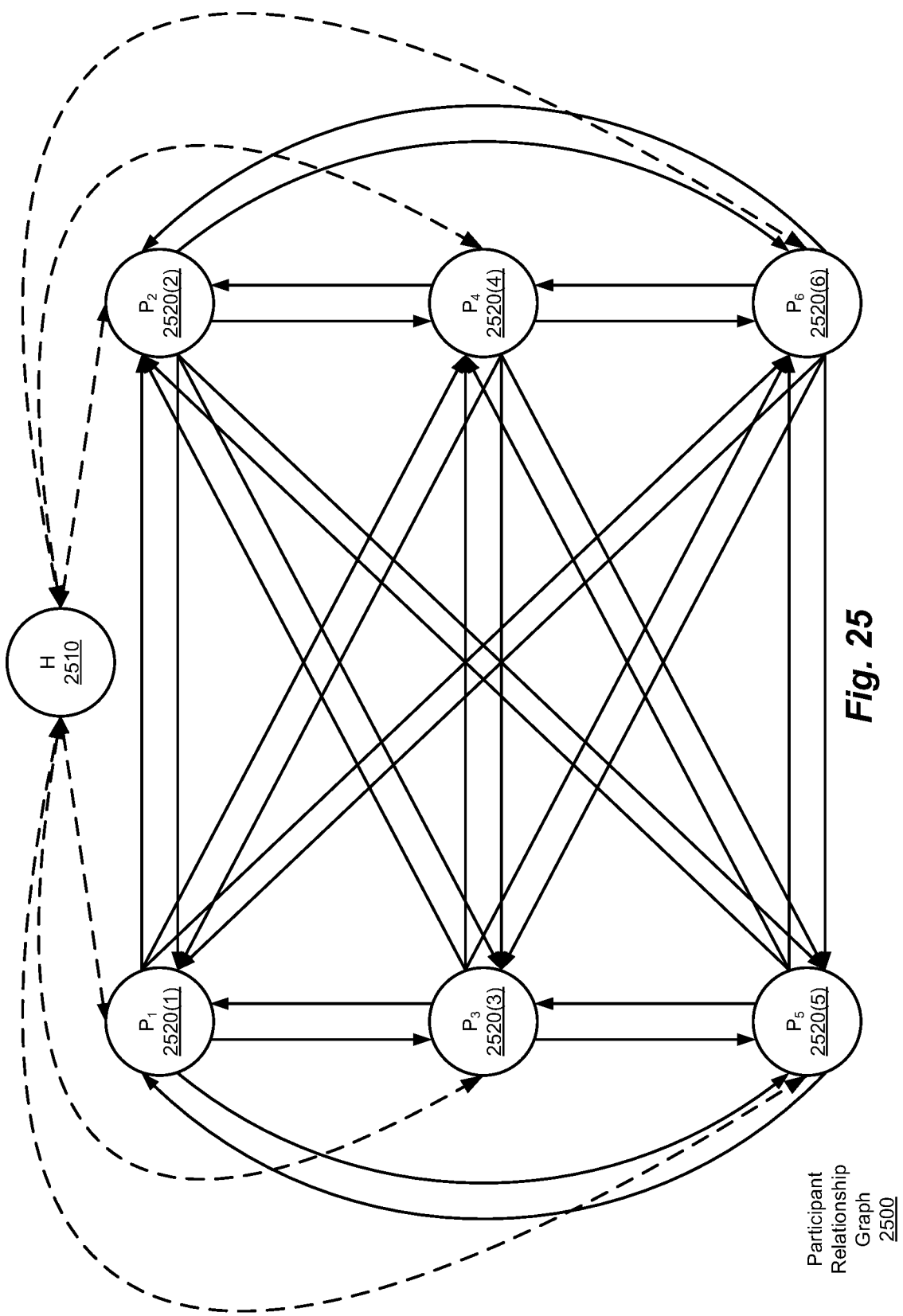
FIG. 25 is a simplified diagram illustrating an example of a participant relationship graph, according to methods and systems such as those disclosed herein.

FIG. 25 is a simplified diagram illustrating an example of a participant relationship graph, according to methods and systems such as those disclosed herein. FIG. 25 thus illustrates a participant relationship graph 2500. Participant relationship graph 2500 is, in this example, a directed graph that presents a representation of the interrelationships between individuals who are attendees of a telepresence event, and/or the interrelationships between such individuals and one or more individuals associated with one or more organizers sponsoring the telepresence event (also referred to herein as sponsors). As will be appreciated from FIG. 25, each vertex of participant relationship graph 2500 represents one such individual (whether an attendee or a sponsor (also referred to herein as a host)). That being the case, the vertices of participant relationship graph 2500 represent individuals at a given telepresence event. In this example, such individuals include one or more representatives of the sponsor of the telepresence event (e.g., depicted in FIG. 25 as a host 2510) and one or more attendees (e.g., depicted in FIG. 25 as participants 2520(1)-(6), which are referred to in the aggregate as participants 2520 and are also denoted as participants $P_1$-$P_6$).

Also depicted in FIG. 25 are a number of directed edges between the aforementioned vertices, which are representative of the characteristics of a relationship of one individual to another (if any). As noted earlier, the directed edges in participant relationship graph 2500 present each such individual's relationship to each other such individual. For the participants shown in FIG. 25, such participant interrelationships are shown in solid lines in FIG. 25. Such participant interrelationships can be based on, for example, participant attributes, participant goals, and participant feedback, among other types of participant information. For example, such participant attributes can include a variety of characteristics, such as professional affiliations, geographic location, educational background, employment history, professional and/or social contacts, and other such information as may be useful in characterizing a given attendee's professional and/or social background. Similarly, participant goals can reflect a given attendee's professional and/or social goals (e.g., an attendee's professional goals may include interacting with certain individuals within or outside a given business organization, professional interests, learning about certain business organizations and/or businesses, and other such objectives). As has also been noted, the various participant feedback is possible, and can include, for example, a participant's opinion as to the members of a given subgroup, interactions with other participants of the telepresence event, the user-friendliness of the telepresence system, the topics discussed in the subgroups in which the participant has participated, and a wide variety of other opinions a given participant might hold. Further still, in a system such as that described herein, it will be appreciated that participant feedback can be received non-volitionally (by way, for example, as engagement feedback information) and/or volitionally (by way, for example, as participant feedback information), adding yet another dimension to the information that can be gleaned from participants in order to accomplish the participants' and organizers' objectives.

With regard to host 2510, it will be appreciated from the discussion of FIGS. 27A-27C, subsequently that an NVPA can, for example, assign a host each subgroup and/or treat hosts as simply additional participants. Such hosts can be treated as moderators for the given session, as session hosts, or simply as additional participants. As noted earlier in this regard, an NVPA according to methods and systems such as those described herein (whether employing machine learning, iterative summation, or other techniques) can thus treat such a host in a manner appropriate to the desired relationship between the host and the participants. For example, such an NVPA can treat a host as a participant by giving comparable weight to the host's preferences and characteristics as would be accorded any other participant. In the alternative, the NVPA can treat the host as a moderator by ensuring that every subgroup includes such a host (and, as will be appreciated in light of the present disclosure, this can include a host that is a member of multiple subgroups). Yet another alternative is for the NVPA to treat the host as a session host by, for example, ensuring that the host is able to interact with all participants of the given subgroup. Due to the possibility of the varied relationships between host 2510 and participants 2520, the directed edges depicted in FIG. 25 are shown in dashed lines with double-headed arrows.

Be appreciated in light of the present disclosure, the graphical representation of participants and their relationships reflected in participant relationship graph 2500 can be implemented using the data constructs discussed in connection with FIGS. 5 and 6. Thus, for example, host 2510 and participants 2520 can be represented by participants 645 within subgroup 640, as stored in telepresence construct information 615, of FIG. 6. In such an instance, host 2510 and participants 2520 might all be members of a given subgroup (e.g., subgroup 640). As will also be appreciated, such information can be maintained in a subgroup construct such as one of subgroup constructs 545 within one of the event constructs 540 of FIG. 5, and so maintained in a telepresence construct information database such as telepresence construct information database 515. As will still further be appreciated, the storage of such information in, for example, a telepresence construct information database, allows such information to represent the participants and their relationships as reflected in a more conceptual fashion in participant relationship graph 2500. This being the case, it will also be appreciated that such directed graph information can be used in determining machine learning biases and weights, iterative summation coefficients and thresholds, and other such parameters. As has been noted, in embodiments in which machine learning techniques are employed, such information is simply taken in as data that results in certain outputs. However, having attributed certain meaning to such inputs and outputs, and given the proper training of the machine learning systems involved, such machine learning techniques are able to provide an efficient mechanism to effectively accomplish participant and organizer goals by generating appropriate subgroups and appropriately assigning participants to those subgroups. As will be appreciated, the use of iterative summation techniques can also be used equally good effect, although the use of such approaches differ in their implementation.

Similarly, the relationship information represented in the example of a participant relationship graph 2500 will be affected by the learning performed by such machine learning techniques (and/or the updating and adjustment of iterative summation parameters such as coefficients and thresholds). For example, the receipt of participant behavioral information by a behavioral model generator will affect the participant behavioral model that is generated or updated. This, in turn, will affect engagement score information and participant attribute information produced by and associated engagement score generation unit. The effects of such may then result in changes to one or more participants' participant attributes and/or the generation of subgroups and the assignment of participants thereto. In the latter case, such effects will appear in changes to subgroup definitions and subgroup participant information stored in a telepresence construct information database, for example. As will therefor be appreciated, actions taken by participants can affect machine learning parameters, which can, ultimately, result in changes to the information that is maintained to reflect relationships such as those depicted in participant relationship graph 2500.

Figure 26A:
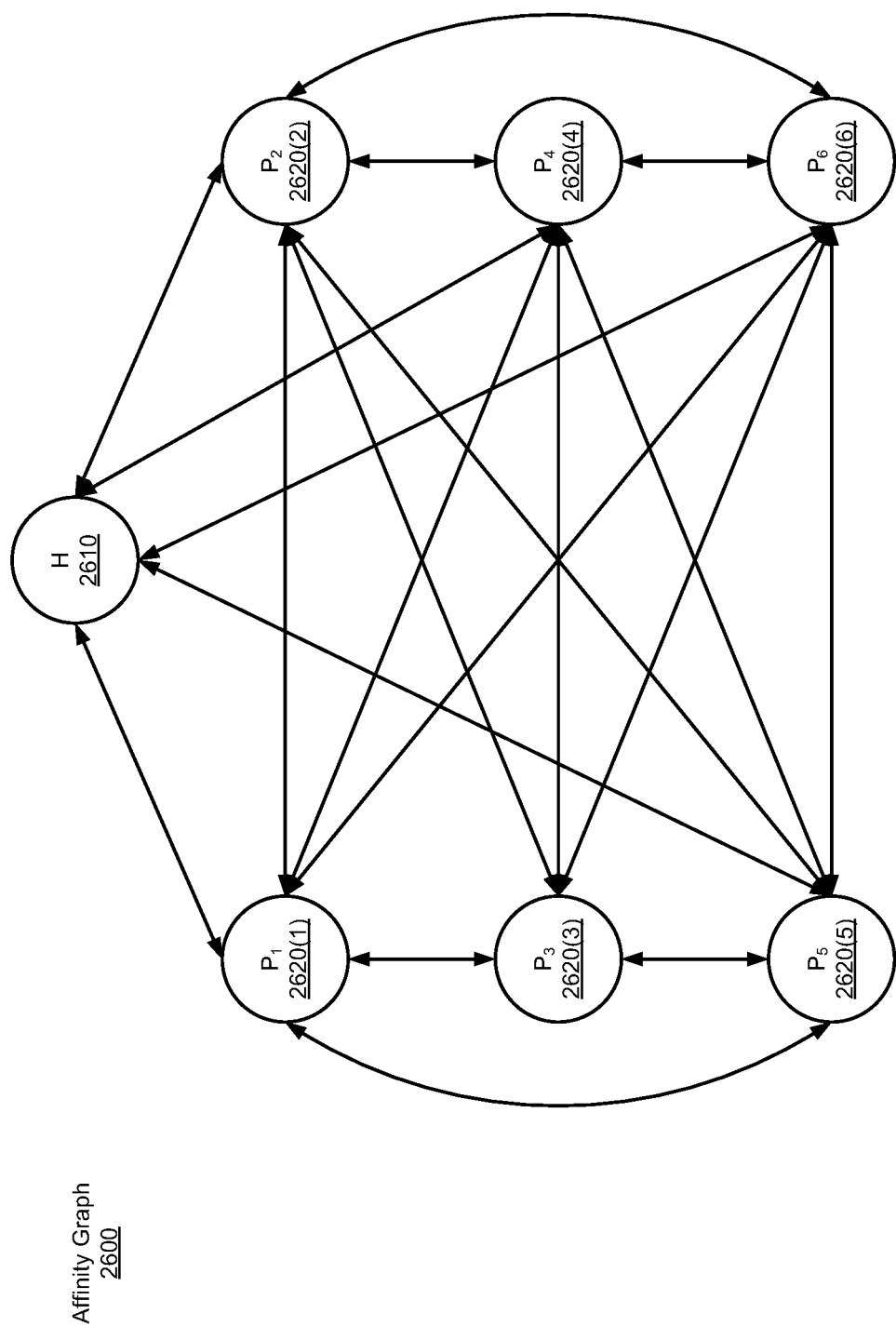
FIG. 26A is a simplified diagram illustrating an example of an inter-participant affinity graph, according to methods and systems such as those disclosed herein.

FIG. 26A is a simplified diagram illustrating an example of an inter-participant affinity graph, according to methods and systems such as those disclosed herein. FIG. 26A thus illustrates an affinity graph 2600. Affinity graph 2600 shows single edges between vertices that represent the affinity level (e.g., as by an affinity score, as might be generated by a subgroup generation unit, for example). Such a subgroup generation unit can (e.g., using machine learning, iterative summation, and/or other comparable techniques) that allows its NVPA to determine, essentially, which edges of the affinity graph 2600 percent an affinity score (and/or other such metric) such that the participants in question might be assigned to the same subgroup. Looking at this process in another way, a sufficiently low affinity score or other such metric as between the participants in question could indicate a boundary between subgroups.

The foregoing determinations can be made using one or more aforementioned types of participant information, and so can include participant attributes, participant goals, and participant feedback, among other such participant information. That said, while subgroupings can be generated from an affinity graph such as affinity graph 2600 with only that information, subgroup generation can consider participant information such as disaffinities, employer conflicts, personal conflicts, desired interactions, expected availability, and other such characteristics and preferences, as may ultimately affect the generation of appropriate subgroups.

Moreover, organizer information can be used to modify affinity scores and/or other metrics that might be used to assigned such affinity scores and/or other metrics to any given edge of affinity graph 2600. For example, in order to meet the organizer's objectives, organizer information can be used to modulate such affinity scores and/or other metrics. As noted earlier, such organizer information can include one or more organizer rule sets, one or more organizer goal sets, one or more organizer control inputs, and other such organizer information as may be used to facilitate the generation of subgroups that might better address the organizer's objectives. Thus, organizer rule sets can be used to provide not only internal constraints to the operations performed by the internal components of the NVPA in question, but can also be used to constrain interactions between participants by controlling the affinity scores represented by the edges in affinity graph 2600, in addition to the assignment of those participants to the various subgroups. Similarly, an organizer rule set can set out constraints in the assignment of participants to the subgroups thus generated, in order to promote the interactions desired by the organizer. To a similar end, an organizer goals set can be accessed in order to address one or more of the goals of the organizer (and/or other sponsoring organization), not unlike (though likely different from) goals of various of the attendees to the telepresence event. In this regard, through training and use, the machine learning implemented in a sub group generation unit and subgroup participant assignment unit can gain insight into both types of such goals, and in so doing, balance the needs of the participants and the organizer. For example, in embodiments employing machine learning techniques, such NVPA subsystems might take into consideration the strength of participant preferences, and use such information to moderate constraints the organizer has put in place by way of an organizer rule set and/or control inputs.

Figure 26B:
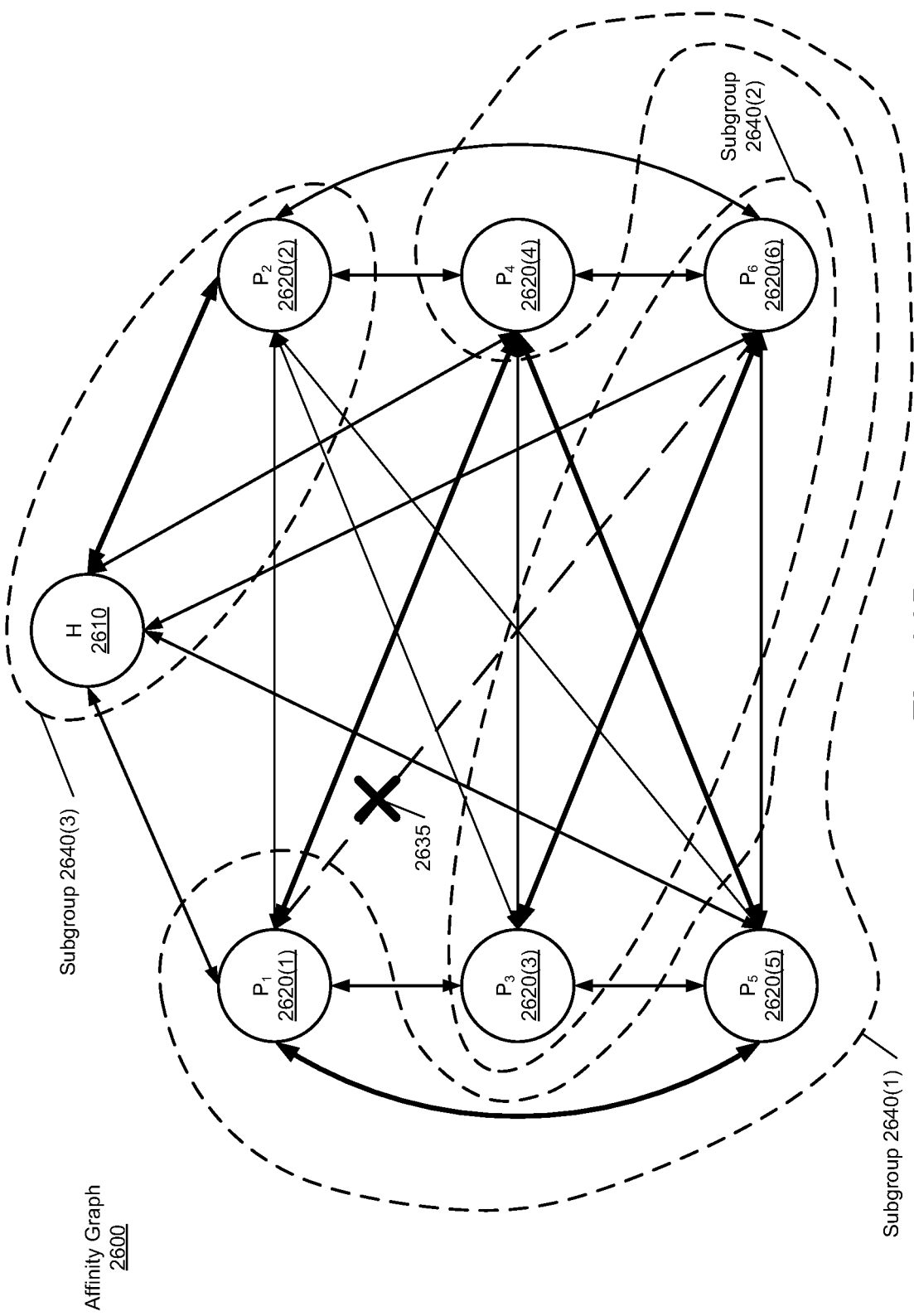
FIG. 26B is a simplified diagram illustrating an example of an affinity graph such as that in FIG. 26A that reflects subgroups and participant assignments that might result in one scenario, according to methods and systems such as those disclosed herein.

FIG. 26B is a simplified diagram illustrating an example of an affinity graph such as that in FIG. 26A that reflects subgroups and participant assignments that might result in one scenario, according to methods and systems such as those disclosed herein. In FIG. 26B, affinity graph 2600 has been processed in a manner such as that just described. As an initial observation, it will be appreciated that the affinities between participants 2620, as well as between hose 2610 and participants 2620, are now represented by the thicknesses of the lines representing such interrelationships in FIG. 26B (i.e., the edges of affinity graph 2600). Also indicated, as an example, is a disaffinity 2635, which represents the fact that one or both of participant 2620(1) and/or participant 2620(6) have indicated their preference to avoid being assigned to the same subgroup. Disaffinity 2635 can also be an indication that one or more participant attributes of participant 2620(1) and/or participant 2620(6) may prevent their assignment to the same subgroup, as may certain organizer information.

Also indicated in affinity graph 2600 (by way of lines of at least medium-thickness) is the organizer's preference that it be possible for host 2610 to be assigned to any subgroup. Also reflected in affinity graph 2600 is the strong preference of participant 2620(2) to be included in a subgroup with host 2610, which might also result from the organizer's preferences that host 2610 be included in at least one subgroup and that no subgroup contain only one participant. Affinity graph 2600 also demonstrates the preferences of participants 2620(1), (4), and (5) to be included in a subgroup together, among other such possible effects of various kinds and sources of information that might have bearing on the affinities represented by the edges of affinity graph 2600.

As is depicted in FIG. 26B, the aforementioned participant information and organizer information, as well as information gleaned from machine learning and/or iterative summation processes (and any randomization performed), result in the generation of three subgroups, which are depicted in FIG. 26B as subgroups 2640(1)-(3). It will be appreciated at this juncture that the graphical representation of such interrelationships can, as is experienced in the use of telepresence systems lacking methods and systems such as those described herein, result in the exponential explosion of complexity as the number of users of such systems increases (with a concomitant reduction in the efficiency and effectiveness of interactions experienced by users of such systems). For easy discussion, then, the following figures focus on the results of subgroup generation and participant assignment (and reassignment) during the operation of a TMS such as that described herein.

Figure 27A:
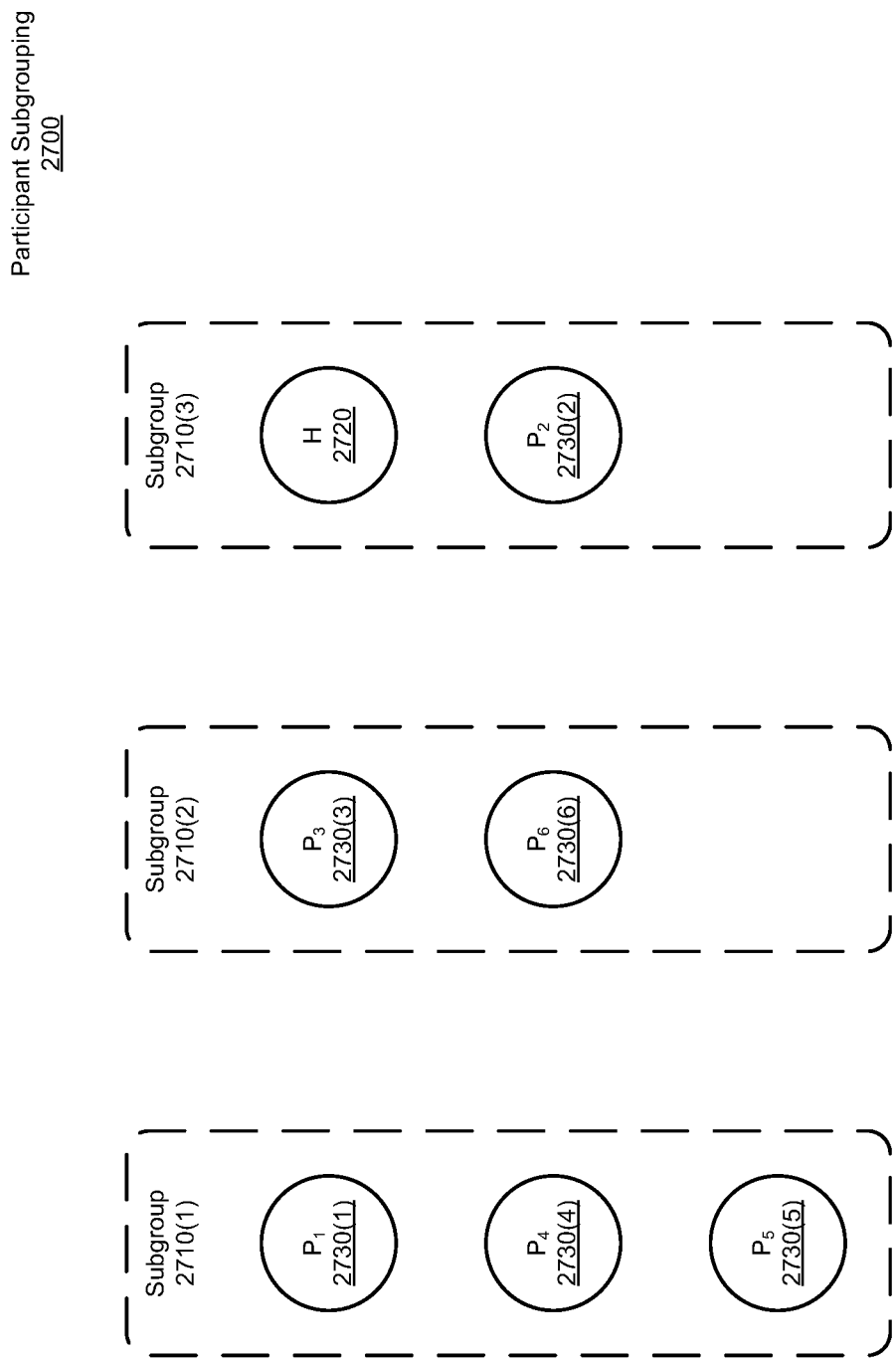
FIGS. 27A, 27B, and 27C are block diagrams illustrating examples of various subgroupings generated by a telepresence management system, according to methods and systems such as those disclosed herein.
Figure 27B:
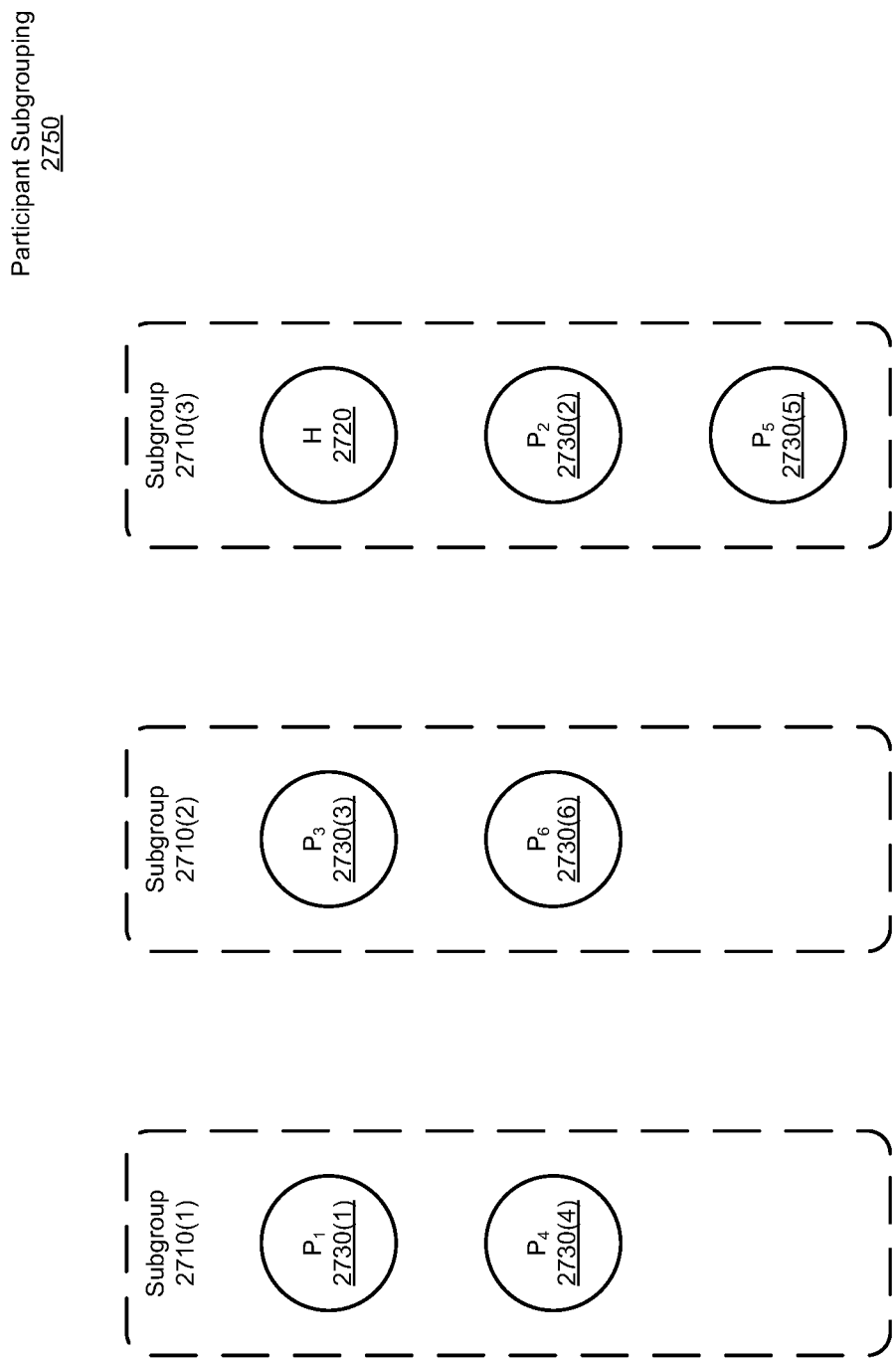
Figure 27C:
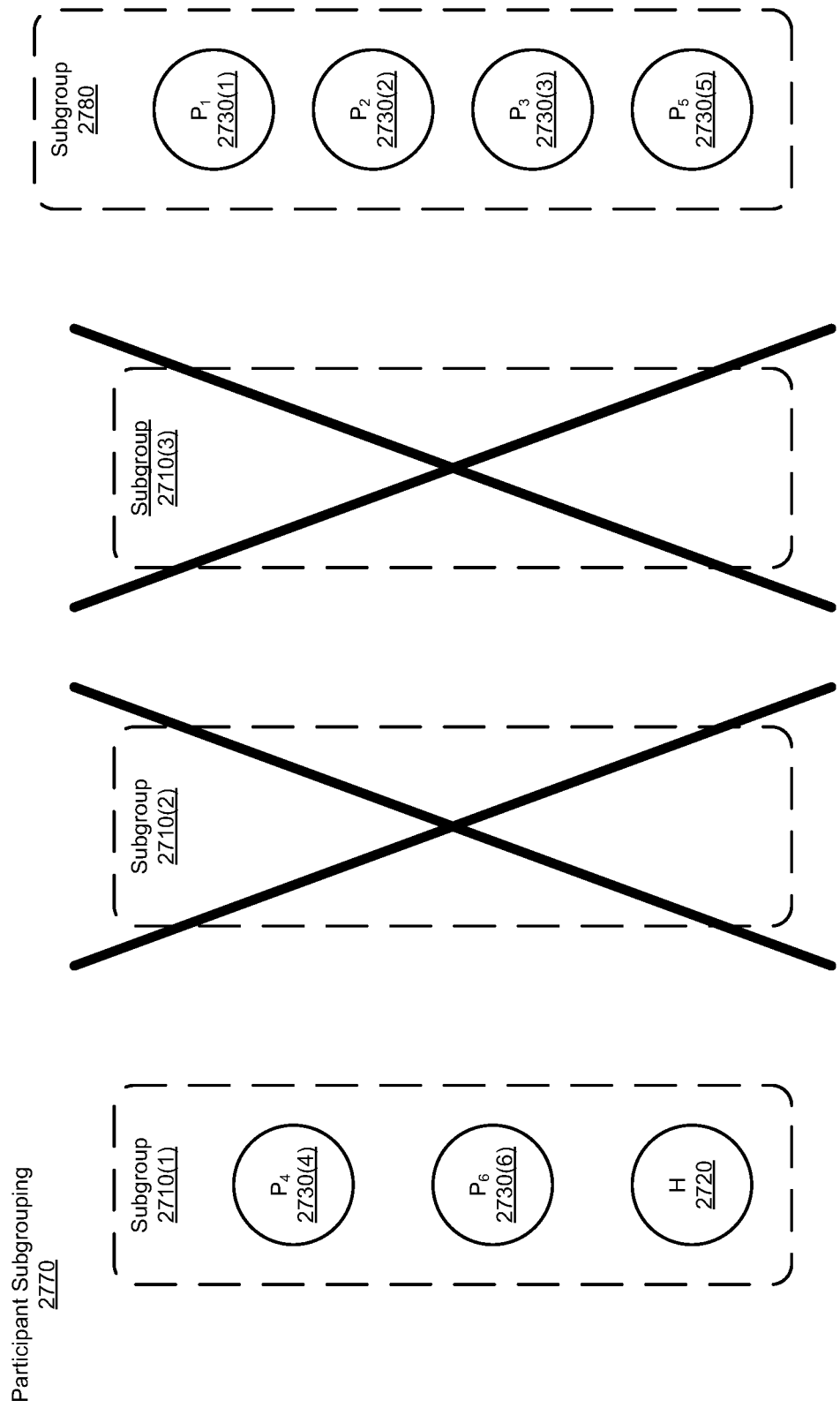

FIGS. 27A, 27B, and 27C are block diagrams illustrating examples of various subgroupings generated by a telepresence management system, according to methods and systems such as those disclosed herein.

FIG. 27A depicts a participant subgrouping 2700 that reflects the subgrouping of participants depicted in FIG. 26B. That being the case, a set of subgroups is shown that includes subgroups 2710(1)-(3), which are comparable to subgroups 2640(1)-(3) of FIG. 26B. In FIG. 27A, host H and participants $P_1$-$P_6$ are depicted as host 2720 and participants 2730(1)-(6). As can be seen, the affinity scores (and/or other metrics) of affinity graph 2600 in FIG. 26B are considered, and result in the same subgroupings.

FIG. 27B depicts participant subgrouping 2700 at a point in time at which $P_5$ has left subgroup 2710(1), either of their own volition or as a result of a non-volitional change in their subgroup membership (e.g., as might occur as a result of an observed lack of engagement). The TMS managing the given telepresence event (either determining that a volitional departure has occurred, or as part of a non-volitional reassignment), and more particularly, its NVPA, having made such a determination, reassigns $P_5$ to subgroup 2710(3). The assignment of $P_5$ to subgroup 2710(3) might be the result of the NVPA determining the affinity between $P_5$ and host 2610 is sufficient to warrant such an assignment. The lack of a disaffinity between $P_5$ and $P_2$ would not prevent such a reassignment, despite there being no strong affinity as between these participants. As will also be appreciated, the sessions of subgroups 2710 are ongoing at this point. Thus, subgroup 2710(1) continues with participants $P_1$ and $P_4$ as its members, and subgroup 2710(2) continues with participants $P_3$ and $P_6$ as its members FIG. 27C depicts participant subgrouping 2700 at a point in time at which subgroups 2710(2) and 2710(3) are defunct. Subgroups can become defunct as a result of participants leaving the subgroup, the subgroup's session ending, by virtue of the organizer ending or canceling the subgroup (or the entire telepresence event), the end of the telepresence event, and/or other such occurrences. In the example depicted in FIG. 27C, the session for subgroup 2710(2) has come to an end, while one of the members of subgroup 2710(3) (e.g., participant $P_2$) has left that subgroup (leaving only host 2720 in subgroup 2710(3)), which is against at least two of the organizer's rules (no subgroups with single members and the host is to be in a subgroup with other participants). In such a situation, the NVPA's subgroup generation unit may generate (or may have already generated) a new subgroup, which is depicted as subgroup 2780. As is depicted in FIG. 27C, subgroup 2780 now includes participants $P_1$, $P_2$, $P_3$, and $P_5$. As will be appreciated, such a subgrouping reflects the compatibility of these participants with one another, as well as their preferences and those of the organizer. That said, given that a disaffinity still exists as between participants $P_1$ and $P_6$, the TMS in question would not place these participants in the same subgroup, and indeed, has not done so. That being the case, whether volitionally or non-volitionally, participant $P_6$ is assigned to subgroup 2710(1) (which is ongoing), as is host 2720. As a result, fortuitously, participant $P_4$ is not faced with being the member of a single-member subgroup, and so avoids assignment to another subgroup. Such a situation might result, in part, from the moderate affinity between participants $P_4$ and $P_6$ exhibited between these participants in affinity graph 2600 in FIG. 26B.

Example Diagrams Illustrating Subgroups and Participants

An NVPA such as that described herein can be implemented in a number of ways. Presented now is an example of an iterative summation technique, as has been noted previously herein. It will be appreciated that the non-volitional nature of certain aspects of the methods and systems described herein is, at the least, reflective of the fact that a TMS according to such methods and systems does not allow the telepresence event's participants to have absolute say over the subgroups to which they are assigned. Moreover, such assignments are made automatically, using techniques such as those described herein, rather than as a result of conscious human decisions. It will be understood that the elements of this example can be organized differently, that the "weights" described in the following example can vary in practice, in their structure and composition, their magnitude, and/or in the criteria being weighted. In certain embodiments, A priori, in the example below, the participants have their attributes and reputations, and have a set of goals, and rules for the event. No subgroups yet exist.

Data Structures

Affinity

First, an affinity relationship data structure is determined for the telepresence event. This data structure specifies the pairwise desirability of combining two given participants into the same subgroup, based on the rule sets and goal sets of the organizer and participants. In this example, the data structure is shown as a simple 2-dimensional matrix, but other structures are of course possible and can be used to comparably good effect.

| AFFINITY | Participant 1 | Participant 2 | Participant 3 | Participant ... |
|---|---|---|---|---|
| Participant 1 | — | Affinity(2, 1) | Affinity(3, 1) | ... |
| Participant 2 | Affinity(1, 2) | — | Affinity(3, 2) | ... |
| Participant 3 | Affinity(1, 3) | Affinity(2, 3) | — | ... |
| Participant ... | ... | ... | ... | — |

The Affinity(i, j) values can be computed as a weighted sum of component parameters W(k).

Affinity Weights

One can consider the following simple example of the calculation of an affinity sum:

W(1)(Desire to be in group with)+
W(2)(Already was in group with)+
W(3)(Common rank in some organization)+
W(4)(Membership in some organization)+
W(5)(importance of Reputation score in determining group assignment)

A simple example of the computation of the Affinity(i, j) values is: the first term W(1) might be set to 0.5 to indicate that the organizer only cares a little about the desires of the participants to be in groups with each other, and first term the Affinity(1,2) might be set to 0.5 based on a participant goal set, because participant 1 has evidenced a strong preference to be assigned to a subgroup with participant 2, and thus the 'desire' term is large. (The symmetric term in the calculation of Affinity(2,1) might be set to 0 because participant 2 would strongly prefer to avoid participant 1.) Similarly, the W(2) weight in the second term of the sum might be derived from the organizer rule set, and set to a very low or negative weight, because a organizer goal is to have more connection among members of the group, and so wants to discourage participants from staying in groups together. The third weight coefficient W(3) might be similarly set to a low value, to encourage the combination of participants of different ranks into subgroups. The W(4) weight might also be used to identify participants who don't know each other but could be expected to participate well in a given subgroup because of a shared interest.

Of course, there are several additional strategies to calculate the affinities among participants other than a simple weighted sum, but those strategies will all result in the assignment of relevant affinities.

Groups

The Groups data structure is a collection of participants in each subgroup currently in existence, and can be implemented in a variety of straightforward and common structures.

Goal-Matching

The goal match data structure GM is a container for holding a 'fitness' for each participant who is not in a subgroup to be assigned to that subgroup. An example calculation is to average the Affinity(i, j) values for candidate assignment of Participant(i) with other members already in Group(j). Consider now that there are a total of P "Participants" to be assigned to subgroups that form and re-form during the telepresence event. Consider that at the moment the process is invoked, there are G subgroups and p participants who may not be assigned to any group, while other participants are assigned to subgroups. At the start of the telepresence event, no participants are assigned to any subgroups. And during the telepresence event, the value p would change, as might the value P, due to late arrival to or early departure from the telepresence event of Participants. Now consider this pseudo-code operation at any time when a participant needs to be assigned to a subgroup:

```
Clear GM( )
For each free Participant i in p
    For each existing subgroup j in G
        If this subgroup j is 'full' continue to next member of G
        Compute participant goal-match score GM(i, j) for example as the average
        of affinities between candidate subgroup member i and existing subgroup
        j. Further, the score can be 'perturbed' by addition of a random positive or
        negative weight, to introduce a stochastic component to the score that
        more closely approximates non-mediated subgroup participation. The
        goal-match score can also be perturbed by dynamic measures of
        participation and engagement, as described below. For example, a
        participant who splits attention away from the subgroup can have a factor
        applied to the weights of that participant's affinities, to incentivize more
        active participation.
    Next subgroup in G
    If column GM(i, *) is empty (i.e., no subgroups accepting assignments)
        Create new subgroup in G
        Remove participant from p
        Assign participant to P in newly-created subgroup
Next Participant in i in p
For each free Participant i in p
    Find maximum value in GM(i, j) and assign Participant(i) to Group(j), which will reduce
    the size of the pool of unassigned participants p by 1, and may decrease the number of
    subgroups G accepting new assignments by 1 as subgroups collect the maximum number
    of members. It will also necessitate the re-computation of GM( )
Next Participants in p
```

Success Scores

Goal set 'scores' of participants and organizers are typically known prior to the event. For example, it might be a goal of the organizer to increase the degree of connectedness among participants. During each subgroup interaction, those scores may change. As an example, two participants, having just met, might exchange contact information and move from a lower 'degree of separation' to a direct connection, thereby increasing the 'score' of success for the organizer.

Similarly, a first participant may have a goal to meet a particular second participant, and when those two participants are assigned into a common subgroup, the success score for the first participant will be improved. The diagram shows that the NVPA may cause these scores to be changed as a by-product of assignments.

Participation and Engagement Scores

Because the telepresence event is defined to be artificially mediated, for example by a participant's use of a computer screen/keyboard/camera/microphone combination, there is the possibility of measurement of the level of engagement of participants. For example, the amount of time spent with the telepresence event "window" in focus can be a measure of engagement. If a participant spends time interacting with media in another window in focus, clearly the participant's attention is divided and the level of engagement is reduced. Some current systems can indicate the instant state of focus, and therefore the instant state of participant engagement, but the present system teaches using a continuous measure of engagement in the calculation of scores and affinities. By way of example, a participant who was not particularly engaged in the previous subgroup might find it more difficult to be placed into subgroups that satisfy the participant's goals when compared to other participants who were highly engaged.

In addition to the stark example of window focus, the presence of artificial mediation admits to the possibility of more nuanced measures of participant behavior and participation in they are assigned subgroup. For example, a telepresence management system according to the methods and systems described herein can reduce the measured speech intervals into any sort of indicator of participant behavior, and also introduce such a measurement into the engagement scoring system, thus affecting future participant options in the telepresence event. Further, "gamification" can be introduced into such telepresence events, providing the availability of engagement scores directly to participants of the given subgroup and/or the publication of the scores to participants of other subgroups, using the possibility of score increases to incentivized participants, and allowing the organizer to motivate participants in a variety of ways. One such example is the organizer's providing the participant with the highest score with recognition, awarding an increased 'reputation' weight, granting free admission to other telepresence events, and so on. A 'leaderboard' of scores can be made available to allow participants to continually assess their scores relative to other participants.

In view of the foregoing, then, both the complexity of the difficulties resulting from telepresence events (and in particular, the exponential increase in such complexity) presents a thorny problem. Through the use of machine learning techniques, iterative summation techniques, and other such techniques, and an awareness of the affirmation complexities (and the causes thereof), methods and systems such as those described herein are able to allow telepresence event attendees (and, in the broader sense, any groups of users of telepresence systems) to experience more enjoyable, more fruitful interactions with one another, in a manner that more closely approximates the real-world, face-to-face interactions such individuals would experience in attending gatherings in professional, social, work, school, and other settings.

Example Computing and Network Environments

As shown above, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 180), one or more applications, and data. Examples of such computing and network environments are described below with reference to FIGS. 28 and 29.

Figure 28:
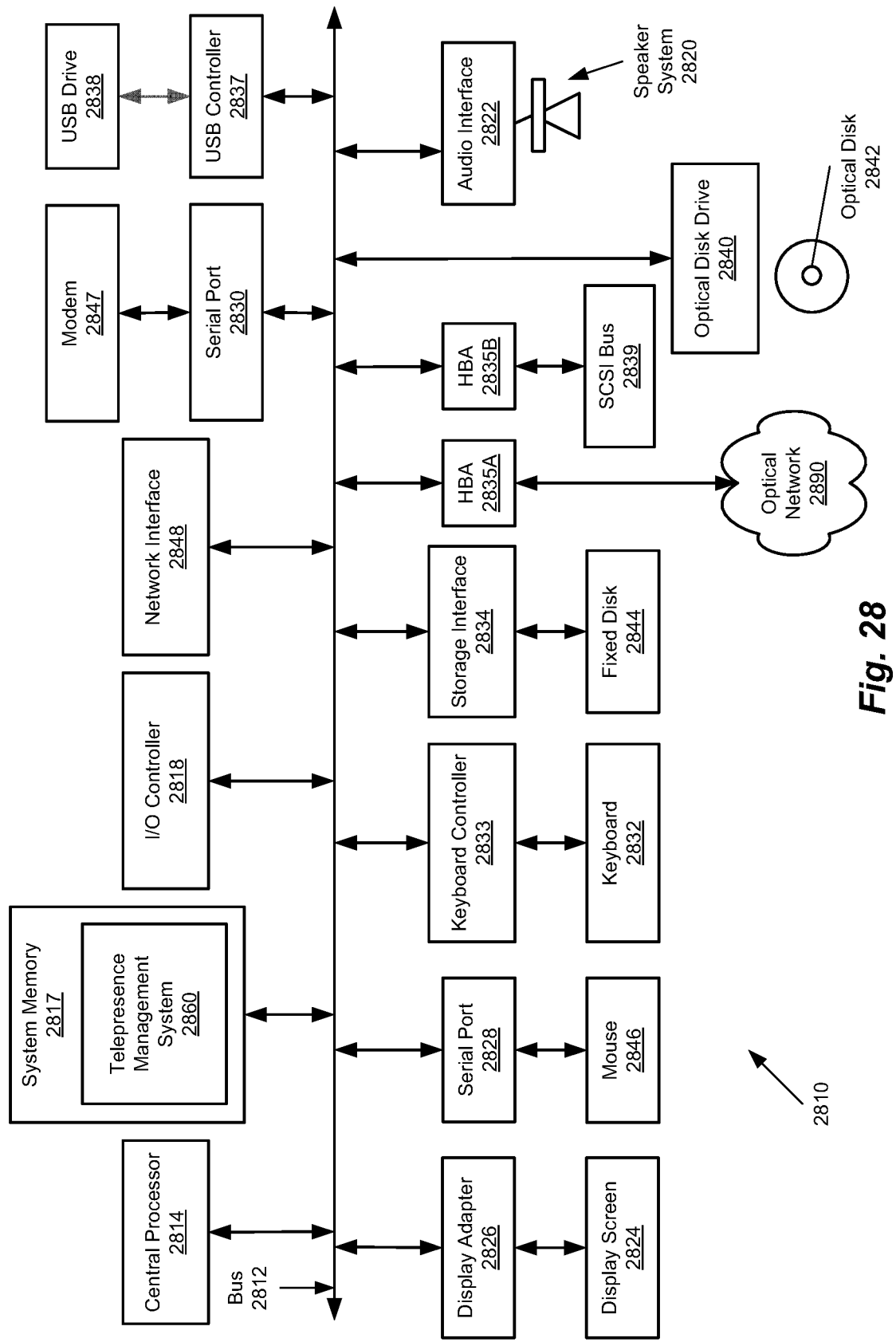
FIG. 28 illustrates an example configuration of a computing device that can be used to implement methods and systems such as those disclosed herein.

FIG. 28 depicts a block diagram of a computer system 2810 suitable for implementing aspects of the systems described herein, and so can be viewed as an example of a computing device supporting a microservice production management server, for example. Computer system 2810 includes a bus 2812 which interconnects major subsystems of computer system 2810, such as a central processor 2814, a system memory 2817 (typically RAM, but which may also include ROM, flash RAM, or the like), an input/output controller 2818, an external audio device, such as a speaker system 2820 via an audio output interface 2822, an external device, such as a display screen 2824 via display adapter 2826 (and so capable of presenting microservice dependency visualization data such as microservice dependency visualization data 225 as visualization 1000 in FIG. 10), serial ports 2828 and 2830, a keyboard 2832 (interfaced with a keyboard controller 2833), a storage interface 2834, a USB controller 2837 operative to receive a USB drive 2838, a host bus adapter (HBA) interface card 2835A operative to connect with a optical network 2890, a host bus adapter (HBA) interface card 2835B operative to connect to a SCSI bus 2839, and an optical disk drive 2840 operative to receive an optical disk 2842. Also included are a mouse 2846 (or other point-and-click device, coupled to bus 2812 via serial port 2828), a modem 2847 (coupled to bus 2812 via serial port 2830), and a network interface 2848 (coupled directly to bus 2812).

Bus 2812 allows data communication between central processor 2814 and system memory 2817, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 2810 are generally stored on and accessed from a computer-readable storage medium, such as a hard disk drive (e.g., fixed disk 2844), an optical drive (e.g., optical drive 2840), a universal serial bus (USB) controller 2837, or other computer-readable storage medium.

Storage interface 2834, as with the other storage interfaces of computer system 2810, can connect to a standard computer-readable medium for storage and/or retrieval of information, such as a fixed disk drive 2844. Fixed disk drive 2844 may be a part of computer system 2810 or may be separate and accessed through other interface systems. Modem 2847 may provide a direct connection to a remote server via a telephone link or to the Internet via an internet service provider (ISP). Network interface 2848 may provide a direct connection to a remote server via a direct network link to the Internet via a POP (point of presence). Network interface 2848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 28 need not be present to practice the systems described herein. The devices and subsystems can be interconnected in different ways from that shown in FIG. 28. The operation of a computer system such as that shown in FIG. 28 is readily known in the art and is not discussed in detail in this application. Code to implement portions of the systems described herein can be stored in computer-readable storage media such as one or more of system memory 2817, fixed disk 2844, optical disk 2842, or floppy disk 2838. The operating system provided on computer system 2810 may be WINDOWS, UNIX, LINUX, IOS, or another operating system. To this end, system memory 2817 is depicted in FIG. 28 as executing a telepresence management system 2860, in the manner of the telepresence management systems (and their NVPA's) discussed previously herein, for example.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 29:
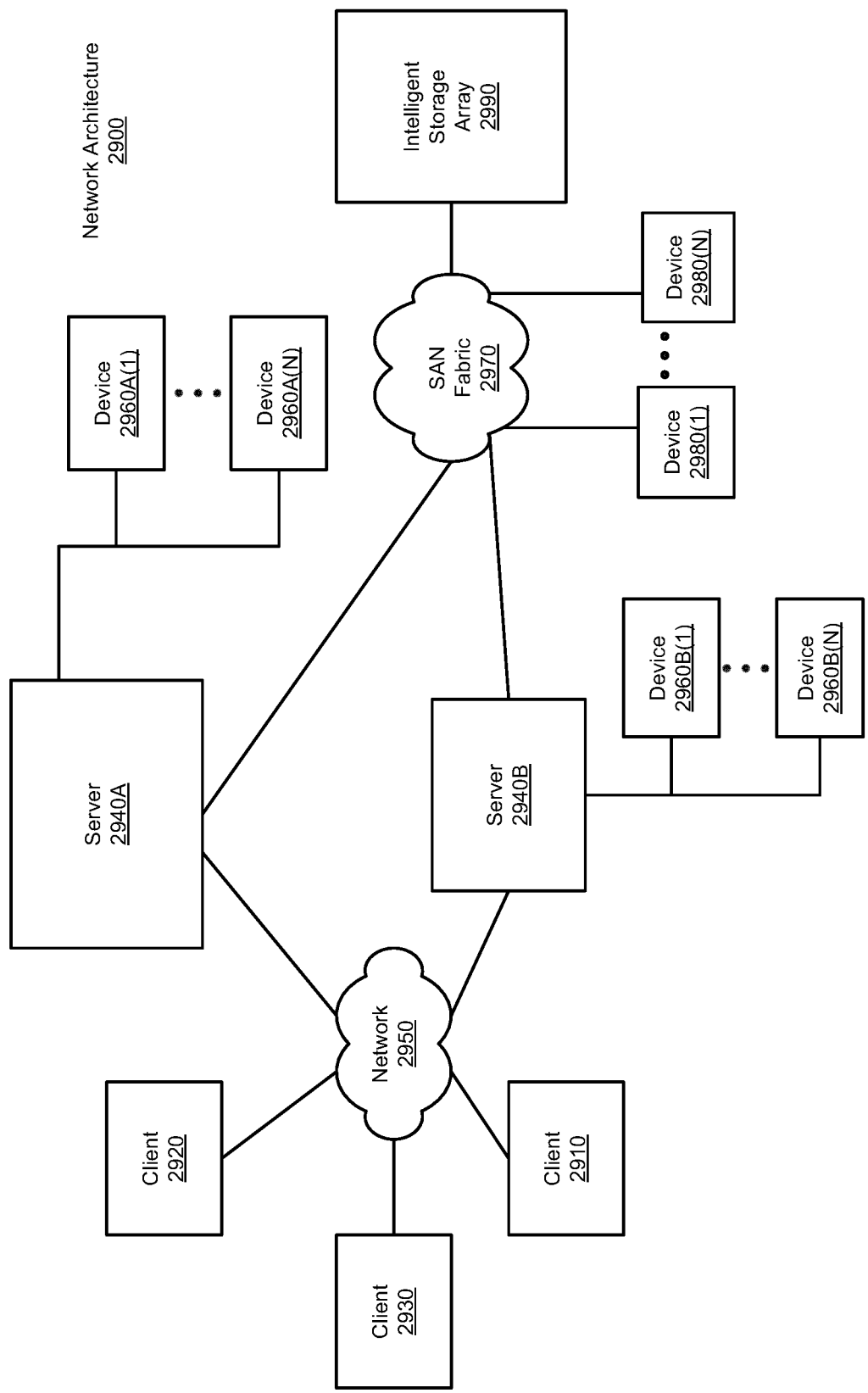
FIG. 29 illustrates an example configuration of a network architecture in which methods and systems such as those disclosed herein can be implemented.

FIG. 29 is a block diagram depicting a network architecture 2900 in which client systems 2910, 2920 and 2930, as well as storage servers 2940A and 2940B (any of which can be implemented using computer system 2910), are coupled to a network 2950. Storage server 2940A is further depicted as having storage devices 2960A(1)-(N) directly attached, and storage server 2940B is depicted with storage devices 2960B(1)-(N) directly attached. Storage servers 2940A and 2940B are also connected to a SAN fabric 2970, although connection to a storage area network is not required for operation. SAN fabric 2970 supports access to storage devices 2980(1)-(N) by storage servers 2940A and 2940B, and so by client systems 2910, 2920 and 2930 via network 2950. An intelligent storage array 2990 is also shown as an example of a specific storage device accessible via SAN fabric 2970.

With reference to computer system 2810, modem 2847, network interface 2848 or some other method can be used to provide connectivity from each of client computer systems 2910, 2920 and 2930 to network 2950. Client systems 2910, 2920 and 2930 are able to access information on storage server 2940A or 2940B using, for example, a web browser or other client software (not shown). Such a client allows client systems 2910, 2920 and 2930 to access data hosted by storage server 2940A or 2940B or one of storage devices 2960A(1)-(N), 2960B(1)-(N), 2980(1)-(N) or intelligent storage array 2990. FIG. 29 depicts the use of a network such as the Internet for exchanging data, but the systems described herein are not limited to the Internet or any particular network-based environment.

Other Embodiments

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 2910). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method for guiding one or more interactions conducted via a telepresence system implemented using a computer system, comprising:
receiving information at the computer system, wherein the information comprises
participant information for each participant of a plurality of participants in a telepresence event conducted using the telepresence system;
determining one or more participant attributes of each participant of the plurality of participants from the participant information;
determining an affinity metric value for the each participant of the plurality of participants, using the one or more participant attributes of the each participant of the plurality of participants;
generating a participant behavioral model, wherein
the participant behavioral model is generated based, at least in part, on participant behavioral information for one or more of the each participant of the plurality of participants;
assigning at least one participant of the plurality of participants to each of one or more subgroups, wherein
the at least one participant is assigned to the each of the one or more subgroups based, at least in part, on
the affinity metric values as between the at least one of the plurality of participants and another participant of the plurality of participants, and
engagement score information,
the affinity metric is a measure of affinity between ones of the plurality of participants, and
the affinity metric is based, at least in part, on the affinity metric values;
guiding participation of the each participant of the plurality of participants by controlling one or more components of the telepresence system, based, at least in part, on the assigning;
generating updated engagement score information for the one or more of the each participant of the plurality of participants, wherein
the updated engagement score information is based, at least in part, on the engagement score information; and
updating the participant behavioral model, wherein
the participant behavioral model is updated based, at least in part, on the updated engagement score information.

2. The computer-implemented method of claim 1, further comprising:
generating engagement score information for the at least one participant; and
non-volitionally reassigning the at least one participant from a first one of the each of the one or more subgroups to a second one of the each of the one or more subgroups based, at least in part, on the engagement score information.

3. The computer-implemented method of claim 1, wherein the assigning comprises:
performing a thresholding operation for a first affinity metric value between a first participant of the plurality of participants and a second participant of the plurality of participants.

4. The computer-implemented method of claim 1, further comprising:
generating engagement score information for the at least one participant, wherein
the at least one participant is also assigned to one of the each of the one or more subgroups based, at least in part, on the engagement score information.

5. The computer-implemented method of claim 4, wherein
the engagement score information based, at least in part, on a participant behavioral model, and
the telepresence event is a conference held in a virtual reality environment.

6. The computer-implemented method of claim 5, further comprising:
generating the participant behavioral model, wherein
the participant behavioral model is generated based, at least in part, on participant behavioral information for one or more of the each participant of the plurality of participants.

7. The computer-implemented method of claim 6, wherein
the information further comprises organizer information for an organizer of the telepresence event, and
the participant behavioral model is generated further based, at least in part, on the participant information for the one or more of the each participant of the plurality of participants and the organizer information.

8. The computer-implemented method of claim 1, further comprising:
determining whether an affected participant is no longer a member of a subgroup; and
in response to a determination that the affected participant is no longer a member of the subgroup,
assigning the affected participant to another subgroup of the one or more subgroups.

9. The computer-implemented method of claim 8, further comprising:
determining whether the another subgroup exists; and
in response to a determination that the another subgroup does not exist, generating the another subgroup.

10. The computer-implemented method of claim 1, wherein
the affinity metric comprises at least one of
at least two participants knowing one another other,
the at least two participants not knowing one another other,
the at least two participants wanting to meet,
the at least two participants not wanting to meet,
the at least two participants being in compatible industries,
the at least two participants being from a certain geographical area, or
the at least two participants working for compatible employers.

11. The computer-implemented method of claim 1, further comprising:
determining whether a session of a subgroup has ended; and
in response to a determination that the session having ended,
assigning each of participants that were members of the subgroup, to one or more other subgroups of the one or more subgroups.

12. The computer-implemented method of claim 11, further comprising:
determining whether the one or more other subgroups of the one or more subgroups do not exist; and
in response to a determination that one or more of the one or more other subgroups do not exist, generating the one or more of the one or more other subgroups.

13. The computer-implemented method of claim 1, further comprising:
generating engagement score information for the at least one participant, wherein
the at least one participant is also assigned to one of the each of the one or more subgroups based, at least in part, on the engagement score information, and
the engagement score information based, at least in part, on a participant behavioral model; and
generating the participant behavioral model, wherein
the participant behavioral model is generated based, at least in part, on participant behavioral information for one or more of the each participant of the plurality of participants,
the participant behavioral information comprises at least one of
analyzed audio information,
analyzed video information, or
analyzed human interface device information.

14. The computer-implemented method of claim 13, wherein
the telepresence event is at least one of
a telepresence technical conference,
a telepresence social event,
a telepresence professional seminar,
a telepresence recreational event, or
telepresence education,
the analyzed audio information is generated by performing at least one of
speech analysis,
pitch analysis,
volume analysis, or
Mel-Frequency Cepstrum analysis,
the analyzed video information is generated by performing at least one of
silhouette analysis,
lean analysis,
head pitch analysis,
head yaw analysis,
facial expression analysis, or
gestural analysis, and
the analyzed human interface device information is generated by performing at least one of
analysis of use of a mouse or other pointing device,
analysis of use of a keyboard,
analysis of use of a touchscreen, or
analysis of use of a user interface.

15. A non-transitory computer-readable storage medium, comprising program instructions, which, when executed by one or more processors of a computing system, perform a method for guiding one or more interactions conducted via a telepresence system comprising:
receiving information at the computer system, wherein
the information comprises
participant information for each participant of a plurality of participants in a telepresence event conducted using the telepresence system;
determining one or more participant attributes of each participant of the plurality of participants from the participant information;
determining an affinity metric value for the each participant of the plurality of participants, using the one or more participant attributes of the each participant of the plurality of participants;
generating a participant behavioral model, wherein
the participant behavioral model is generated based, at least in part, on participant behavioral information for one or more of the each participant of the plurality of participants;
assigning at least one participant of the plurality of participants to each of one or more subgroups, wherein
the at least one participant is assigned to the each of the one or more subgroups based, at least in part, on
the affinity metric values as between the at least one of the plurality of participants and another participant of the plurality of participants, and
engagement score information,
the affinity metric is a measure of affinity between ones of the plurality of participants, and
the affinity metric is based, at least in part, on the affinity metric values; and
guiding participation of the each participant of the plurality of participants by controlling one or more components of the telepresence system, based, at least in part, on the assigning;
generating updated engagement score information for the one or more of the each participant of the plurality of participants, wherein
the updated engagement score information is based, at least in part, on the engagement score information; and
updating the participant behavioral model, wherein
the participant behavioral model is updated based, at least in part, on the updated engagement score information.

16. The non-transitory computer-readable storage medium of claim 15, wherein the method further comprises:
generating engagement score information for the at least one participant, wherein
the at least one participant is also assigned to one of the each of the one or more subgroups based, at least in part, on the engagement score information.

17. The non-transitory computer-readable storage medium of claim 15, wherein the method further comprises:
determining whether an affected participant is no longer a member of a subgroup; and
in response to a determination that the affected participant is no longer a member of the subgroup,
assigning the affected participant to another subgroup of the one or more subgroups.

18. A computing system comprising:
one or more processors; and
a computer-readable storage medium coupled to the one or more processors, comprising program instructions, which, when executed by the one or more processors, perform a method for guiding one or more interactions conducted via a telepresence system comprising
receiving information at the computer system, wherein
the information comprises
participant information for each participant of a plurality of participants in a telepresence event conducted using the telepresence system,
determining one or more participant attributes of each participant of the plurality of participants from the participant information,
determining an affinity metric value for the each participant of the plurality of participants, using the one or more participant attributes of the each participant of the plurality of participants, generating a participant behavioral model, wherein
the participant behavioral model is generated based, at least in part, on participant behavioral information for one or more of the each participant of the plurality of participants,
assigning at least one participant of the plurality of participants to each of one or more subgroups, wherein
the at least one participant is assigned to the each of the one or more subgroups based, at least in part, on
the affinity metric values as between the at least one of the plurality of participants and another participant of the plurality of participants, and engagement score information,
the affinity metric is a measure of affinity between ones of the plurality of participants, and
the affinity metric is based, at least in part, on the affinity metric values, and
guiding participation of the each participant of the plurality of participants by controlling one or more components of the telepresence system, based, at least in part, on the assigning,
generating updated engagement score information for the one or more of the each participant of the plurality of participants, wherein
the updated engagement score information is based, at least in part, on the engagement score information, and
updating the participant behavioral model, wherein
the participant behavioral model is updated based, at least in part, on the updated engagement score information.

\* \* \* \* \*